(12) United States Patent
Kambe et al.

(10) Patent No.: US 9,097,801 B2
(45) Date of Patent: Aug. 4, 2015

(54) OBSTACLE DETECTION APPARATUS AND OBSTACLE DETECTION PROGRAM

(75) Inventors: Takeshi Kambe, Yokohama (JP); Kazuyuki Sekine, Yokohama (JP)

(73) Assignee: Honda Elesys Co., Ltd., Kanagawa (JP)

( * ) Notice: Subject to any disclaimer, the term of this patent is extended or adjusted under 35 U.S.C. 154(b) by 191 days.

(21) Appl. No.: 13/523,704

(22) Filed: Jun. 14, 2012

(65) Prior Publication Data

US 2013/0002470 A1 Jan. 3, 2013

(30) Foreign Application Priority Data

Jun. 15, 2011 (JP) ................................ 2011-133681

(51) Int. Cl.
*G01S 13/93* (2006.01)
*G01S 7/40* (2006.01)
*G01S 13/86* (2006.01)
*G01S 13/00* (2006.01)
*G01S 13/34* (2006.01)
*G01S 13/46* (2006.01)

(52) U.S. Cl.
CPC .............. *G01S 13/867* (2013.01); *G01S 13/931* (2013.01); *G01S 13/345* (2013.01); *G01S 2013/462* (2013.01); *G01S 2013/935* (2013.01); *G01S 2013/9321* (2013.01); *G01S 2013/9342* (2013.01); *G01S 2013/9346* (2013.01); *G01S 2013/9353* (2013.01); *G01S 2013/9375* (2013.01)

(58) Field of Classification Search
CPC ......... G01S 13/02; G01S 13/06; G01S 13/08; G01S 13/32; G01S 13/34; G01S 13/345; G01S 13/46; G01S 13/86; G01S 13/867; G01S 13/88; G01S 13/93; G01S 13/931; G01S 2013/462; G01S 2013/9321; G01S 2013/9342; G01S 2013/9346; G01S 2013/935; G01S 2013/9353; G01S 2013/9371; G01S 2013/9375

USPC ................. 342/27, 28, 52–55, 70–72, 165, 342/173–176, 179, 192–197, 89–93; 701/1, 701/36, 45, 300, 301; 348/61, 143, 148, 348/149; 382/100, 103, 104, 106; 356/399; 340/901–904, 425.5, 435, 436, 437

See application file for complete search history.

(56) References Cited

U.S. PATENT DOCUMENTS 4,071,843 A * 1/1978 Marien ............................ 342/55
5,467,284 A * 11/1995 Yoshioka et al. ............. 701/301

(Continued)

FOREIGN PATENT DOCUMENTS

| JP | 2003-110335 A | 4/2003 |
| JP | 2004-112700 A | 4/2004 |

(Continued)

*Primary Examiner* — Bernarr Gregory
(74) *Attorney, Agent, or Firm* — Keating & Bennett, LLP

(57) ABSTRACT

An obstacle detection apparatus includes a transmission antenna transmitting radio waves, a reception antenna receiving radio waves transmitted to and reflected by an obstacle, an obstacle detection unit configured to detect the obstacle based on the received radio waves, a false detection determination unit configured to determine presence or absence of a false detection characteristic, which is set in advance, with regard to the detected obstacle, a camera capturing an image, and an obstacle existence determination unit configured to determine, based on the image captured by the camera, presence or absence of the obstacle on which it is determined that the false detection characteristic is present.

9 Claims, 50 Drawing Sheets

(56) References Cited

U.S. PATENT DOCUMENTS

| | | | |
|---|---|---|---|
| 6,650,984 B1* | 11/2003 | Rao et al. | 701/301 |
| 6,697,720 B2* | 2/2004 | Ikeda | 701/301 |
| 6,728,617 B2* | 4/2004 | Rao et al. | 701/301 |
| 6,771,208 B2* | 8/2004 | Lutter et al. | 342/52 |
| 6,831,591 B2* | 12/2004 | Horibe | 342/52 |
| 6,847,894 B1* | 1/2005 | Hasegawa | 701/301 |
| 6,873,899 B2* | 3/2005 | Sawamoto | 342/70 |
| 6,888,447 B2* | 5/2005 | Hori et al. | 340/435 |
| 6,941,211 B1* | 9/2005 | Kuroda et al. | 342/52 |
| 6,958,770 B2* | 10/2005 | Okada et al. | 348/149 |
| 6,990,216 B2* | 1/2006 | Yamamura | 382/106 |
| 7,012,560 B2* | 3/2006 | Braeuchle et al. | 342/70 |
| 7,042,389 B2* | 5/2006 | Shirai | 342/70 |
| 7,136,750 B2* | 11/2006 | Takahama et al. | 701/301 |
| 7,176,830 B2* | 2/2007 | Horibe | 342/70 |
| 7,205,888 B2* | 4/2007 | Isaji et al. | 342/71 |
| 7,280,211 B2* | 10/2007 | Horibe et al. | 356/399 |
| 7,379,018 B1* | 5/2008 | Lohmeier et al. | 342/173 |
| 7,417,580 B2* | 8/2008 | Abe et al. | 342/27 |
| 7,706,978 B2* | 4/2010 | Schiffmann et al. | 701/301 |
| 2006/0227041 A1* | 10/2006 | Okamoto | 342/174 |
| 2007/0146195 A1* | 6/2007 | Wallenberg et al. | 342/52 |

FOREIGN PATENT DOCUMENTS

| | | |
|---|---|---|
| JP | 2005-156199 A | 6/2005 |
| JP | 2006-275840 A | 10/2006 |
| JP | 3942087 B2 | 7/2007 |
| JP | 4123138 B2 | 7/2008 |
| JP | 4147447 B2 | 9/2008 |

* cited by examiner

*FIG. 31*
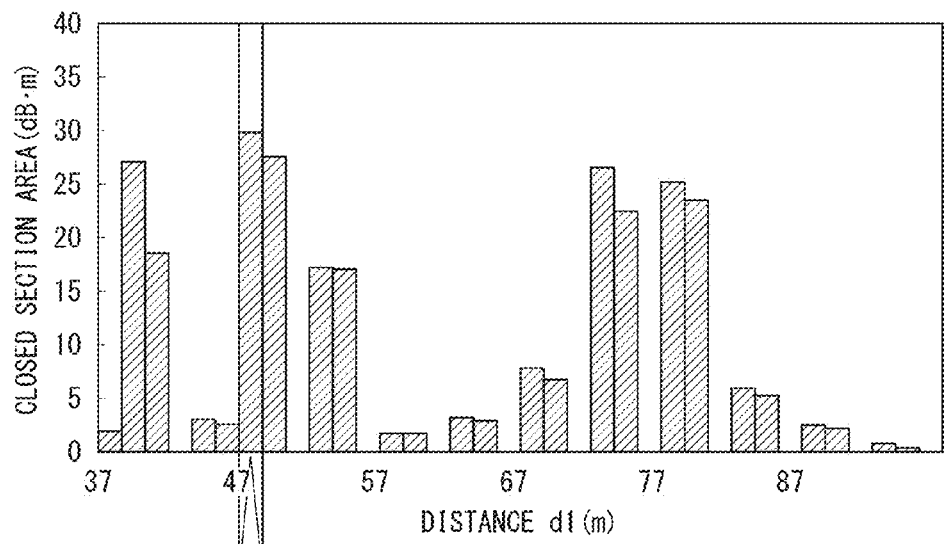
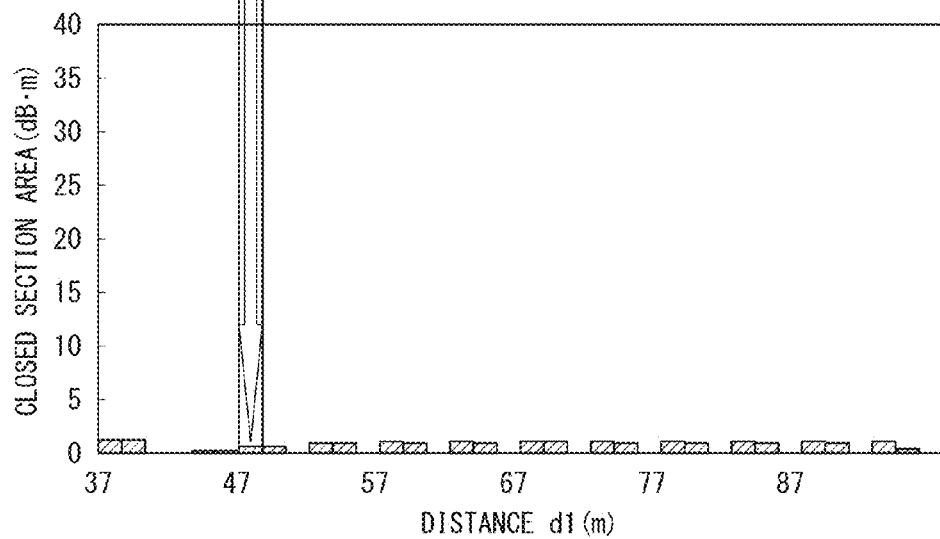

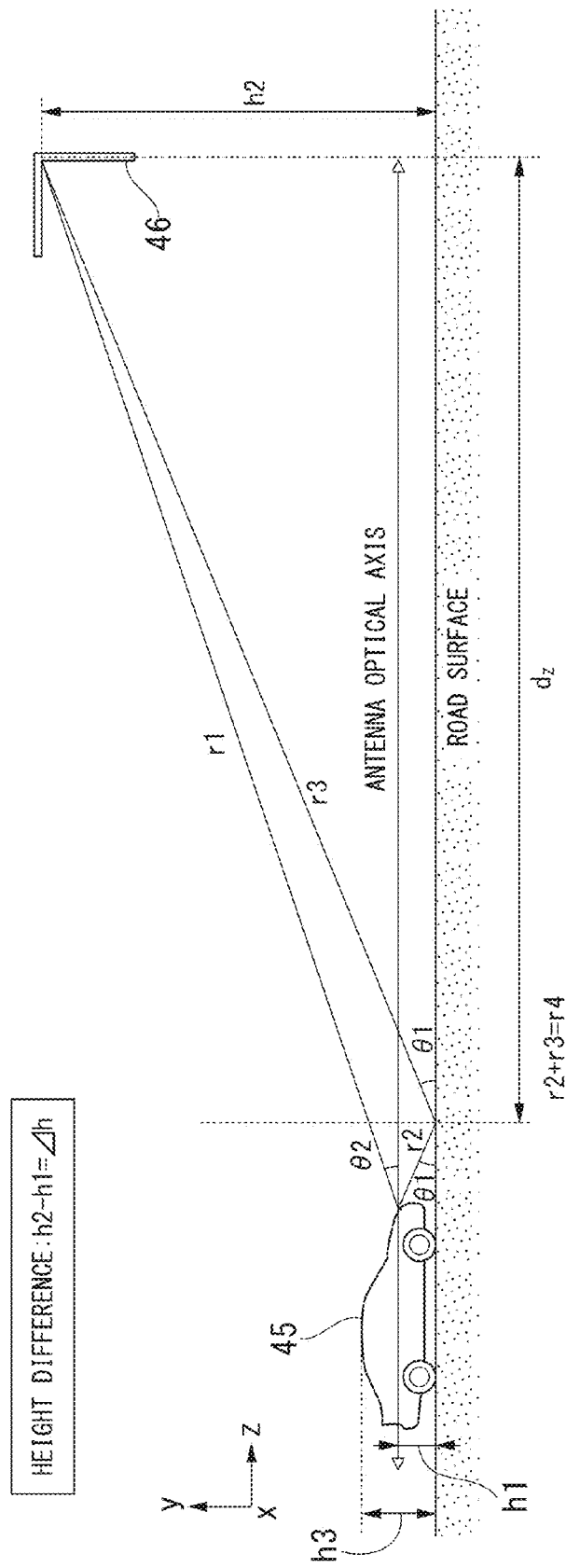

*FIG. 43*
(a)
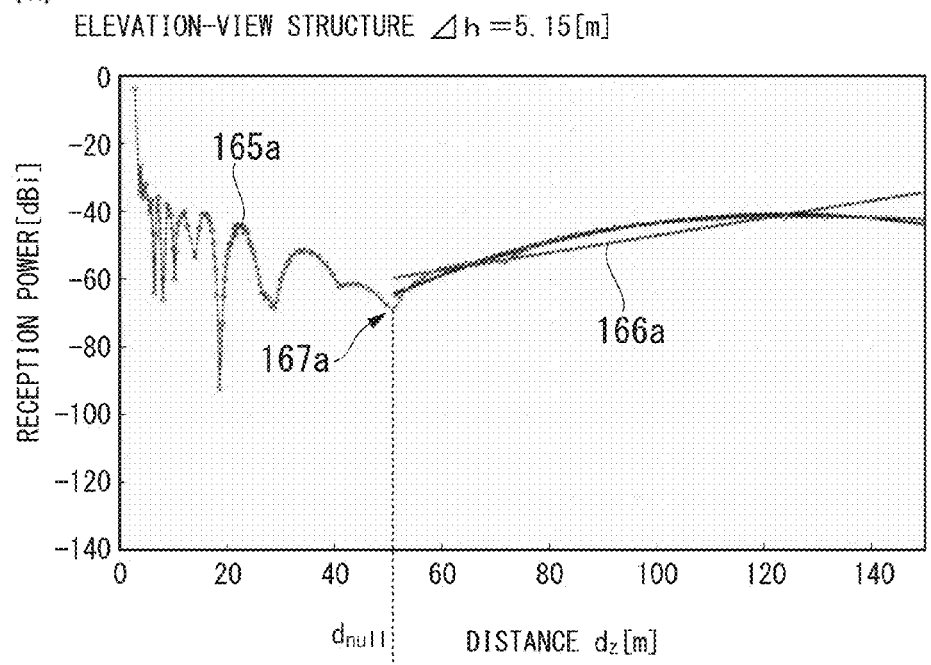
(b)
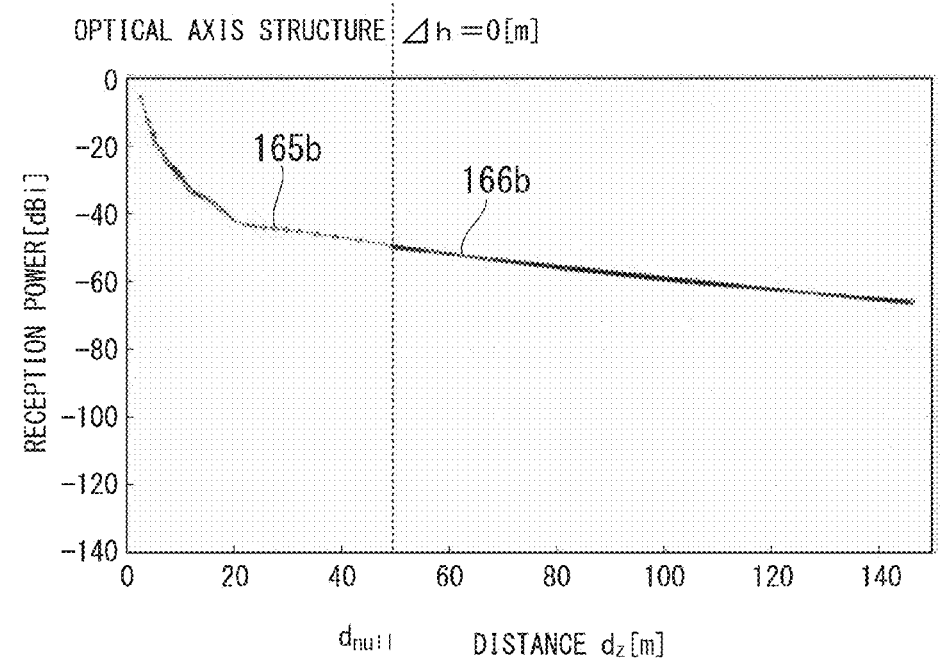

ELEVATION-VIEW STRUCTURE $\Delta h = 4.15[m]$

OPTICAL AXIS STRUCTURE $\Delta h = 0[m]$

*FIG. 57*

| THEORETIC VALUE OF DISTANCE CORRESPONDING TO FIRST NULL POINT | HEIGHT DIFFERENCE $\Delta h$ |
| --- | --- |
| 6 | 0.5 |
| 12 | 1 |
| 18 | 1.5 |
| 24 | 2 |
| 30 | 2.5 |
| 36 | 3 |
| 42 | 3.5 |
| 48 | 4 |
| 54 | 4.5 |
| 60 | 5 |
| 66 | 5.5 |
| 73 | 6 |
| 79 | 6.5 |
| 85 | 7 |
| 91 | 7.5 |
| 97 | 8 |
| 103 | 8.5 |
| 110 | 9 |
| 116 | 9.5 |
| 122 | 10 |

270

OBSTACLE DETECTION APPARATUS AND OBSTACLE DETECTION PROGRAM

CROSS-REFERENCE TO RELATED APPLICATIONS

Priority is claimed on Japanese Patent Application No. 2011-133681, filed Jun. 15, 2011, the contents of which are entirely incorporated herein by reference.

BACKGROUND OF THE INVENTION

1. Field of the Invention

The present invention relates to an obstacle detection apparatus and an obstacle detection program.

2. Background Art

In vehicles, a vehicle-mounted radar is used in a vehicle velocity control system such as an inter-vehicle distance alarm system, a preceding vehicle following system or a collision reducing brake system. As the radar, a millimeter-wave radar is used, for example. Furthermore, the radar is generally mounted in a front portion of a vehicle.

FIG. 5 illustrates an example of a situation where an obstacle 603 is present in front of a host vehicle 601 mounted with a radar 602 in a front portion of a vehicle body. In this example, the front obstacle 603 is another vehicle. Furthermore, in this example, as the radar 602, a radar has horizontal resolution due to a plurality of arrays installed in the horizontal direction; however, it does not have a vertical resolution.

In this case, the radar 602 outputs target data having position information such as a relative longitudinal distance, lateral position and velocity between the host vehicle 601 and the obstacle 603 to a vehicle velocity control system. The vehicle velocity control system performs controls such as a control for maintaining the distance from the obstacle 603, and a control for executing an alarm or velocity reduction in a case where collision with the obstacle 603 is predicted, according to the position information about the input target data.

On the other hand, as shown in FIG. 6, in a case where an obstacle is not present in front of the host vehicle 601, since the target data is not output from the radar 602, the vehicle velocity control system performs a control so that the vehicle regularly runs at a vehicle velocity which is set in advance, and does not execute an alarm.

Here, FIG. 6 illustrates an example of a situation where an obstacle is not present in front of the host vehicle 601 mounted with the radar 602 in the front portion of the vehicle body.

As shown in FIG. 7 and FIG. 8, a case is considered where an obstacle 702 is not present in front of the host vehicle 601, and an elevation-view structure 701 is present.

Here, FIG. 7 illustrates an example of a situation where the obstacle 702 is not present and the elevation-view structure 701 is present in front of the host vehicle 601 mounted with the radar 602 in the front portion of the vehicle body.

FIG. 8 illustrates an example of a scene when viewed from the host vehicle in a case where the obstacle is not present and the elevation-view structure 701 is present in front of the host vehicle mounted with the radar in the front portion of the vehicle body.

The situation, where the elevation-view structure 701 is present and the front obstacle 702 is not present, does not hinder cruising of the host vehicle 601, which is a situation where the vehicle velocity control system is supposed to allow a constant cruising. However, there is a case where the radar 602 outputs target data, as if the front obstacle is present, according to an antenna characteristic and a reflection intensity of the elevation-view structure.

Furthermore, as shown in FIG. 9, when a downward-view structure 711 such as a manhole or a cat's eye is present, or as another example, when a small fallen object such as an empty can is present, cruising of the host vehicle 601 is not hindered in a similar way to the case where the elevation-view structure is present; however, the radar 602 may output target data, as if the front obstacle is present, according to a reflection intensity.

Here, FIG. 9 illustrates an example of a situation where the obstacle is not present and the downward-view structure 711 is present in front of the host vehicle 601 mounted with the radar 602 in the front portion of the vehicle body.

Furthermore, as shown in FIG. 10, in the radar, there is a case where a lateral virtual image is generated according to an antenna characteristic or an angle measurement type.

FIG. 10 illustrates an example of a beam pattern in an azimuth direction (horizontal direction) in a phase detection type radar.

The highest ridge around a position where the AZ (azimuth) angle is 0 degrees is referred to as a main lobe, and different ridges are referred to as a first side lobe, a second side lobe, a third side lobe, and the like as the angle increases. Furthermore, a ridge which occurs at an angle where the phase is reversed by 180 degrees is called a grating lobe.

In the case of the pattern shown in FIG. 10, since a difference in detection level is present between the main lobe, the side lobes and the grating lobes, in the case of an object having a reflection coefficient which is not high, the object is captured by the main lobe; however, it is not detected by the side lobes and the grating lobes.

However, in the case of an object of which the reflection coefficient exceeds the difference in detection level between the main lobe, the side lobes and the grating lobes, such as a large-sized truck 801 in an adjacent lane shown in FIG. 11, the object which is present at angles of the side lobes and the grating lobes is detected in the vicinity of an azimuth angle of 0 degrees. At this time, although the large-sized truck 801 is present in the adjacent lane, the radar may recognize the large-sized truck 801 to be an object in the lane of the host vehicle to output target data. This results in detection of a virtual image.

Here, FIG. 11 illustrates an example of a scene when viewed from the host vehicle in a case where the obstacle is not present and the large-sized truck 801 which results in a virtual image is present in an adjacent lane in front of the host vehicle mounted with the radar in the front portion of the vehicle body. In this example, another vehicle 802 present in front of the host vehicle is not recognized as an obstacle since the distance between it and the host vehicle is large.

Next, an example of a countermeasure against an elevation-view structure or a downward-view structure will be described.

In a general vehicle-mounted radar, an antenna does not have a vertical resolution. Thus, for example, even in the case of an elevation-view structure or a downward-view structure through which a host vehicle can pass, the radar cannot determine the height of the structure, and thus, outputs obstacle data to a control unit.

Thus, as an example, with a configuration in which a plurality of arrays is vertically provided as in the horizontal direction and the angle of incoming waves is calculated by digital beam forming (DBF) or the like, even though the elevation-view structure or the downward-view structure is detected, it is possible to reliably recognize that the structure is not present in front of the obstacle.

However, in such a configuration, problems arise such that the vertical size of the antenna becomes large, a circuit is increased in size as the number of arrays is increased, and the processing load of an arithmetic unit such as a CPU (Central Processing Unit), a DSP (Digital Signal Processor) or an FPGA (Field Programmable Gate Array) is increased as signal processing becomes complicated.

Next, an example of a countermeasure against a lateral virtual image will be described.

As an example, in an array antenna apparatus which includes a transmission array antenna configured of a plurality of antenna elements, a transmission processing unit connected to the transmission array antenna, a reception array antenna configured of a plurality of antenna elements and a reception processing unit connected to the reception array antenna, when any one of the transmission array antenna and the reception array antenna is used as a grating suppressing side and the other one thereof is used as a grating suppressed side, in a state where the angle of a null point on the grating suppressing side and an angle where a grating on the grating suppressed side occurs are set to be equal or close to each other, scanning is performed by a processing unit on the grating suppressing side which performs control so that the grating suppressing side is scanned in synchronization with scanning of the grating suppressed side, while the relationship of the grating on the grating suppressed side and a null point according to the grating is maintained (refer to Japanese Patent No. 4147447).

However, in such a configuration, since a plurality of beam patterns are generated, it is necessary to provide more circuits such as a feeding controller or a timing controller, which incurs costs.

In this regard, although it is considered that the improvement of false detection is possible by a significant change or increase in the size of an antenna, a circuit or the like and by application of a highly complicated process which requires a large load, in a vehicle-mounted radar which for which a small size and low cost are demanded, a countermeasure against the demand is not preferable in many cases.

As a reference, there has been proposed a vehicle detection apparatus including: imaging means for capturing an image in front of a host vehicle, extracting means for extracting a luminance-changed portion of the image as an edge point, vote means for performing a vote in a vote space of a two-dimensional coordinate system based on information regarding of the edge point, detection means for detecting a peak of vote values in the vote space, detection means for detecting coordinates corresponding to the peak as a vehicle, and distance measurement means for measuring the distance and direction to a preceding vehicle, wherein information voted in the vote space is information obtained from horizontal positions of two longitudinal edges located on the image in the horizontal direction, and wherein the peak detection means specifies a range in which the peak of the vote values is detected in the vote space based on the distance and direction data measured by the distance measurement means (refer to Japanese Patent No. 4123138).

In this vehicle detection apparatus, vehicles ranging from a near vehicle to a long vehicle are specified with high accuracy by a monocular camera or a combination of a monocular camera and a radar.

However, in view of the small size and low cost demanded in a vehicle-mounted radar, such a vehicle detection apparatus is not satisfactory.

SUMMARY OF THE INVENTION

As described above, the vehicle-mounted radar has a problem that false detection occurs with respect to an elevation-view structure, a downward-view structure or a lateral virtual image.

Here, it is desirable to provide a technique which solves the above problem of size and cost reduction.

In order to solve the above problem, an advantage of some aspects of the invention is to provide an obstacle detection apparatus and an obstacle detection program which are capable of suppressing false detection of an obstacle.

According to a first aspect of the invention, there is provided an obstacle detection apparatus including: a transmission antenna transmitting radio waves; a reception antenna receiving radio waves transmitted to and reflected by an obstacle; an obstacle detection unit configured to detect the obstacle based on the received radio waves; a false detection determination unit configured to determine presence or absence of a false detection characteristic, which is set in advance, with regard to the detected obstacle; a camera capturing an image; and an obstacle existence determination unit configured to determine, based on the image captured by the camera, presence or absence of the obstacle on which it is determined that the false detection characteristic is present.

According to this obstacle detection apparatus, by determining the presence or absence of an obstacle based on the image captured by the camera, with regard to the obstacle in which it is determined that the false detection characteristic is present with regard to the obstacle detection result in a radar, it is possible to reduce false detection of an obstacle.

In the obstacle detection apparatus described above, as the false detection characteristic, a characteristic that the intensity of the radio waves received by the reception antenna is lower than a predetermined threshold value may be used.

According to this obstacle detection apparatus, by determining the presence or absence of an obstacle based on the image captured by the camera in a case where the intensity of the radio waves received by the reception antenna is low, it is possible to reduce false detection of an obstacle.

In the obstacle detection apparatus described above, as the false detection characteristic, a characteristic that a consecutive number or frequency of extrapolation data exceeds a predetermined threshold value with regard to the obstacle detected by the obstacle detection unit may be used.

According to this obstacle detection apparatus, by determining the presence or absence of an obstacle based on the image captured by the camera in a case where a consecutive number or frequency of extrapolation data is large with regard to the obstacle detected by the radar, it is possible to reduce false detection of an obstacle.

In the obstacle detection apparatus described above, as the false detection characteristic, a characteristic that a value of a spatial horizontal angle or a one-time variation of the spatial horizontal angle value exceeds a predetermined threshold value with regard to the obstacle detected by the obstacle detection unit may be used.

According to this obstacle detection apparatus, by determining the presence or absence of an obstacle based on the image captured by the camera in a case where the value of the spatial horizontal angle or a one-time variation of the spatial horizontal angle value is large with regard to the obstacle detected by the radar, it is possible to reduce false detection of an obstacle.

In the obstacle detection apparatus described above, as the false detection characteristic, a characteristic of detecting that the obstacle is an elevation-view structure by a technique which determines that the obstacle is an elevation-view structure in a case where the intensity of the radio waves received by the reception antenna decreases as the distance from the obstacle decreases may be used.

According to this obstacle detection apparatus, by determining the presence or absence of an obstacle based on the image captured by the camera in a case where it is detected that the obstacle is an elevation-view structure by the technique which determines that the obstacle is an elevation-view structure in a case where the intensity of the radio waves received by the reception antenna decreases as the distance from the obstacle decreases, it is possible to reduce false detection of an obstacle.

In the obstacle detection apparatus described above, as the false detection characteristic, a characteristic of detecting that the obstacle is a downward-view structure by a technique which calculates electric power of the radio waves received by the reception antenna as a function of the distance from the obstacle, calculates the area of a region which is defined using a curve indicating the function as one boundary in a predetermined distance section, and determines that the obstacle is a downward-view structure based on the calculated area may be used.

According to this obstacle detection apparatus, by determining the presence or absence of an obstacle based on the image captured by the camera in a case where it is detected that the obstacle is a downward-view structure by the technique which calculates electric power of the radio waves received by the reception antenna as the function of the distance from the obstacle, calculates the area of the region which is defined using the curve indicating the function as one boundary in the predetermined distance section, and determines that the obstacle is a downward-view structure based on the calculated area, it is possible to reduce false detection of an obstacle.

In the obstacle detection apparatus described above, as the false detection characteristic, a characteristic of detecting that the obstacle is a downward-view structure by a technique which calculates electric power of the radio waves received by the reception antenna as a function of time, calculates the area of a region which is defined using a curve indicating the function as one boundary in a predetermined time section, and determines that the obstacle is a downward-view structure based on the calculated area may be used.

According to this obstacle detection apparatus, by determining the presence or absence of an obstacle based on the image captured by the camera in a case where it is detected that the obstacle is a downward-view structure by the technique which calculates electric power of the radio waves received by the reception antenna as a function of time, calculates the area of the region which is defined using the curve indicating the function as one boundary in the predetermined time section, and determines that the obstacle is a downward-view structure based on the calculated area, it is possible to reduce false detection of an obstacle.

In the obstacle detection apparatus described above, as the false detection characteristic, a characteristic of detecting that the obstacle is an elevation-view structure by a technique which acquires the radio waves received by the reception antenna at a predetermined time interval, calculates electric power of the radio waves as a function of the number of acquisition times, and determines that the obstacle is an elevation-view structure which is disposed at a position higher than an optical axis of the reception antenna based on a plurality of representative points extracted from the function may be used.

According to this obstacle detection apparatus, by determining the presence or absence of an obstacle based on the image captured by the camera in a case where it is detected that the obstacle is an elevation-view structure by the technique which acquires the radio waves received by the reception antenna at the predetermined time interval, calculates electric power of the radio waves as the function of the number of acquisition times, and determines that the obstacle is an elevation-view structure which is disposed at the position higher than the optical axis of the reception antenna based on the plurality of representative points extracted from the function, it is possible to reduce false detection of an obstacle.

In the obstacle detection apparatus described above, in a case where it is determined by the obstacle existence determination unit that the obstacle is present, information relating to the obstacle based on the radio waves received by the reception antenna may be output to an external control unit.

According to this obstacle detection apparatus, by outputting the information relating to the obstacle based on the obstacle detection result in the radar to the external control unit, it is possible to realize a control which uses information with a high accuracy obtained by the radar.

According to a second aspect of the invention, there is provided a program which causes a computer to execute a routine including: a first step of detecting an obstacle based on radio waves received by a reception antenna; a second step of determining the presence or absence of a false detection characteristic, which is set in advance, with regard to the detected obstacle; and a third step of determining, based on an image captured by a camera, the presence or absence of the obstacle on which it is determined that the false detection characteristic is present.

According to this program, by determining the presence or absence of an obstacle based on the image captured by the camera, with regard to the obstacle in which it is determined that the false detection characteristic is present with regard to the obstacle detection result in a radar, it is possible to reduce false detection of an obstacle.

According to the above-described aspects of the invention, it is possible to reduce false detection of an obstacle.

BRIEF DESCRIPTION OF THE DRAWINGS

FIG. 31 is a diagram illustrating comparison of distance characteristics of integrated values for each section in a normal detection target and a low-height detection target.

FIG. 35 is a schematic diagram illustrating the position relationship between a vehicle and an elevation-view structure used for a numerical value simulation.

FIG. 43 is a diagram illustrating a curve obtained by connecting upper extreme values of a curve of the reception power with respect to the distance and an approximation straight line of the upper extreme value curve.

FIG. 57 illustrates a table in which a distance $d_{lm}$ at which a lower extreme value is taken is matched with a height difference $\Delta h$.

DETAILED DESCRIPTION OF THE INVENTION

Hereinafter, embodiments of the invention will be described with reference to the accompanying drawings.

First Embodiment

Figure 1:
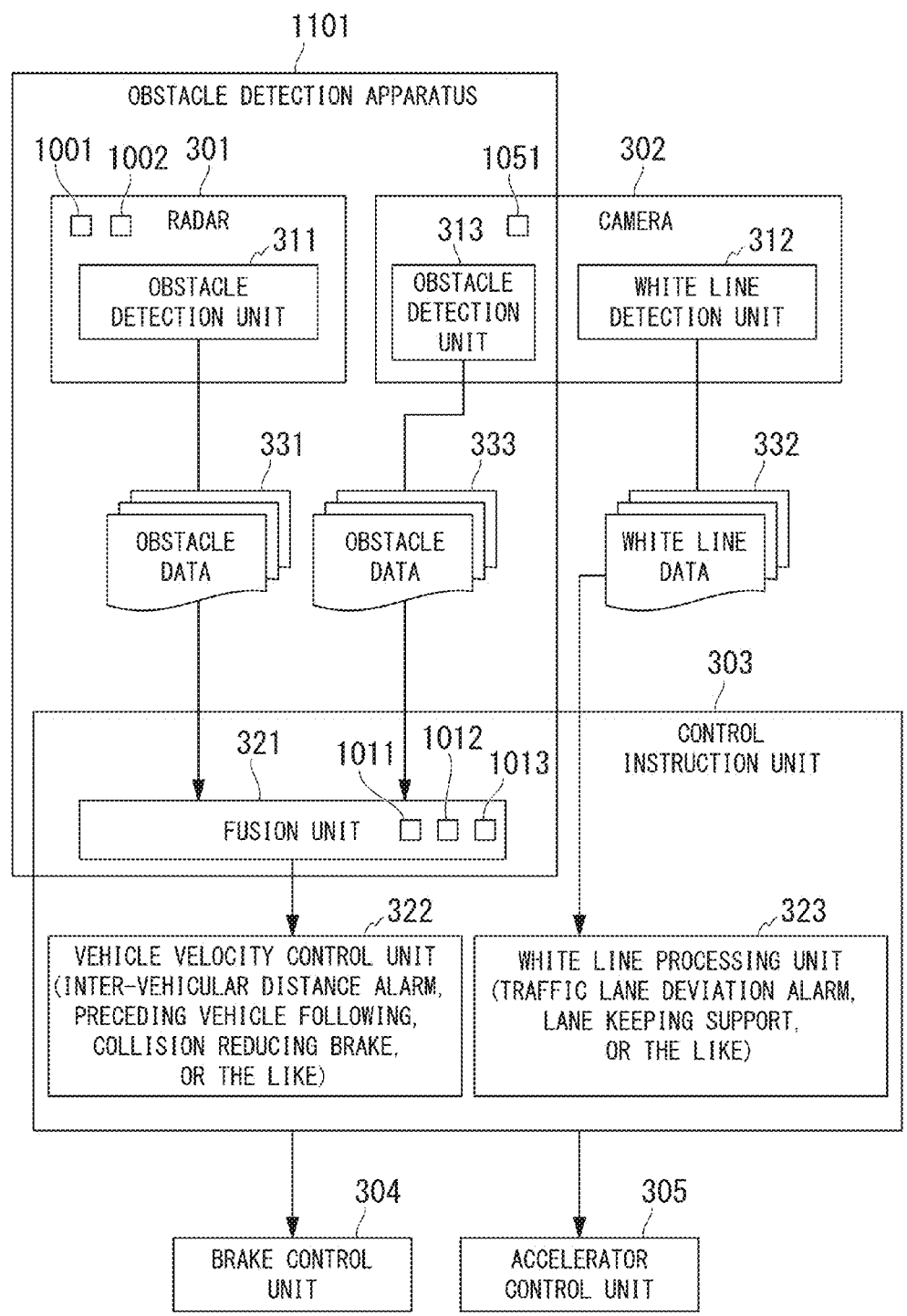
FIG. 1 is a block diagram illustrating a configuration example of a vehicle control system which includes an obstacle detection apparatus according to a first embodiment of the invention.

FIG. 1 is a block diagram illustrating a configuration example of a vehicle control system which includes an obstacle detection apparatus 1101 according to a first embodiment of the invention.

The vehicle control system according to the first embodiment includes a radar 301, a camera 302, a control instruction unit 303, a brake control unit 304, and an accelerator control unit 305.

The radar 301 includes a transmission antenna 1001, a reception antenna 1002, and an obstacle detection unit 311 which outputs obstacle data 331.

The camera 302 includes an imaging unit 1051 which captures an image, a white line detection unit 312 which outputs white line data 332, and an obstacle detection unit 313 which outputs obstacle data 333.

The control instruction unit 303 includes a fusion unit 321, a vehicle velocity control unit 322, and a white line processing unit 323.

The fusion unit 321 includes a false detection determination unit 1011 which has a function of determining the presence or absence of a false detection characteristic which is set in advance with respect to an obstacle detected by the radar 301, an obstacle existence determination unit 1012 which has a function of determining the presence or absence of an obstacle based on the image captured by the camera 302 with respect to the obstacle which is determined to have the false detection characteristic, and a memory 1013 which stores information about the false detection characteristic.

The vehicle velocity control unit 322 includes an inter-vehicular distance alarm function, a preceding vehicle following function, a collision reducing brake function, and the like.

The white line processing unit 323 includes a traffic lane deviation alarm function, a lane keeping support function, and the like.

In the first embodiment, the obstacle detection apparatus 1101 is configured of the transmission antenna 1001 of the radar 301, the reception antenna 1002 and the obstacle detection unit 311, the imaging unit 1051 of the camera 302, and the false detection determination unit 1011 and the obstacle existence determination unit 1012 of the fusion unit 321 of the control instruction unit 303. Furthermore, in the first embodiment, the obstacle data 333 obtained by the obstacle detection unit 313 of the camera 302 is used for determination of the presence or absence of an obstacle by the obstacle existence determination unit 1012, and the obstacle detection unit 313 is also included in the obstacle detection apparatus 1101. Furthermore, in the first embodiment, the presence or absence of the false detection is determined by the false detection determination unit 1011 based on the false detection characteristic information stored in the memory 1013, and the memory 1013 is also included in the obstacle determination apparatus 1101.

Furthermore, in the first embodiment, the radar 301 may have a configuration which is the same as or similar to a radar device shown in any one of FIG. 12 (see first related art which will be described later), FIG. 19 (see second related art which will be described later) or FIG. 34 (see third related art which will be described later), for example. The radar 301 may have a different configuration.

Furthermore, in the first embodiment, the antenna (transmission antenna 1001 or reception antenna 1002) of the radar 301 or the imaging unit 1051 of the camera 302 is mounted in a front portion of the body of a vehicle in a direction where a front situation of the vehicle is detected. In the obstacle detection unit 311 of the radar 301 or the white line detection unit 321 and the obstacle detection unit 313 of the camera 302, a CPU and a memory for performing arithmetic processing may be provided in an arbitrary location of the vehicle.

Firstly, the outline of the vehicle control system according to the first embodiment will be described.

Figure 2:
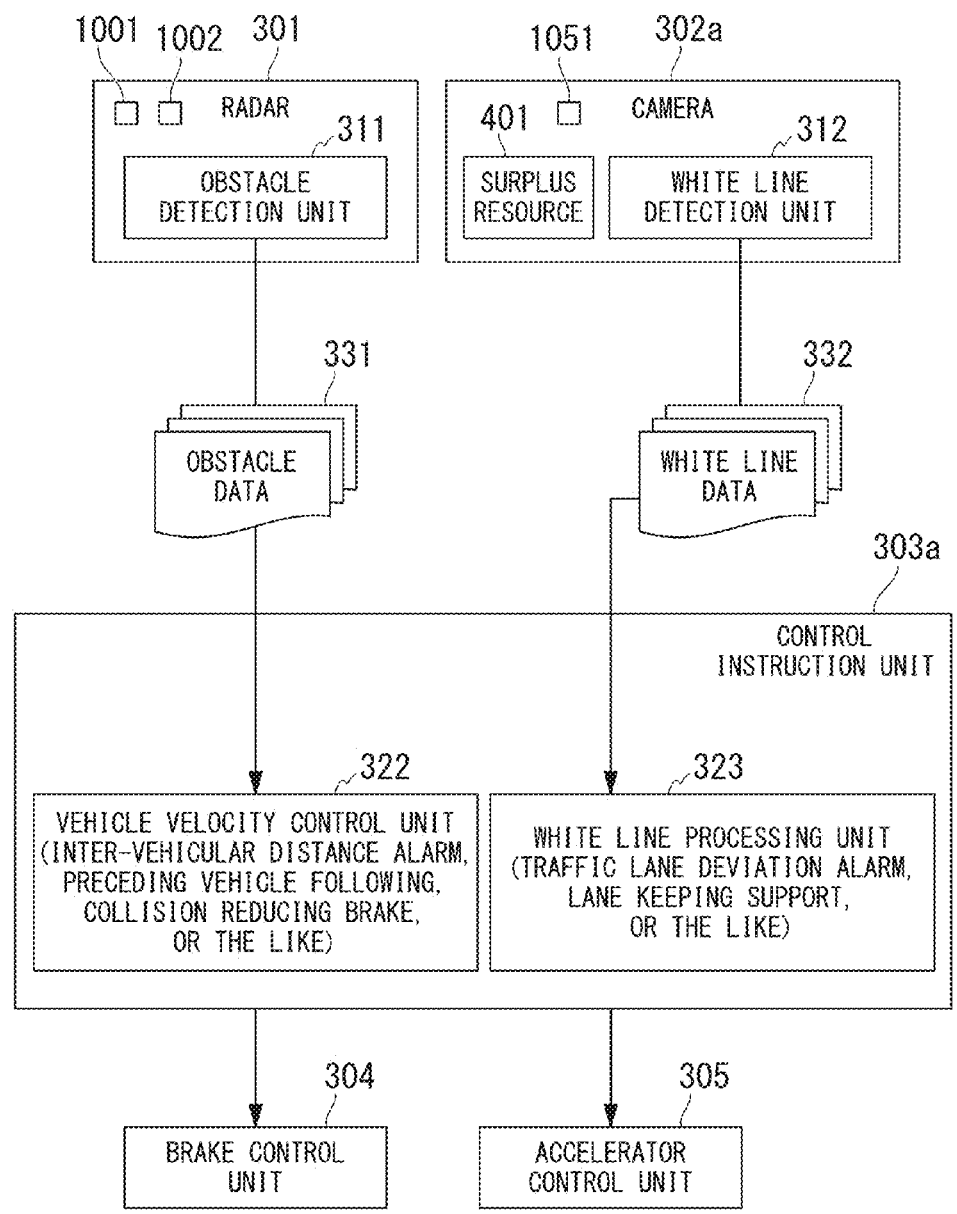
FIG. 2 is a block diagram illustrating a configuration example of a vehicle control system to which the configuration of the first embodiment of the invention is not applied.

FIG. 2 is a block diagram illustrating a configuration example of a vehicle control system to which the configuration of the first embodiment of the invention is not applied.

In the configuration of the vehicle control system shown in FIG. 2, a surplus resource 401 of a camera 302a is not used for obstacle detection, and a fusion unit is not provided in a control instruction unit 303a, compared with the configuration of the vehicle control system according to the first embodiment shown in FIG. 1.

In a case where the configuration of the first embodiment of the invention is applied to the configuration of the vehicle control system shown in FIG. 2, the function of the obstacle detection unit 313 is configured using the surplus resource 401 of the camera 302a, and the function of the fusion unit 321 is configured in the control instruction unit 303a.

Here, the surplus resource 313 is mainly configured of a CPU and a memory.

In the obstacle detection apparatus 1101 according to the first embodiment, by combination of the radar 301 for obstacle detection and the camera 302 for other usages such as white line detection, for example, even in a case where the small surplus resource of the camera 302 is used, it is possible to enhance the obstacle detection performance of the radar 301.

Here, in a case where the obstacle detection performance in the radar only is a reference, in a technique in which the obstacle data is output by the radar and the camera and detection results are simply compared with each other, the obstacle detection performance depends on the camera detection performance, and with the camera detection performance, the effect due to fusion of a plurality of sensors and the detection performance as a system may be reduced.

As a technique which enhances the camera detection performance, a technique of exchanging a monocular camera into a multilocular camera to enhance distance measurement performance, or a technique of introducing a high precision process may be used. However, in this case, the cost may be increased.

Thus, in the first embodiment, there is proposed a technique of performing comparison with the result when the camera 302 is used, only with respect to a portion which is a disadvantage of the radar 301, without loss of an advantage of the radar 301 even using a small camera resource.

In obstacle detection using the radar 301, in principle, as a situation where false detection is considered, a case where a vehicle passes under an elevation-view structure may be set as a "first situation", a case where a vehicle passes above a downward-view structure or a fallen object may be set as a "second situation", a case where right and left virtual images of a vehicle or structure which is present in an adjacent traffic lane are generated may be set as a "third situation", and a case where virtual images due to aliasing are generated may be set as a "fourth situation", for example.

In the first embodiment, only when such a situation is generated in the obstacle detection result in the radar 301, false detection of the radar 301 is corrected by performing comparison with the obstacle detection result in the camera 302.

Specifically, as a situation where false detection of the obstacle in the radar 301 is considered, as an obstacle false detection characteristic in the radar 301, there is a characteristic that "the intensity (level) of a reflected wave from an obstacle is low", a characteristic that "extrapolation data increases with respect to an obstacle", a characteristic that "spatial horizontal angle varies with respect to an obstacle", or the like.

Here, the extrapolation data is data obtained by estimating data with reference to continuity up to the previous detection to insert information (obstacle information), in an obstacle which could not be detected due to any reason in the latest data, for example.

However, such a characteristic is not generated only at the time of false detection of the obstacle. For example, in a case where phases of multi-paths or the like are compensated each other, an intensity lower than a reception intensity derived from an RCS (Radar Cross Section) of a target and a radar equation is obtained, to thereby cause the same detection characteristic as the false detection. In this case, it is difficult to perform obstacle determination using only the radar. In order to prevent an alarm or control operation due to false detection using only the radar, it is necessary to sacrifice an alarm or control ability which is originally desired.

Furthermore, as a situation where false detection of the obstacle in the radar 301 is considered, as another example of an obstacle false detection characteristic in the radar 301, a characteristic that "it is detected that the obstacle is an elevation-view structure by a predetermined technique which is set in advance", or a characteristic that "it is detected that the obstacle is a downward-view structure by a predetermined technique which is set in advance" may be used.

On the other hand, it is sufficient if the camera 302 can reliably determine the presence or absence of an obstacle in a situation where false detection is considered in the radar 301, and performance or position accuracy in other simulations may not cause a problem. For example, low accuracy information having a distance resolution of about 5 to 10 m may be used.

In this manner, in the first embodiment, it is possible to lower the accuracy of the position to be detected based on the image data captured by the camera 302, and thus, the resource of the camera 302 may become small. Thus, for example, even though a new resource for obstacle detection is not prepared, if a surplus resource is only present in a system using the existing camera, it is possible to mount therein the configuration according to the first embodiment.

Furthermore, generally, compared with a camera, a radar (particularly, a millimeter-wave radar) has a strong candidacy and has an advantage that it is capable of detecting an obstacle even in a dark environment. In this regard, in the configuration according to the first embodiment, even in a case where the camera 302 is in a state where it does not function, such as in an environment of heavy rain or a dark environment in which street lamps are not present, a distance measurement function in only the radar 301 is maintained, and thus, it is possible to maintain the function of establishing the system using only the radar 301. Specifically, with only the radar 301, it is possible to maintain functions of an alarm (inter-vehicular distance alarm) which is not subject to a control, a brake control of a low deceleration, an accelerator control (collision reduction brake or preceding vehicle following), and the like.

In the first embodiment, the fusion unit 321 is disposed in the control instruction unit 303; however, if the same function as that of the first embodiment is realized, for example, the fusion unit 321 may be disposed in the radar 301 or the camera 302.

Then, a detailed operation example of the vehicle control system according to the first embodiment will be described.

The radar 301 radiates radio waves through the transmission antenna 1001 and receives reflected waves of the radio waves from a target through the reception antenna 1002 to perform distance measurement.

As an example, it is possible to use one transmission antenna 1001 and a plurality of arrays of reception antennas 1002. As a configuration of the antennas, a different configuration may be used.

As an array antenna which includes a plurality of antenna elements, there is a type in which directivity of the array antenna is changed according to signal processing methods of the plurality of antenna elements, or a type in which directivity of the array antenna is changed by mechanically shaking the plurality of antenna elements.

As a specific example, as the radar 301, an electronic scanning type radar device or a mechanical operation type device may be used. A change in reception power with respect to distance when the mechanical operation type radar device is used is equivalent to change in reception power with respect to distance when the electronic scanning type radar device is used.

In the first embodiment, the obstacle detection unit 311 detects the presence or absence of an obstacle which is present in front of the host vehicle, the distance between the host vehicle and the obstacle, or the relative velocity with respect to the obstacle, and outputs the data to the fusion unit 321 as the obstacle data 331.

Here, as the obstacle data 331, target data which includes position information about the relative longitudinal distance, lateral position, velocity or the like between the host vehicle and the obstacle may be used, for example.

In the camera 302, the imaging unit 1051 captures an image in front of the vehicle.

In the first embodiment, the white line detection unit 312 detects a white line of a road based on data on the captured image, and outputs data relating to the detected white line to the white line processing unit 323 as the white line data 332.

Furthermore, the obstacle detection unit 313 outputs data relating to the obstacle reflected in the image to the fusion unit 321 as the obstacle data 333, based on the captured image data.

In the fusion unit 321, the false detection determination unit 1011 determines whether an obstacle which is present at a short distance in the lane of the host vehicle is detected, based on the obstacle data 331 which is input from the obstacle detection unit 311 of the radar 301. Furthermore, if it is determined that the obstacle which is present at the short distance in the lane of the host vehicle is detected, the false detection determination unit 1011 of the fusion unit 321 determines whether there is an obstacle false detection characteristic with respect to the obstacle.

Here, as a technique of determining whether the obstacle which is present in the lane of the host vehicle is detected, for example, it is determined whether an obstacle which is present in a certain spatial angle in the horizontal direction is detected, with respect to a traveling direction of the host vehicle. In the radar 301, it is possible to detect the position in the horizontal direction.

Furthermore, it is possible to determine the traveling direction of the host vehicle from an angle sensor and the velocity, for example.

Furthermore, as a technique for determining whether an obstacle which is present at the short distance is detected, for example, it is possible to use a technique of determining that the obstacle is at the short distance in a case where the distance between the host vehicle and the obstacle is less than a predetermined threshold value (for example, 30 m or the like).

In the fusion unit 321, in a case where it is determined that the obstacle which is present at the short distance in the lane of the host vehicle is detected based on the obstacle data 331 which is input from the obstacle detection unit 311 of the radar 301, when it is determined that there is an obstacle false detection characteristic with respect to the obstacle, it is determined that the obstacle existence determination unit 1012 detects whether the obstacle which is present in the lane of the host vehicle is detected (presence or absence of an obstacle), based on the obstacle data 333 which is input from the obstacle detection unit 313 of the camera 302.

As a result, in a case where it is determined that the obstacle which is present in the lane of the host vehicle is detected based on the obstacle data 333 which is input from the obstacle detection unit 313 of the camera 302, the obstacle existence determination unit 1012 of the fusion unit 321 determines that the obstacle is a real thing (the obstacle is present), and outputs position information based on the obstacle data 331 which is input from the obstacle detection unit 311 of the radar 301 to the vehicle velocity control unit 322.

In the process of determining whether the obstacle which is present in the lane of the host vehicle is detected based on the obstacle data 333 which is input from the obstacle detection unit 313 of the camera 302, for example, the obstacle existence determination unit 1012 of the fusion unit 321 may detect only the presence or absence of an obstacle, for example.

On the other hand, in a case where it is determined that the obstacle which is present in the lane of the host vehicle is not detected based on the obstacle data 333 which is input from the obstacle detection unit 313 of the camera 302, the obstacle existence determination unit 1012 of the fusion unit 321 determines that the obstacle is a virtual image (the obstacle is not present).

Furthermore, in a case where it is determined that the obstacle is not detected in the lane of the host vehicle, in a case where it is determined that the obstacle is not present at the short distance, or in a case where it is determined that an obstacle false detection characteristic is not present, based on the obstacle data 331 which is input from the obstacle detection unit 311 of the radar 301, the false detection determination unit 1011 of the fusion unit 321 determines that the obstacle is a real thing, and outputs position information based on the obstacle data 331 which is input from the obstacle detection unit 311 of the radar 301 to the vehicle velocity control unit 322.

The vehicle velocity control unit 322 performs a process of performing an inter-vehicular distance alarm, a process of performing a preceding vehicle following, a process of performing a collision reduction brake, or the like based on position information input from the fusion unit 321.

The white line processing unit 323 performs a process of performing a lane deviation alarm, a process of performing a lane keeping support, or the like, based on the white line data 332 which is input from the white line detection unit 312.

When these processes are performed, the vehicle velocity control unit 322 or the white line processing unit 323 outputs a brake control instruction to the brake control unit 304, or outputs an accelerator control instruction to the accelerator control unit 305.

The brake control unit 304 controls a brake according to the instruction from the vehicle velocity control unit 322 or the white line processing unit 323.

The accelerator control unit 305 controls acceleration according to the instruction from the vehicle velocity control unit 322 or from the white line processing unit 323.

In the first embodiment, both of the radar 301 and the camera 302 constantly perform detection, and perform an obstacle detection process for the entire region in an image frame (view angle) with respect to data on the image captured by the camera 302.

Here, a specific example of the obstacle false detection characteristic in the radar 301 will be described.

<First Example of False Detection Characteristic>

There is a characteristic that "the intensity (level) of reflected waves from an obstacle is low".

In the first embodiment, in a case where the intensity of reflected waves from the obstacle (for example, the amplitude level of a reception signal of radio waves) is lower than a predetermined threshold value based on the obstacle data 331 which is input from the obstacle detection unit 311 of the radar 301, the fusion unit 321 determines that there is a false detection characteristic.

In this example, information about the intensity of reflected waves from the obstacle is included in the obstacle data 331.

As the predetermined threshold value which is used to determine whether or not there is a false detection characteristic, an arbitrary value may be used. For example, a value which is slightly higher than the threshold value used to determine whether or not the obstacle is present may be used.

<Second Example of False Detection Characteristic>

There is a characteristic that "extrapolation data increases with respect to an obstacle".

In the first embodiment, in a case where the consecutive number of extrapolation data exceeds a predetermined threshold value with respect to one target (obstacle) based on the obstacle data 331 which is input from the obstacle detection unit 311 of the radar 301, the fusion unit 321 determines that there is a false detection characteristic.

Furthermore, as another example, in a case where the frequency of extrapolation data to the entire data exceeds a predetermined threshold value with respect to one target (obstacle) based on the obstacle data 331 which is input from the obstacle detection unit 311 of the radar 301, the fusion unit 321 determines that there is a false detection characteristic.

In this example, target detection is attempted by the radar 301 at regular time intervals (for example, every 100 ms), and when the target is detected, real data (data which is not extrapolation data) is obtained by the fusion unit 321. For example, in a case where it is estimated that a target is present by tracking, when the target is not detected, extrapolation data is obtained by the fusion unit 321. The extrapolation data is generated by the obstacle detection unit 311 or the fusion unit 321, for example.

<Third Example of False Detection Characteristic>

There is a characteristic that "a spatial horizontal angle varies with respect to an obstacle".

In the first embodiment, in a case where a value of the spatial horizontal angle exceeds a predetermined threshold value with respect to one target (obstacle), based on the obstacle data 331 which is input from the obstacle detection unit 311 of the radar 301, the fusion unit 321 determines that there is a false detection characteristic.

Furthermore, as another example, in a case where the one-time variation of the spatial horizontal angle value exceeds a predetermined threshold value with respect to one target (obstacle), based on the obstacle data 331 which is input from the obstacle detection unit 311 of the radar 301, the fusion unit 321 determines that there is a false detection characteristic.

Furthermore, as still another example, in a case where a spatial horizontal angle value distribution is detected in a predetermined period of time or a predetermined number of times with respect to one target (obstacle) and the distribution deviates from a normal distribution by a predetermined range or more, based on the obstacle data 331 which is input from the obstacle detection unit 311 of the radar 301, the fusion unit 321 can determine that there is a false detection characteristic.

<Fourth Example of False Detection Characteristic>

There is a characteristic that "it is detected that the target is an elevation-view structure by a predetermined technique which is set in advance (technique according to the invention of the first related art which will be described later)".

In the first embodiment, in a case where it is detected that the target is an elevation-view structure by a technique of determining the target to be an elevation-view structure in a case where the intensity of received waves of the radar 301 is reduced as the distance up to the target (obstacle) becomes narrow, as an example, based on the obstacle data 331 which is input from the obstacle detection unit 311 of the radar 301, the fusion unit 321 determines that there is a false detection characteristic.

In this regard, an arbitrary technique in the disclosure according to the first related art which will be described later may be used in combination with the first embodiment. In particular, a technique of determining whether an elevation-view structure is detected may be used.

Furthermore, in the first embodiment, with respect to data on a gray zone which cannot be clearly determined by narrowing down the targets (obstacles) which are considered to be a false detection in the radar 301 by the technique according to the first related art which will be described later, and for example, by subtraction of the threshold value, it is possible to perform determination using the camera 302.

<Fifth Example of False Detection Characteristic>

There is a characteristic that "it is detected that the target is a downward-view structure by a predetermined technique which is set in advance (technique according to the invention of the second related art which will be described later)".

In the first embodiment, in a case where it is detected that the target is a downward-view structure by a technique of calculating electric power of received radio waves of the radar 301 as a function of the distance from the target (obstacle), calculating the area of a region which is defined using a curve indicating the function as one boundary in a predetermined distance section, and determining that the target is a downward-view structure (low-height detection target) based on the calculated area, as an example, based on the obstacle data 331 which is input from the obstacle detection unit 311 of the radar 301, the fusion unit 321 determines that there is a false detection characteristic.

As another example, in a case where it is detected that the target is a downward-view structure by a technique of calculating electric power of received radio waves of the radar 301 as a function of time, calculating the area of a region which is defined using a curve indicating the function as one boundary in a predetermined time section, and determining that the target (obstacle) is a downward-view structure (low-height detection target) based on the calculated area, based on the obstacle data 331 which is input from the obstacle detection unit 311 of the radar 301, the fusion unit 321 determines that there is a false detection characteristic.

An arbitrary technique in the disclosure according to the second related art which will be described later may be used in combination with the first embodiment. In particular, a technique of determining whether a downward-view structure is detected may be used.

Furthermore, in the first embodiment, with respect to data on a gray zone which cannot be clearly determined by narrowing down the targets (obstacles) which are considered to be a false detection in the radar 301 by the technique according to the second related art which will be described later, and for example, by subtraction of the threshold value, it is possible to perform determination using the camera 302.

<Sixth Example of False Detection Characteristic>

There is a characteristic that "it is detected that the target is an elevation-view structure by a predetermined technique which is set in advance (technique according to the invention of the third related art which will be described later)".

In the first embodiment, in a case where it is detected that the target is an elevation-view structure by a technique of acquiring received radio waves of the radar 301 at predetermined time intervals, calculating electric power of the received radio waves as a function of the number of acquisition times, and determining that the target (obstacle) is an elevation-view structure which is disposed at a position higher than an optical axis of the reception antenna 1002 based on a plurality of representative points extracted from the function, as an example, based on the obstacle data 331 which is input from the obstacle detection unit 311 of the radar 301, the fusion unit 321 determines that there is a false detection characteristic.

An arbitrary technique in the disclosure according to the third related art which will be described later may be used in combination with the first embodiment. In particular, a technique of determining whether an elevation-view structure is detected may be used.

Furthermore, in the first embodiment, with respect to data on a gray zone which cannot be clearly determined by narrowing down the targets (obstacles) which are considered to be a false detection in the radar 301 by the technique according to the third related art which will be described later, and for example, by subtraction of the threshold value, it is possible to perform determination using the camera 302.

Furthermore, data processing of the image captured by the camera 302 will be described. The following description is illustrative, and other various technologies may be used.

The white line detection unit 312 determines a road and a white line with respect to the image data, for example, based on luminance, to detect the white line. Thus, it is possible to recognize the lane of the host vehicle.

For example, it is possible to detect the traveling direction of the host vehicle based on a detection result (angle velocity) of a gyro-sensor and a detection result (velocity of the host vehicle) of a velocity sensor.

The obstacle detection unit 313 detects edges of the target (obstacle) based on contrast of the luminance with respect to the image data, for example, to detect the obstacle.

Furthermore, with respect to the elevation-view structure such as an upper bridge or road, as an example, an obstacle which is present above the horizon may be recognized as an elevation-view structure. As another example, an obstacle which is separated from a road surface may be recognized as an elevation-view structure.

Furthermore, with respect to the downward-view structure such as an empty can or manhole, as an example, in a case where it is not possible to detect the height or edges in the horizontal direction since the empty can is small, the obstacle may be recognized as the downward-view structure. As another example, in a case where the detected edges are small since the manhole has a circle shape, the obstacle may be recognized as the downward-view structure.

Furthermore, with respect to an obstacle which is present in a lane (for example, adjacent lane) which is different from a lane in which the host vehicle runs, by detecting a white line of the road or detecting the lane of the host vehicle, it is possible to determine whether or not an obstacle is present in the lane of the host vehicle.

In a case where a plurality of image frames which are close to each other in terms of time are captured, such as a case where a moving image is captured by the camera 302, it is possible to determine whether or not the same object is continuously present in the plurality of image frames, or an object which is not continuously present at a predetermined time (for example, 300 ms) or longer may not be recognized as an obstacle.

Figure 3:
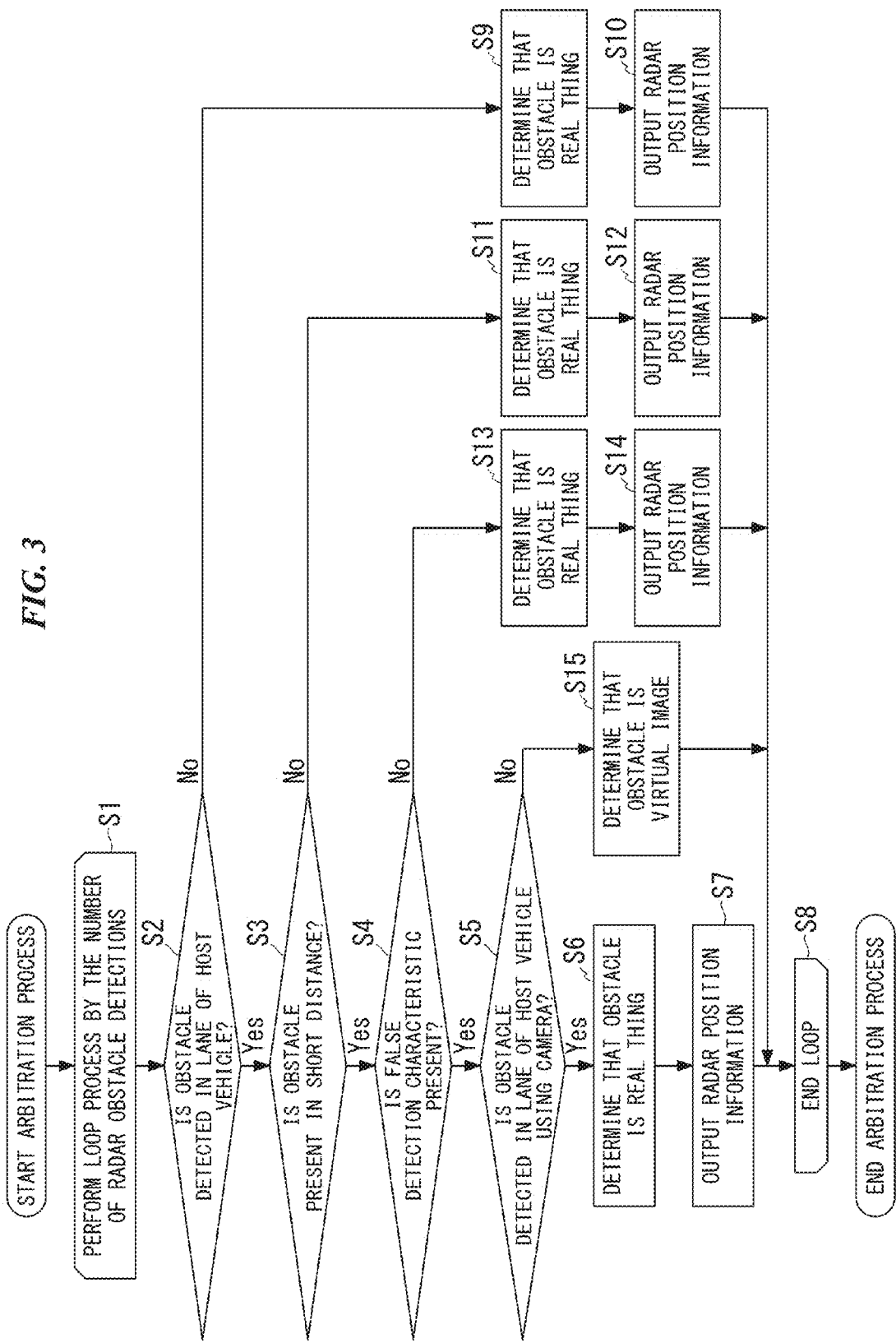
FIG. 3 is a flowchart illustrating an arbitration process performed by a fusion unit.

FIG. 3 is a flowchart illustrating an arbitration process performed by the fusion unit 321.

The arbitration process is performed for each obstacle by a loop process in a case where a plurality of obstacles is detected by the obstacle detection unit 311 of the radar 301 (step S1 and step S8).

Here, a series of processes performed for one obstacle will be described.

Firstly, the false detection determination unit 1011 of the fusion unit 321 determines whether an obstacle is detected in the lane of the host vehicle (step S2). As a result, in a case where it is determined that the obstacle is not detected in the lane of the host vehicle (NO in step S2), the false detection determination unit 1011 of the fusion unit 321 determines that the obstacle is a real thing (step S9), and outputs position information based on the obstacle data 331 which is input from the obstacle detection unit 311 of the radar 301 to the vehicle velocity control unit 322 (step S10).

On the other hand, in a case where it is determined that the obstacle is detected in the lane of the host vehicle (YES in step S2), the false detection determination unit 1011 of the fusion unit 321 determines whether the obstacle is present at a predetermined short distance (step S3). As a result, in a case where it is determined that the obstacle is not present at the predetermined short distance (NO in step S3), the false detection determination unit 1011 of the fusion unit 321 determines that the obstacle is a real thing (step S11), and outputs position information based on the obstacle data 331 which is input from the obstacle detection unit 311 of the radar 301 to the vehicle velocity control unit 322 (step S12).

On the other hand, in a case where it is determined that the obstacle is present at the predetermined short distance (YES in step S3), the false detection determination unit 1011 of the fusion unit 321 determines whether there is a false detection characteristic which is set in advance (step S4). As a result, in a case where it is determined that there is no false detection characteristic (NO in step S4), the false detection determination unit 1011 of the fusion unit 321 determines that the obstacle is a real thing (step S13), and outputs position information based on the obstacle data 331 which is input from the obstacle detection unit 311 of the radar 301 to the vehicle velocity control unit 322 (step S14).

On the other hand, in a case where false detection determination unit 1011 of the fusion unit 321 determines that there is a false detection characteristic which is set in advance (YES in step S4), the obstacle existence determination unit 1012 of the fusion unit 321 determines whether the obstacle is detected in the lane of the host vehicle, based on the obstacle data 333 which is input from the obstacle detection unit 313 of the camera 302 (step S5). As a result, in a case where it is determined that the obstacle is not detected in the lane of the host vehicle based on the obstacle data 333 which is input from the obstacle detection unit 313 of the camera 302 (NO in step S5), the obstacle existence determination unit 1012 of the fusion unit 321 determines that the obstacle is a virtual image (step S15).

On the other hand, in a case where it is determined that the obstacle is detected in the lane of the host vehicle based on the obstacle data 333 which is input from the obstacle detection unit 313 of the camera 302 (YES in step S5), the obstacle existence determination unit 1012 of the fusion unit 321 determines that the obstacle is a real thing (step S6), and outputs position information based on the obstacle data 331 which is input from the obstacle detection unit 311 of the radar 301 to the vehicle velocity control unit 322 (step S7).

As described above, in the obstacle detection apparatus 1101 in the vehicle control system according to the first embodiment, sensor fusion of the radar 301 and the camera 302 is used. Specifically, with respect to the obstacle which is determined that there is a possibility of false detection in the result obtained by the radar 301, the presence or absence of an obstacle is determined based on only the result obtained by the camera 302. Furthermore, in a case where it is determined that the obstacle is really present, control is performed using the information obtained by the radar 301.

In the obstacle detection apparatus 1101 according to the first embodiment, for example, it is possible to reduce false detection due to various causes which are problems of obstacle detection due to the radar 301, using a small resource of the camera 302.

For example, by using a surplus resource of the camera 302 for other usages, new hardware may not be added as the radar 301 and the system, and thus, it is possible to enhance obstacle detection performance without increasing the cost of hardware.

Second Embodiment

Figure 4:
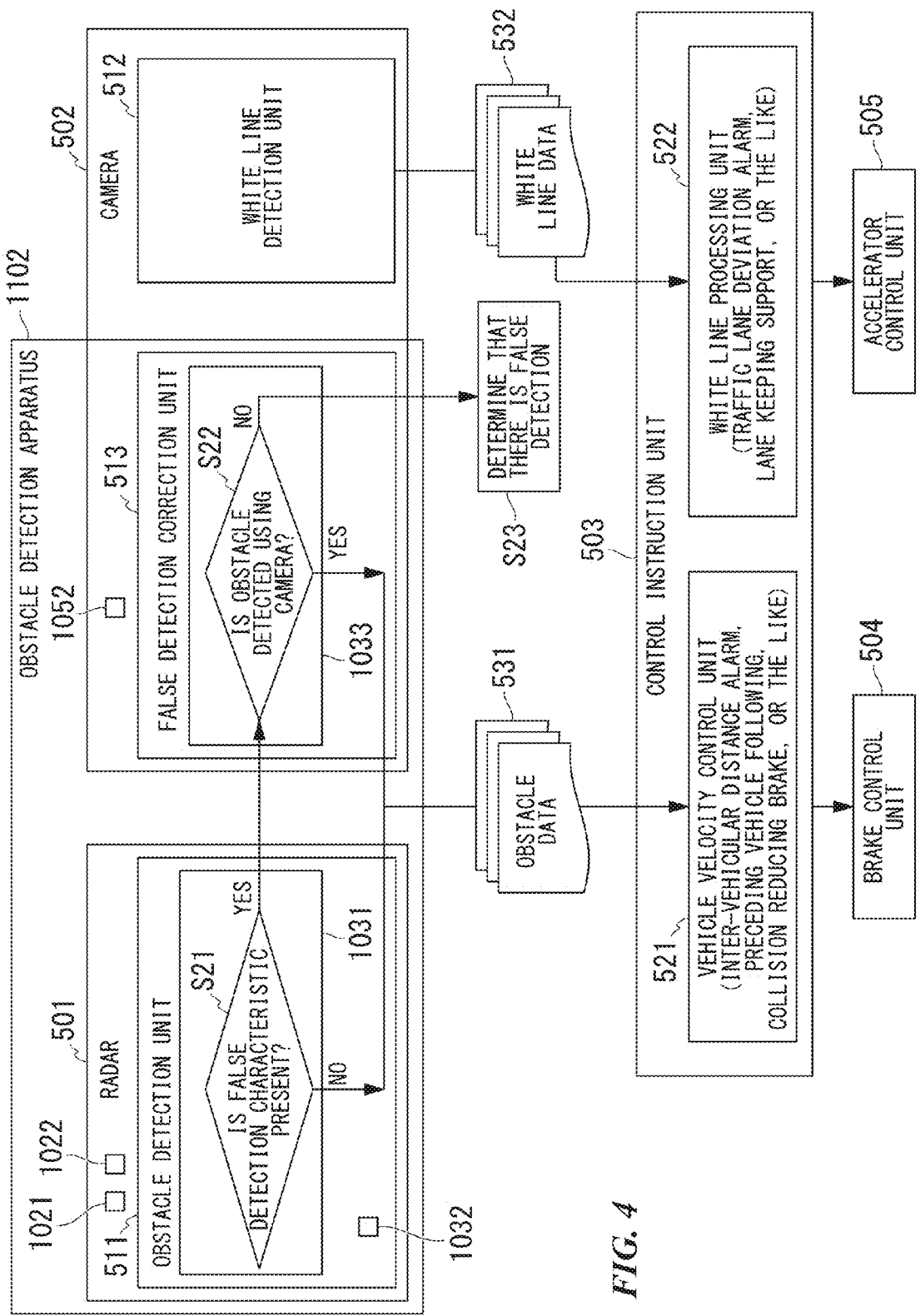
FIG. 4 is a block diagram illustrating a configuration example of a vehicle control system which includes an obstacle detection apparatus according to a second embodiment of the invention.
Figure 5:
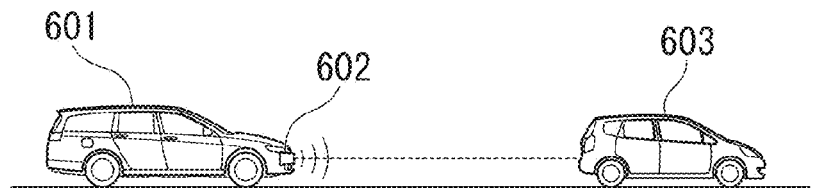
FIG. 5 is a diagram illustrating an example of a situation in which an obstacle is present in front of a host vehicle mounted with a radar in a front portion of a vehicle body.
Figure 6:
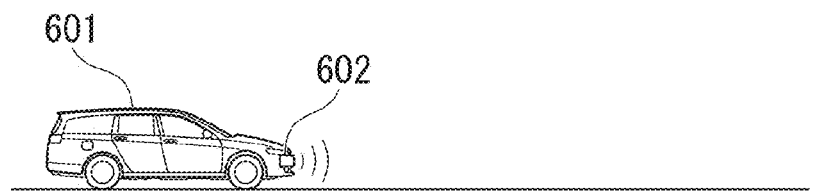
FIG. 6 is a diagram illustrating an example of a situation in which an obstacle is not present in front of a host vehicle mounted with a radar in a front portion of a vehicle body.

FIG. 4 is a block diagram illustrating a configuration example of a vehicle control system which includes an obstacle detection apparatus 1102 according to a second embodiment of the invention.

The vehicle control system according to the second embodiment includes a radar 501, a camera 502, a control instruction unit 503, a brake control unit 504, and an accelerator control unit 505.

The radar 501 includes a transmission antenna 1021, a reception antenna 1022, and an obstacle detection unit 511 which outputs obstacle data 531.

The camera 502 includes an imaging unit 1052 which captures an image, a white line detection unit 512 which outputs white line data 532, and an obstacle correction unit 513.

The control instruction unit 503 includes a vehicle velocity control unit 521 and a white line processing unit 522.

The vehicle velocity control unit 521 includes an inter-vehicular distance alarm function, a preceding vehicle following function, a collision reducing brake function, and the like.

The white line processing unit 522 includes a traffic lane deviation alarm function, a lane keeping support function, and the like.

The obstacle detection unit 511 of the radar 501 includes a false detection unit 1031 which has a function of determining the presence or absence of a false detection characteristic which is set in advance with respect to an obstacle which is detected by the radar 501, and a memory 1032 in which information about the false detection characteristic is stored.

The false detection correction unit 513 of the camera 502 has an obstacle existence determination unit 1033 which has a function of determining the presence or absence of an obstacle based on an image captured by the camera 502 with respect to the obstacle which has determined that there is a false detection characteristic.

In the second embodiment, the obstacle detection apparatus 1102 is configured of the transmission antenna 1021, the reception antenna 1022, the obstacle detection unit 511 and the false detection determination unit 1031 of the radar 501, the imaging unit 1052 of the camera 502, and the obstacle existence determination unit 1033 of the false detection correction unit 513. Furthermore, in the second embodiment, the presence or absence of the false detection is determined using the false detection determination unit 1031 based on the information about the false detection characteristic stored in the memory 1032, and the memory 1032 is also included in the obstacle determination apparatus 1102.

A configurations and operation of the vehicle control system according to the second embodiment are different in the part of the obstacle detection apparatus, compared with the configuration and operation of the vehicle control system shown in FIG. 1 according to the first embodiment, which will be described in detail.

In the obstacle detection unit 511 of the radar 501, the false detection determination unit 1031 determines whether there is a false detection characteristic with respect to a detected obstacle (step S21). If it is determined that there is no false detection characteristic (NO in step S21), the false detection determination unit 1031 outputs the obstacle data 531 to the vehicle velocity control unit 521.

In the second embodiment, the false detection determination unit 1031 of the obstacle detection unit 511 of the radar 501 determines the presence or absence of the false detection characteristic with respect to an obstacle which is present at a short distance in the lane of the host vehicle.

On the other hand, in a case where the false detection determination unit 1031 determines that there is a false detection characteristic (YES in step S21), the obstacle detection unit 511 of the radar 501 notifies the result to the false detection correction unit 513 of the camera 502.

If the obstacle existence determination unit 1033 receives the notification, the false detection correction unit 513 of the camera 502 determines whether an obstacle is detected in the lane of the host vehicle (presence or absence of an obstacle) based on data on the image captured by the camera 502 (step S22).

As a result, in a case where the obstacle is detected in the lane of the host vehicle (it is determined that there is the obstacle) based on the data on the image captured by the camera 502 (YES in step S22), the obstacle existence determination unit 1033 of the false detection correction unit 513 of the camera 502 outputs the obstacle data 531 to the vehicle velocity control unit 521. On the other hand, in a case where the obstacle is not detected in the lane of the host vehicle (NO in step S22), the obstacle existence determination unit 1033 of the false detection correction unit 513 of the camera 502 determines that there is false detection (step S23).

Here, as the obstacle data 531, in the second embodiment, data obtained by the obstacle detection unit 511 of the radar 501 is used.

In the second embodiment, it is possible to perform information exchange between the obstacle detection unit 511 of the radar 501 and the false detection correction unit 513 of the camera 502.

In the second embodiment, the same procedure as in the flowchart shown in FIG. 3 may be used.

Here, in the obstacle detection apparatus 1102 according to the second embodiment, until it is determined that there is an obstacle false detection characteristic by the false detection determination unit 1031 of the obstacle detection unit 511 of the radar 501, the obstacle detection process (process performed by the obstacle existence determination unit 1033) based on the data on the image captured by the camera 502 is not performed, and as it is determined that there is the obstacle false detection characteristic by the false detection determination unit 1031 of the obstacle detection unit 511 of the radar 501, the obstacle detection process (process performed by the obstacle existence determination unit 1033) based on the data on the image captured by the camera 502 is started.

Furthermore, in a case where it is determined that there is the obstacle false detection characteristic by the false detection determination unit 1031 of the obstacle detection unit 511 of the radar 501, the obstacle detection apparatus 1102 according to the second embodiment notifies information about the position or the like of the obstacle to the false detection correction unit 513 of the camera 502 from the obstacle detection unit 511 of the radar 501, and the obstacle existence determination unit 1033 of the false detection correction unit 513 of the camera 502 defines a region in an image frame which is a target which is subject to image processing based on the information.

As a specific example, the distance up to the obstacle is detected by the radar 501, and the obstacle existence determination unit 1033 of the false detection correction unit 513 of the camera 502 can perform the image processing (obstacle detection process) with respect to only a region in the vicinity of the distance in the image frame.

In this manner, in the data on the obstacle detection result of the radar 501, it is possible to narrow down a region where the processing is performed by the camera 502 from the position information (for example, relative distance or relative lateral position) about the obstacle in which the false detection characteristic is present.

Particularly, in the above-mentioned first situation to third situation, it is possible to define a range to be detected in the lane of the host vehicle and at a short distance, and thus, it is possible to define a processing region of the data on the image captured by the camera 502.

As described above, in the second embodiment, it is possible to decrease the image processing region for obstacle recognition by means of the camera 502 or to lower the accuracy of the position to be detected based on the image data captured by the camera 502, and thus, the resource of the camera 502 may become small. Thus, for example, even though a new resource for obstacle detection is not prepared, if a surplus resource is only present in a system using the existing camera, it is possible to mount the configuration according to the second embodiment.

Furthermore, in the second embodiment, compared with the configuration shown in FIG. 1 according to the first embodiment, it is possible to reduce the usage amount of the resource of the camera, in that the obstacle detection process by means of the camera 502 is performed only when there is a false detection characteristic in obstacle detection by means of the radar 501, or in that the image processing region is defined in the obstacle detection process by means of the camera 502.

Furthermore, in the second embodiment, in a similar to the case of the first embodiment, in a situation where the camera 502 does not function, by performing switching so that the obstacle data 531 obtained by the obstacle detection unit 511 of the radar 501 is output as it is, it is possible to maintain a part of a driving support function.

With Respect to the First and Second Embodiments

An information processing function or a part of the function in each embodiment may be realized by a computer. As such an information processing, for example, in the configuration shown in FIG. 1 according to the first embodiment, there are an information processing performed by the obstacle detection unit 311 of the radar 301, an information processing performed by the obstacle detection unit 313 of the radar 302, an information processing performed by the fusion unit 321 (for example, the false detection determination unit 1011 or the obstacle existence determination unit 1012), and the like. Furthermore, in the configuration shown in FIG. 4 according to the second embodiment, there are an information processing performed by the obstacle detection unit 511 of the radar 501 (for example, false detection determination unit 1031), an information processing performed by the false detection correction unit 513 of the camera 502 (for example, obstacle existence determination unit 1033), and the like.

In this case, the various units may be embodied by recording a program for performing the control functions in a computer-readable recording medium and by causing a computer system to read and execute the program recorded in the recording medium. Here, the "computer system" includes an OS or hardware such as peripherals. Examples of the "computer-readable recording medium" include portable mediums such as a flexible disk, a magneto-optical disc, an optical disc, and a memory card, and a memory device such as a hard disk built in the computer system, and the like. Moreover, the "computer-readable recording medium" may include a recording medium dynamically storing a program for a short time like a transmission medium when the program is transmitted via a network such as the Internet or a communication line such as a phone line and a recording medium storing a program for a predetermined time like a volatile memory in a computer system serving as a server or a client in that case. Furthermore, the program may embody a part of the above-mentioned functions, and the program may embody the above-mentioned functions in cooperation with a program previously recorded in the computer system.

While an embodiment of the invention has been described in detail with reference to the drawings, practical configurations are not limited to the above-described embodiment, and design modifications can be made without departing from the scope of this invention.

(Description about the First Related Art)

Firstly, the background art will be described.

Conventionally, generally, a millimeter-wave radar (hereinafter, referred to as a radar) is mounted in a front portion of the body of a vehicle, and is used for an inter-vehicular alarm, a vehicle velocity control, or the like. As a vehicle-mounted radar, an electronic scanning type radar which uses the method of an FMCW (Frequency Modulated Continuous Wave) radar, a multi-frequency CW (Continuous Wave) radar, a pulse radar, or the like is used.

In a case where an obstacle is present in front of the host vehicle mounted with the radar, the radar outputs target data which includes information about a relative distance, direction, velocity or the like between the host vehicle and the obstacle to an inter-vehicular alarm and vehicle velocity control system. The inter-vehicular alarm and vehicle velocity control system performs control of the host vehicle for maintaining the distance between the host vehicle and the obstacle according to position information about the target, generating an alarm or reducing the velocity of the host vehicle in a case where collision is predicted, to perform control of the host vehicle.

Figure 7:
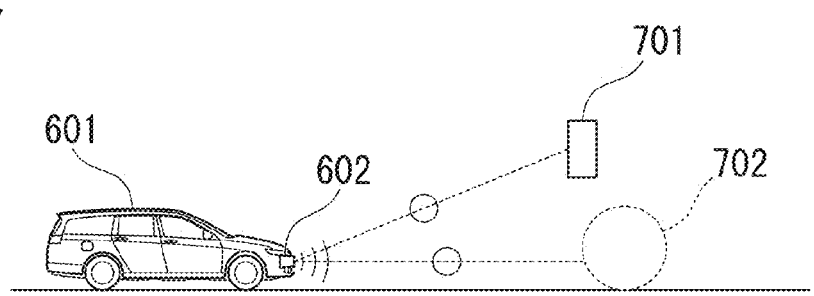
FIG. 7 is a diagram illustrating an example of a situation in which an obstacle is not present and an elevation-view structure is present in front of a host vehicle mounted with a radar in a front portion of a vehicle body.
Figure 8:
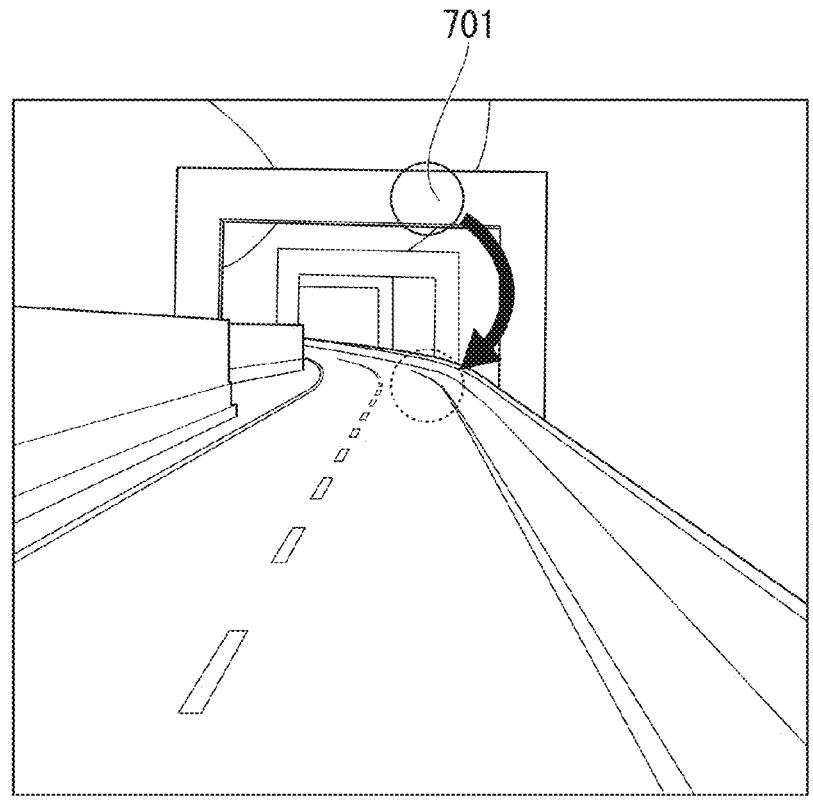
FIG. 8 is a diagram illustrating an example of a scene when viewed from a host vehicle in a case where an obstacle is not present and an elevation-view structure is present in front of the host vehicle mounted with a radar in a front portion of a vehicle body.
Figure 9:
FIG. 9 is a diagram illustrating an example of a situation in which an obstacle is not present and a downward-view structure is present in front of a host vehicle mounted with a radar in a front portion of a vehicle body.
Figure 10:
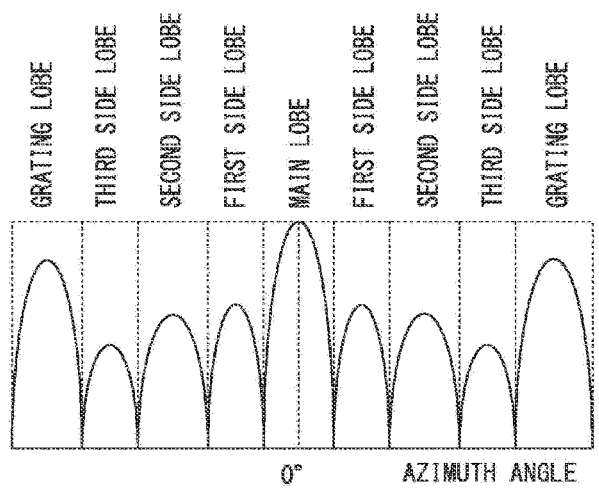
FIG. 10 is a diagram illustrating an example of a beam pattern in an azimuth direction (horizontal direction) in a phase detection type radar.
Figure 11:
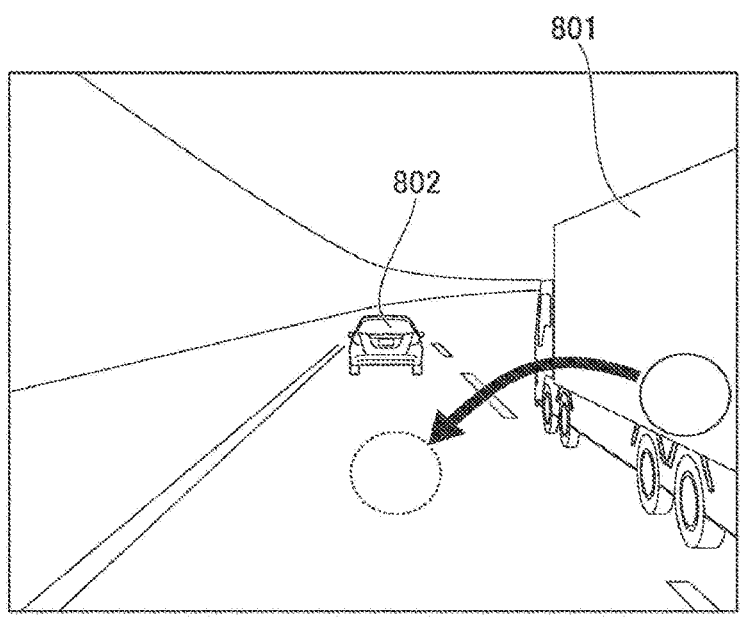
FIG. 11 is a diagram illustrating an example of a scene when viewed from a host vehicle in a case where an obstacle is not present in front of the host vehicle mounted with a radar in a front portion of a vehicle body, and a large-sized truck which causes a virtual image is present in an adjacent lane.

Furthermore, in a case where an obstacle is not present in front of the host vehicle, since the radar does not perform detection at all, the radar does not output target data. In this case, the inter-vehicular alarm and vehicle velocity control system performs control so that the host vehicle runs at a regular velocity which is set in advance. On the other hand, as shown in FIG. 7, in a case where an obstacle 702 is not present and the elevation-view structure 701 (for example, signboard, overhead bridge, bridge pier or the like) is present in front of the host vehicle 601, the elevation-view structure 701 does not hinder cruising of the host vehicle, the inter-vehicular alarm and vehicle velocity control system should perform control so that the host vehicle runs at the regular velocity which is set in advance. However, the vehicle-mounted radar 602 which does not have a vertical resolution may output target data as if the front obstacle is present according to an antenna characteristic and a reflection intensity of the elevation-view structure. Then, the inter-vehicular alarm and vehicle velocity control system generates an alarm or performs a deceleration control although the front obstacle is not present.

Figure 18A:
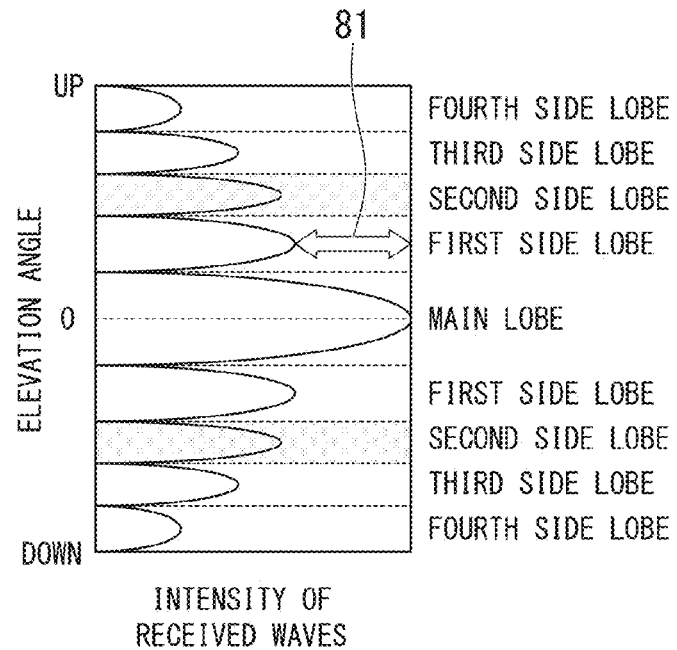
FIGS. 18A, 18B and 18C are diagrams illustrating problems when a vehicle-mounted radar detects an elevation-view structure.

Next, a mechanism of false detection of the elevation-view structure by means of the radar in the related art will be described. FIG. 18A is a diagram illustrating an example of a sensitivity pattern in an elevation angle (EL direction) of a reception antenna of a radar. A ridge which has a peak of the highest signal level around an EL angle of 0 degrees is referred to as a main lobe, and different ridges are referred to as a first side lobe, a second side lobe, a third side lobe and a fourth side lobe as the angle increases. Here, the intensity of received waves means the intensity of a reception signal, and the pattern of ridges of the intensity of the received waves is determined by the wavelength of a signal received by the reception antenna and directionality of the reception antenna. The intensity of the received waves in the first side lobe becomes lower than the intensity of the received waves in the main lobe by the amount indicated by an arrow 81, and the intensities of the received waves of the second side lobe, the third side lobe and the fourth side lobe become lower than the intensity of the received waves in the main lobe.

Figure 18B:
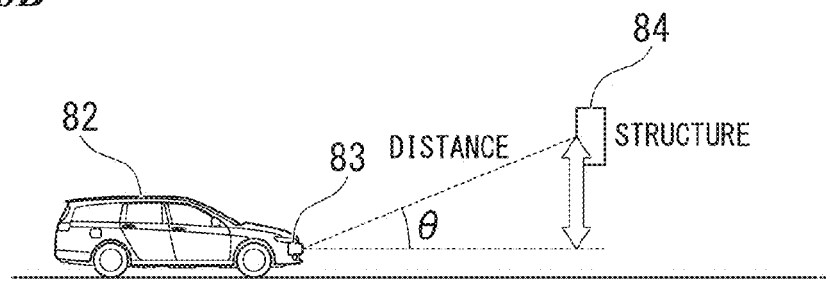

FIG. 18B shows the distance between a radar 83 mounted in a vehicle 82 and an elevation-view structure 84, and an elevation angle θ of the elevation-view structure 84 when viewed from the vehicle-mounted radar 83.

Figure 18C:
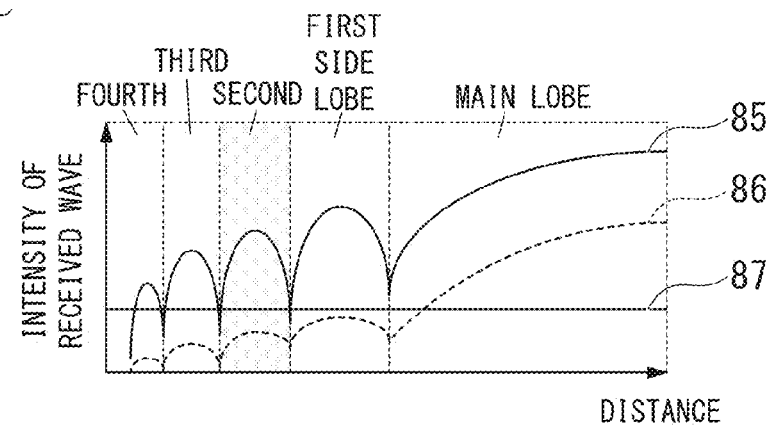

In FIG. 18C, a solid line 85 represents the intensity of received waves in a vehicle-mounted radar of an elevation-view structure having a large reflection coefficient, a dotted line 86 represents the intensity of received waves in a vehicle-mounted radar of an elevation-view structure having a small reflection coefficient, and a solid line 87 represents a threshold value.

Since the height difference between the radar and the elevation-view structure is constant, as the host vehicle, in other words, the radar moves close to the elevation-view structure (that is, as the distance decreases), the elevation angle θ increases, and the reception signal level of the radar becomes low according to the beam pattern shown in FIG. 18A. Specifically, as shown in FIG. 18C, as the elevation-view structure becomes close and the elevation angle increases, lobes which detect reflection signals are deviated in the order of the first side lobe, the second side lobe, the third side lobe and the fourth side lobe from the main lobe.

As indicated by the dotted line 86 of FIG. 18C, if the reflection coefficient of the elevation-view structure is small, as the elevation-view structure is at a short distance and the elevation angle increases, since a reflected signal is detected in the side lobes, the intensity of the received waves becomes lower than the threshold value 87, and thus, the reflected signal cannot be detected and there is no false operation, which is not problematic. However, as indicated by the solid line 85 of FIG. 18C, if the reflection coefficient of the elevation-view structure is large, even though the elevation-view structure is at a short distance and the elevation angle increases, since the intensity of the received waves is higher than the threshold value 87, the reflection signal can be detected even by the intensity of the received waves of the side lobes, which causes a problem.

With respect to the problem, a detection suppressing method using an antenna has been employed so far in order to suppress detection for the elevation-view structure. As an example, a method of reducing side lobes in the elevation angle direction (EL direction) has been proposed. As described above, detection of the elevation-view structure is performed by the main lobe in a far distance; however, it is transited to detection using the side lobes as the distance becomes close. Accordingly, if it is possible to reduce the intensity of received waves of the side lobes, it is possible to reduce detection at the short distance. In order to reduce the intensity of the received waves of the side lobes of the antenna, various techniques such as adjustment of arrangement of a plurality of sub-arrays (see Japanese Patent No. 3942087) have been proposed.

Furthermore, since it is not possible to completely remove the intensity of the received waves of the side lobes, in a case where an elevation-view structure having such a large reflection coefficient as to exceed the reduction amount of the intensity of the received waves of the side lobes is present, it is difficult to suppress detection. Particularly, in a vehicle-mounted radar with a limited antenna size, since the array arrangement is also limited, there is a limit to the effect of intensity reduction of the received waves of the side lobes.

Furthermore, a technique of increasing the number of radar arrays in the vertical direction has been proposed. The antenna in the related art does not have a vertical resolution. Thus, if a plurality of arrays is vertically provided as in the horizontal direction and it is possible to calculate the angle of incoming waves by digital beam forming (DBF) or the like, even though the reception antenna detects the elevation-view structure, it is possible to recognize that the structure is not an obstacle which is present in front. However, problems arise such that the vertical size of the antenna becomes large, a circuit is increased as the number of arrays is increased, and the processing load of an arithmetic unit such as a CPU (Central Processing Unit), a DSP (Digital Signal Processor) and an FPGA (Field Programmable Gate Array) is increased as signal processing is complicated. As described above, in the vehicle-mounted radar for which a small size and low cost are demanded, it is difficult to completely reduce detection of the elevation-view structure using the antenna.

Next, the invention according to the first related art will be described.

To solve the above problem, an object of the invention according to the first related art is to provide an electronic scanning type radar device and a program which determine whether or not a detected target is an elevation-view structure without modification of an antenna.

According to a first aspect of the invention according to the first related art, there is provided an electronic scanning type radar device including: a transmission antenna which transmits waves, a reception antenna which receives waves generated by reflection of the transmitted waves to a target, a reception intensity calculation unit which calculates the intensity of the received waves, a distance detection unit which detects the distance from the target based on the received waves, and an elevation-view structure determination unit which determines that the target is an elevation-view structure in a case where the intensity of the received waves decreases as the distance decreases.

According to the electronic scanning type radar device, in a case where the intensity of the received waves decreases as the distance between the target and the electronic scanning type radar device decreases, the target may be determined to be an elevation-view structure.

In the electronic scanning type radar device, in a case where a plurality of sets of the distance and the intensity of the received waves is approximated using a linear function, the slope of the linear function is calculated, and the slope is positive, the elevation-view structure determination unit may determine that the target is an elevation-view structure.

According to the electronic scanning type radar device, in a case where the plurality of sets of the distance between the electronic scanning type radar device and the target and the intensity of the received waves are linearly approximated and the slope of the approximation straight line is positive, it is possible to determine that the target is an elevation-view structure.

In the electronic scanning type radar device, in a case where the plurality of sets of the distance and the intensity of the received waves are approximated using a linear function, the slope of the linear function is calculated, and the slope is larger than a threshold value, the elevation-view structure determination unit may determine that the target is an elevation-view structure.

According to the electronic scanning type radar device, in a case where the plurality of sets of the distance between the electronic scanning type radar device and the target and the intensity of the received waves are linearly approximated and the slope of the approximation straight line is larger than a threshold value, it is possible to determine that the target is an elevation-view structure.

In the electronic scanning type radar device, in a case where the plurality of sets of the distance and the intensity of the received waves are approximated using an approximate curve and the value of the approximate curve decreases as the distance decreases, the elevation-view structure determination unit may determine that the target is an elevation-view structure in a certain case.

According to the electronic scanning type radar device, in a case where the plurality of sets of the distance between the electronic scanning type radar device and the target and the intensity of the received waves are approximated using a curve and the value of the approximate curve decreases as the distance decreases, it is possible to determine that the target is an elevation-view structure.

In the electronic scanning type radar device, in a case where the intensity of the received waves increases or stays constant as the distance decreases, the elevation-view structure determination unit may determine that the target is a forward-view structure.

According to the electronic scanning type radar device, in a case where the intensity of the received waves increases or stays constant as the distance between the electronic scanning type radar device and the target decreases, it is possible to determine that the target is a forward-view structure.

In the electronic scanning type radar device, in a case where the plurality of sets of the distance and the intensity of the received waves are approximated using a linear function, the slope of the linear function is calculated, and the slope is negative or zero, the elevation-view structure determination unit may determine that the target is a forward-view structure.

According to the electronic scanning type radar device, in a case where the plurality of sets of the distance between the electronic scanning type radar device and the target and the intensity of the received waves are linearly approximated and the slope of the approximation straight line is negative or zero, it is possible to determine that the target is a forward-view structure.

In the electronic scanning type radar device, in a case where the plurality of sets of the distance and the intensity of the received waves is approximated using a linear function, the slope of the linear function is calculated, and the slope is equal to or lower than a threshold value, the elevation-view structure determination unit may determine that the target is a forward-view structure.

According to the electronic scanning type radar device, in a case where the plurality of sets of the distance between the electronic scanning type radar device and the target and the intensity of the received waves are linearly approximated and the slope of the approximation straight line is equal to or lower than the threshold value, it is possible to determine that the target is a forward-view structure.

In the electronic scanning type radar device, in a case where the plurality of sets of the distance and the intensity of the received waves are approximated using an approximate curve and the value of the approximate curve increases or stays constant as the distance decreases, the elevation-view structure determination unit may determine that the target is a forward-view structure.

According to the electronic scanning type radar device, in a case where the plurality of sets of the distance between the electronic scanning type radar device and the target and the intensity of the received waves are approximated using a curve and the value of the approximate curve increases or stays constant as the distance between the target and the electronic scanning type radar device decreases, it is possible to determine that the target is a forward-view structure.

In the electronic scanning type radar device, in a case where the intensity of the received waves increases or stays constant as the distance decreases, the elevation-view structure determination unit may determine that the target is a forward-view structure.

According to the electronic scanning type radar device, in a case where the intensity of the received waves decreases as the distance between the electronic scanning type radar device and the target decreases, it is possible to determine that the target is an elevation-view structure, and in a case where the intensity of the received waves increases or stays constant, the target may be determined to be a forward-view structure.

The electronic scanning type radar device may further include a direction detection unit which detects the direction of the target from the intensity of the received waves, and a target linking unit which links the target detected at the previous cycle and the target detected at the current cycle based on the distance and the direction.

According to the electronic scanning type radar device, it is possible to distinguish a plurality of targets by linking the target extracted at the previous cycle and the target extracted at the current cycle from the distance between the electronic scanning type radar device and the target and the direction of the target, and to determine whether or not the target is an elevation-view structure or a forward-view structure for each target.

According to a second aspect of the invention according to the first related art, there is provided a program which causes a computer to execute a routine including: a first step of calculating the intensity of received waves received by a reception antenna, a second step of detecting the distance from the target based on the received waves, and a third step of determining that the target is an elevation-view structure in a case where the intensity of the received waves decreases as the distance decreases.

According to the program, in a case where the intensity of the received waves decreases as the distance between the electronic scanning type radar device and the target decreases, it is possible to determine that the target is an elevation-view structure.

According to the invention according to the first related art, it is possible to determine whether or not the detected target is an elevation-view structure without modification of the antenna.

Embodiment 1-1

Hereinafter, an electronic scanning type radar device (FMCW type millimeter-wave radar) according to an embodiment of the invention according to the first related art will be described with reference to the accompanying drawings. FIG. 12 is a block diagram illustrating a configuration example of the embodiment.

In the figure, an electronic scanning type radar device according to the embodiment 1-1 includes reception antennas 11 to 1n, mixers 21 to 2n, a transmission antenna 3, a distributor 4, filters 51 to 5n, a SW (switch) 6, an ADC (A/D converter) 7, a control unit 8, a triangular wave generating unit 9, a VCO (Voltage Controlled Oscillator) 10, and a signal processing unit 20.

The signal processing unit 20 includes a memory 21, a reception intensity calculation unit 22, a DBF detection unit 23, a distance detection unit 24, a velocity detection unit 25, a direction settling unit 26, a target linking unit 27, an elevation-view structure determination unit 28 and a target output unit 29.

Then, an operation of the electronic scanning type radar device according to the embodiment 1-1 will be described with reference to FIG. 12.

The reception antennas 11 to 1n receive reflected waves which are generated by reflection of transmitted waves to a target and come from the target, that is, received waves.

Each of the mixers 21 to 2n mixes the transmitted waves transmitted from the transmission antenna 3 with a signal obtained by amplifying the received waves received through each of the reception antennas 11 to 1n by an amplifier, to generate a beat signal corresponding to each frequency difference.

The transmission antenna 3 transmits a transmission signal obtained by frequency-modulating, in the VCO 10, a triangular wave signal generated in the triangular wave generating unit 9 to the target as the transmitted waves.

The distributor 4 distributes the frequency-modulated transmission signal from the VCO 10 to the mixers 21 to 2n and the transmission antenna 3.

The respective filters 51 to 5n perform band limiting with respect to beat signals of Ch1 to Chn corresponding to the respective reception antennas 11 to 1n which are respectively generated in the mixers 21 to 2n, and output the band-limited beat signals to the SW (switch) 6.

The SW 6 sequentially switches the beat signals of Ch1 to Chn corresponding to the respective reception antennas 11 to 1n passed through the respective filters 51 to 5n according to sampling signals input from the control unit 8, and outputs the result to the ADC (A/D converter) 7.

The ADC 7 performs A/D conversion for the beat signals of Ch1 to Chn corresponding to the respective reception antennas 11 to 1n input in synchronization with the sampling signals from the SW 6, in synchronization with the sampling signals, for conversion to digital signals, and sequentially stores the result in a waveform storage region of the memory 21 in the signal processing unit 20.

Figure 12:
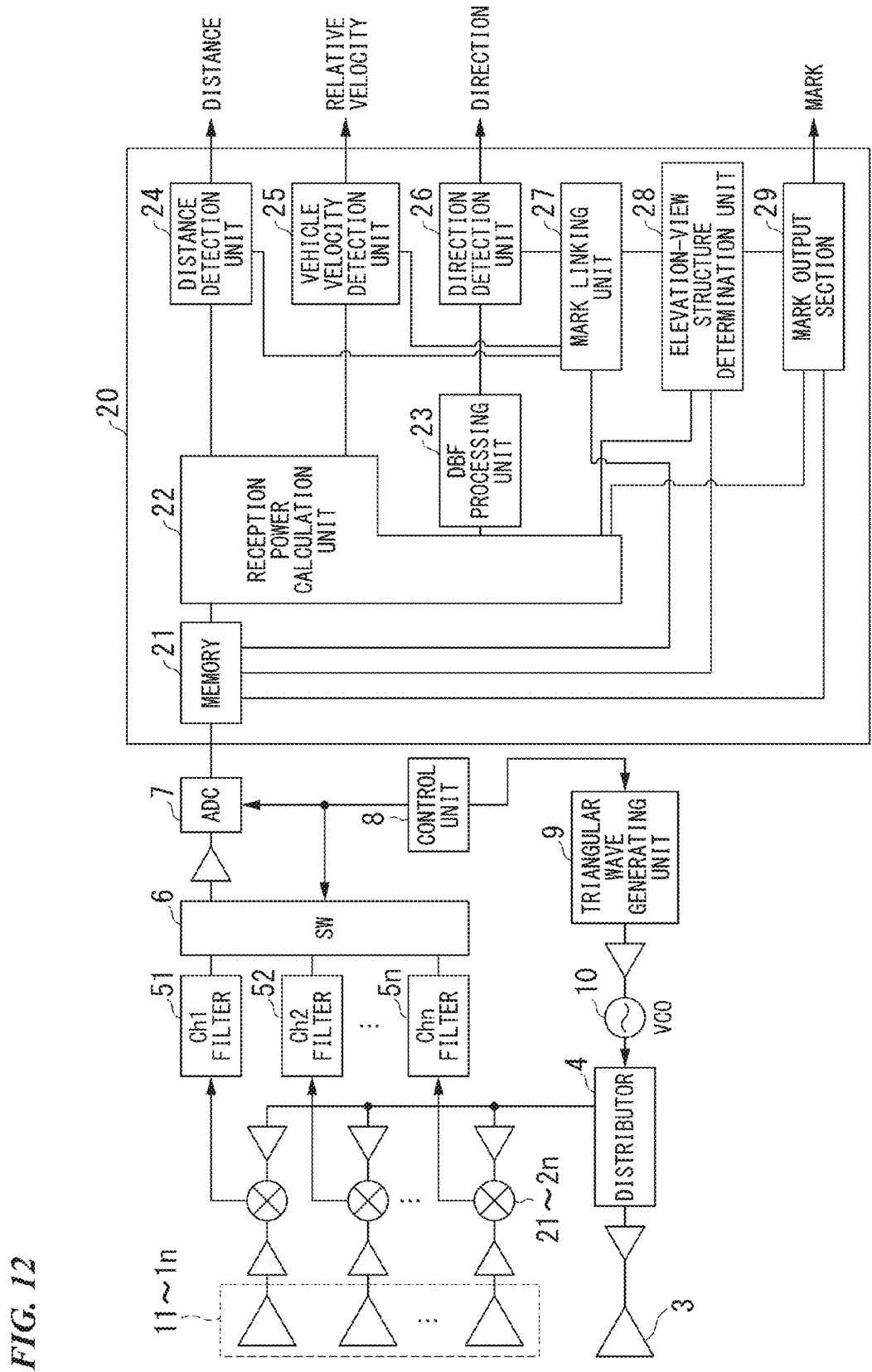
FIG. 12 is a block diagram illustrating a configuration example of an electronic scanning type radar device which is an embodiment of the invention according to first related art.

The control unit 8 is configured of a microcomputer or the like, and performs the entire operation of the electronic scanning type radar device shown in FIG. 12 based on a control program which is stored in a ROM (not shown) or the like.

The memory 21 in the signal processing unit 20 stores the digital signals which are digital-converted in the A/D converter 7 in respective channels corresponding to the respective reception antennas 11 to 1n.

<Detection Principle of Distance, Relative Velocity and Horizontal Angle (Direction)>

Next, a principle of detecting the distance, relative velocity and horizontal angle (direction) between the electronic scanning type radar device and the target which are used in the signal processing unit 20 in the embodiment 1-1 will be briefly described with reference to FIGS. 13A and 13B.

Figure 13A:
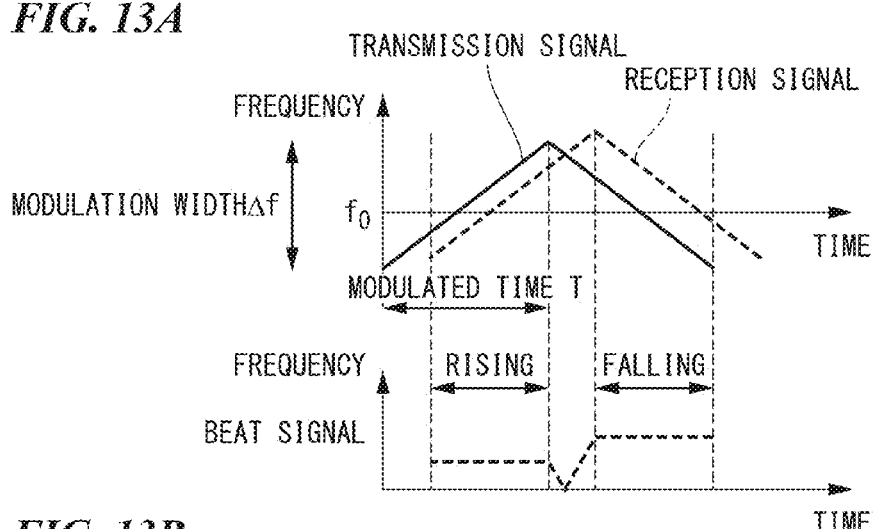
FIGS. 13A and 13B are conceptual diagrams illustrating generation of beat signals in an ascending region and a descending region of triangular waves by transmission waves and reception waves.
Figure 13B:
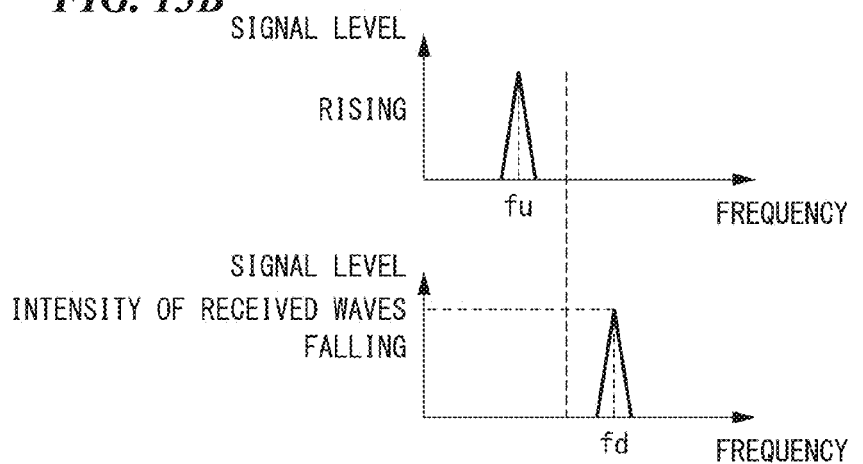

FIGS. 13A and 13B show a transmission signal obtained by frequency-converting a signal generated by the triangular wave generating unit 9 in FIG. 12 at a central frequency $f_0$ and a modulation width $\Delta f$ in the VOC 10 and a state where the transmission signal is reflected from a target and is input as a reception signal. In the example of FIGS. 13A and 13B, the number of targets is one.

As shown in FIG. 13A, a reception signal which corresponds to reflected waves from the target is delayed and received in the right direction (time delay direction) according to the distance between the radar and the target, with respect to the transmission signal.

Furthermore, the reception signal fluctuates in the vertical direction (frequency direction) due to the Doppler effect according to the relative velocity to the target, with respect to the transmission signal.

The reception intensity calculation unit 22 performs Fourier transform for the beat signals (down in FIG. 13A) in the respective channels corresponding to the respective reception antennas 11 to 1n which are stored in the memory 21. Here, the amplitude of complex data after Fourier transform is referred to as a signal level. By using frequency spectrum with respect to complex data in a certain antenna or added values of complex data in all the antennas, the reception intensity calculation unit 22 may detect the presence of the target depending on a beat frequency corresponding to each peak value of the spectrum, that is, the distance. Here, by the addition of the complex data on all the antennas, noise components are averaged to enhance the ratio of S/N.

As a result of Fourier transform, as shown in FIG. 13B, in a case where a single target is present, one peak value is present in an ascending region and a descending region, respectively. Here, in FIG. 13B, the transverse axis represents frequency and the longitudinal axis represents signal intensity.

Furthermore, by detecting a signal level which exceeds a numerical value (threshold value) which is set in advance from the signal level for each beat frequency shown in FIG. 13B, the reception intensity calculation unit 22 determines that a target is present. Here, the peak value of the signal level is referred to as the intensity of the received waves.

In a case where the peak of the signal level is detected, the reception intensity calculation unit 22 outputs a beat frequency of the peak value (both of an upper portion and a lower portion of the beat signal) to the distance detection unit 24 and the vehicle velocity detection unit 25 as a target frequency. The reception intensity calculation unit 22 outputs the frequency modulation width $\Delta f$ to the distance detection unit 24, and outputs the central frequency $f_0$ to the vehicle velocity detection unit 25. Furthermore, the reception intensity calculation unit 22 outputs the peak value of the lower portion of the signal level to the elevation-view structure determination unit 28.

In a case where the peak of the signal level cannot be detected, the reception intensity calculation unit 22 outputs information that a target candidate is not present to the target output unit 29.

In this regard, the peak value of the upper portion of the beat signal or the average of the peak value of the upper portion of the beat signal and the peak value of the lower portion of the beat signal may be used as the signal level.

In a case where a plurality of targets is present, after Fourier transform, peaks of the same number as that of the targets appear in the upper portion and the lower portion of the beat signal, respectively. Since the reception signal is delayed in proportion to the distance between the radar and the target and the reception signal in FIG. 13A is shifted in the right direction, as the distance between the radar and the target increases, the frequency of the beat signal decreases.

In a case where a plurality of peaks of the signal level are detected corresponding to the plurality of targets, numbering is performed for the respective peak values in the upper portion and the lower portion in the ascending order of frequency, to be output to the elevation-view structure determination unit 28. Here, the peaks having the same number in the upper and lower portions correspond to the same targets, and respective identification numbers are used as the numbers of the targets.

Next, the distance detection unit 24 calculates a distance r from a target frequency $f_u$ corresponding to the ascending portion input from the reception intensity calculation unit 22 and a target frequency $f_d$ corresponding to the descending portion, using the following equation, and outputs the result to the target linking unit 27.

$$r=\{C \cdot T/(2 \cdot \Delta f)\} \cdot \{(f_u+f_d)/2\}$$

Furthermore, the vehicle velocity detection unit 25 calculates a relative velocity v from the target frequency $f_u$ corresponding to the ascending portion input from the reception intensity calculation unit 22 and the target frequency $f_d$ corresponding to the descending portion, using the following equation, and outputs the result to the target linking unit 27.

$$v=\{C/(2 \cdot f_0)\} \cdot \{(f_u-f_d)/2\}$$

In the equations of calculating the distance r and the relative velocity v, C represents a light velocity, T represents a modulation time (ascending portion/descending portion), $f_u$ represents a target frequency in the ascending portion, and $f_d$ represents a target frequency in the descending portion.

Figure 14:
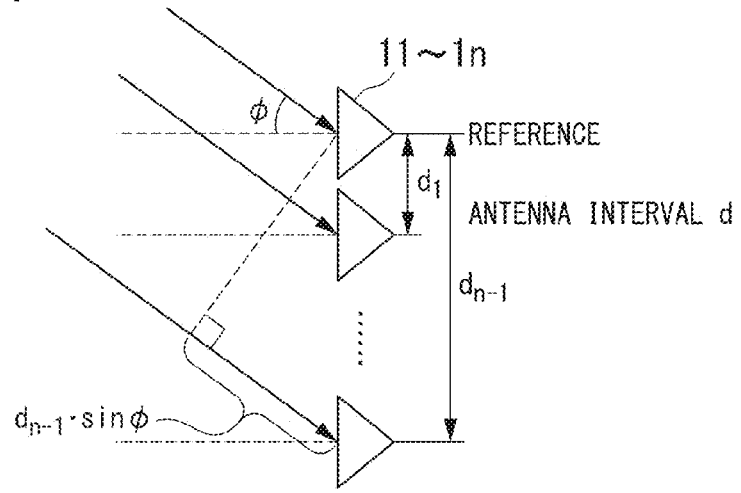
FIG. 14 is a diagram illustrating a method of calculating an incoming angle of reflected waves with respect to an axis perpendicular to a surface on which a plurality of antennas is arranged.

Next, the reception antennas 11 to 1n according to the embodiment 1-1 are array-shaped antennas which are arranged at an interval d, as shown in FIG. 14. Incoming waves from the target (incident waves, that is, waves reflected from the target with respect to waves transmitted from the transmission antenna 3), which are incident in the direction of an angle $\phi$ with respect to an axis perpendicular to a surface on which the antennas are arrayed, are input to the reception antennas 11 to 1n. Here, the incoming waves are received at the same angle $\phi$ in the reception antennas 11 to 1n. A phase difference of reception signals which are generated between the reception antennas at one end and the other end is calculated by $2\pi f \cdot (d_{n-1} \cdot \sin \phi/C)$, using frequencies f of the reception signals, an interval $d_{n-1}$ between the reception antennas at one end and the other end, and the angle $\phi$.

Using the phase difference, the DBF (digital beam forming) processing unit 23 performs further Fourier transform in the antenna array direction for input complex data which is Fourier-transformed on the time axis corresponding to each antenna, that is, performs Fourier transform on the spatial axis. Furthermore, the DBF processing unit 23 calculates spatial complex data indicating the intensity of spectrum for each angle channel corresponding to the angle resolution, and outputs the result to the direction detection unit 26 for each beat frequency.

The direction detection unit 26 outputs an angle $\phi$ which takes the largest value from among the sizes of the calculated spatial complex data values for each beat frequency to the target linking unit 27 as a direction where the target is present.

In a case where absolute values of respective differences between the values of the distance, relative velocity and direction of the target which are currently calculated and the values of the distance, relative velocity and direction of the target which are calculated before one cycle and read from the memory 21 are smaller than values which are determined with respect to the respective values, the target linking unit 27 determines that the target which is detected before one cycle and the currently detected target are the same. In this case, the target linking unit 27 increases the number of target linking processes of the target read from the memory 21 by 1.

In a case where the absolute values are not smaller than the determined values, the target linking unit 27 considers that a new target is detected. Furthermore, the target linking unit 27 stores the current distance, relative velocity and direction of the target, and the number of target linking processes of the target in the memory 21. Furthermore, the target linking unit 27 outputs an identification number of the target to the elevation-view structure determination unit 28.

<Elevation-View Structure Determination Algorithm>

Figure 15A:
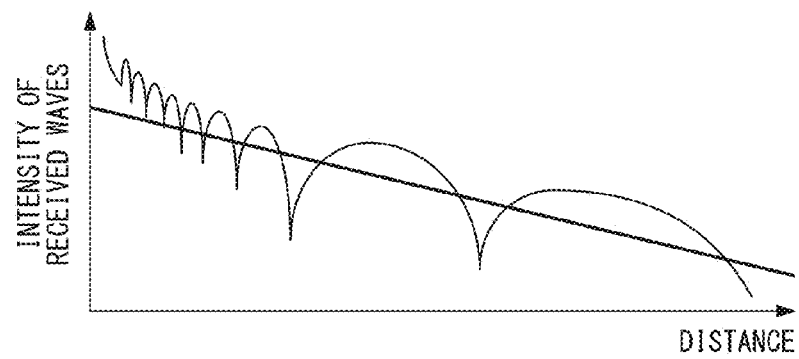
FIG. 15A is a diagram illustrating a distance characteristic of the intensity of received waves of an obstacle which is present in front.

Next, an elevation-view structure determination algorithm in the elevation-view structure determination unit 28 will be described with reference to FIGS. 15A and 15B. A curve in FIG. 15A represents a characteristic of a peak value of a signal level and the distance between a vehicle-mounted radar and an obstacle which is present in front when it is considered that the heights of the radar and the obstacle which is present in front are approximately the same, and a straight line in FIG. 15A represents a linear approximation straight line of the curve. Since the heights of the vehicle-mounted radar and the obstacle are approximately the same, the reception antenna 1n detects waves reflected from the obstacle using the main lobe of the EL beam pattern. As the reflected waves are reflected over a plurality of times and detected (multi-passed) using the reception antenna, the intensity of the received waves deteriorates; however, the curve in FIG. 15A has a general tendency in which the intensity of the received waves is low at a far distance and the intensity of the received waves is high at a short distance, due to distance attenuation of a signal which is transmitted and then returns by reflection from the target.

Figure 15B:
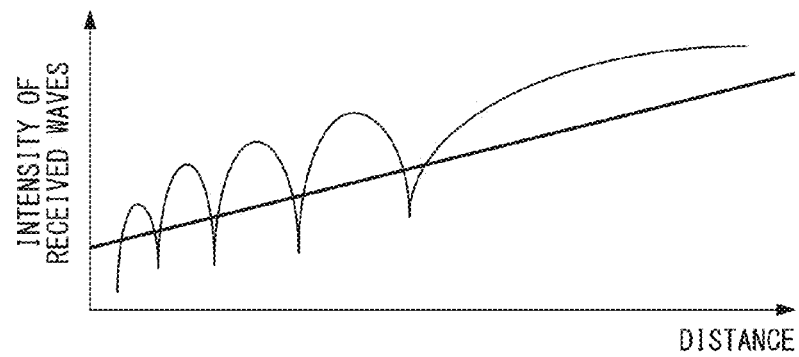
FIG. 15B is a diagram illustrating a distance characteristic of the intensity of received waves of an elevation-view structure.

On the other hand, FIG. 15B shows a characteristic curve of the distance of the elevation-view structure and the intensity of received waves, and a linear approximation straight line of the curve. Since the elevation-view structure is present at a high place compared with the height of the vehicle-mounted radar, in a case where the distance between the vehicle-mounted radar and the obstacle which is present in front increases, the reception antenna 1n performs detection using the main lobe of the EL beam pattern. On the other hand, as the host vehicle moves forward the distance between the vehicle-mounted radar and the obstacle which is present in front is short, the elevation angle θ increases, and thus, the intensity of the received waves of the reception antenna 1n tends to be decreased according to the EL beam pattern of the reception antenna 1n shown in FIG. 18A. Thus, when viewed from the overall curve in FIG. 15B, the intensity of the received waves tends to be increased in a case where the distance between the vehicle-mounted radar and the obstacle which is present in front increases, and the intensity of the received waves tends to be decreased in a case where the distance is short.

As shown in FIG. 15A, if the slope of the linear approximation straight line is negative or zero when the linear approximation is performed for data on the distance between the vehicle-mounted radar and the target and the intensity of the received waves, the elevation-view structure determination unit 28 determines that the target is an obstacle (forward-view structure) which is present on a path on which the host vehicle runs. On the other hand, as shown in FIG. 15B, if the slope of the linear approximation straight line is positive when the linear approximation is performed for the data on the distance between the vehicle-mounted radar and the target and the intensity of the reception waves, the elevation-view structure determination unit 28 determines that the target is an elevation-view structure.

In order to calculate the slope, the elevation-view structure determination unit 28 calculates intermediate data used when the linear approximation is performed using a least squares method. Specifically, if the approximation straight line when n data (x1, y1), (x2, y2), . . . , and (xn, yn) is obtained is expressed as y=ax+b, a slope "a" and an intercept "b" are calculated by the following equations.

$$a = \frac{n \sum_{i=1}^{n} x_i y_i - \sum_{i=1}^{n} x_i \sum_{i=1}^{n} y_i}{n \sum_{i=1}^{n} x_i^2 - \left(\sum_{i=1}^{n} x_i\right)^2} \quad (1)$$

$$b = \frac{\sum_{i=1}^{n} x_i^2 \sum_{i=1}^{n} y_i - \sum_{i=1}^{n} x_i y_i \sum_{i=1}^{n} x_i}{n \sum_{i=1}^{n} x_i^2 - \left(\sum_{i=1}^{n} x_i\right)^2} \quad (2)$$

Here, x1, x2, . . . , and xn represent distances to the target from the vehicle-mounted radar at respective sampling times input from the distance detection unit 24, and y1, y2, . . . , and yn represent peak values of a signal obtained by Fourier-transforming a down beat signal at the respective sampling times input from the reception intensity calculation unit 22. Then, intermediate data A, B, C and D are defined according to the following equations.

$$A = \sum_{i=1}^{n} x_i^2 = \sum_{i=1}^{n-1} x_i^2 + x_n^2 \quad (3)$$

$$B = \sum_{i=1}^{n} y_i = \sum_{i=1}^{n-1} y_i + y_n \quad (4)$$

$$C = \sum_{i=1}^{n} x_i y_i = \sum_{i=1}^{n-1} x_i y_i + x_n y_n \quad (5)$$

$$D = \sum_{i=1}^{n} x_i = \sum_{i=1}^{n-1} x_i + x_n \quad (6)$$

Then, Equation (1) is represented by the following equation using A, B, C and D.

$$a = \frac{nC - BD}{nA - D^2} \quad (7)$$

Similarly, Equation (2) is represented by the following equation using A, B, C and D.

$$b = \frac{AB - CD}{nA - D^2} \quad (8)$$

Based on Equation (7), since the slope "a" is calculated by the unknown numbers A, B, C and D and the known number n, it is sufficient if the unknown numbers A, B, C and D are calculated. The unknown numbers A, B, C and D can be calculated, as indicated on each right side of Equation (3) to Equation (6), by adding a value obtained by summing contents of the sigma in the first term of the right side from 1 to n−1 (the sum of values calculated from the distance between the vehicle-mounted radar and the target and the intensity of received waves which are sampled up to the previous cycle) to an n-th value (value sampled in the current cycle).

With reference to the determination algorithm of the elevation-view structure, a specific process of the elevation-view structure determination unit 28 will be described. The elevation-view structure determination unit 28 reads A, B, C and D from the memory 21 as intermediate data from the starting of target detection up to the cycle before one sample. The elevation-view structure determination unit 28 calculates $x_n^2$, $y_n$, $x_n y_n$, and $x_n$, from a value which is newly sampled every cycle at a distance $x_n$ between the target and the vehicle-mounted radar which is input from the distance detection unit 24 and a peak value $y_n$ of the signal input from the reception intensity calculation unit 22, $x_n^2$, and adds the respective calculated values to A, B, C and D read from the memory 21, to calculate the current A, B, C and D. Then, the elevation-view structure determination unit 28 calculates the slope "a" of Equation (1) using the calculated current A, B, C and D.

In a case where the slope "a" is a positive number, the elevation-view structure determination unit 28 determines that the target is an elevation-view structure. In a case where the slope "a" is negative or zero, the elevation-view structure determination unit 28 determines that the target is a forward-view structure. The elevation-view structure determination unit 28 outputs information that the target is an elevation-view structure or a forward-view structure, to the target output unit 29. Furthermore, the elevation-view structure determination unit 28 updates the respective values stored in the memory 21 using the current A, B, C and D as new intermediate data.

In a case where the target is a forward-view structure, the target output unit 29 outputs an identification number of the target as a target. In a case where the target output processing unit 29 receives determination results of a plurality of targets and all the determination results correspond to the forward-view structures, the target output unit 29 outputs the identification numbers of the targets which are present in the lane of the host vehicle as targets. Furthermore, in a case where the target output unit 29 receives determination results of a plurality of targets and all the determination results correspond to the forward-view structures, and in a case where two or more targets are present in the lane of the host vehicle, the target output unit 29 outputs the identification numbers of targets in which the number of target linking processes read from the memory 21 is as large as the number of targets.

In a case where the target is an elevation-view structure, or in a case where information that a target candidate is not present is input from the reception intensity calculation unit 22, the target output unit 29 outputs zero indicating no target.

Figure 16:
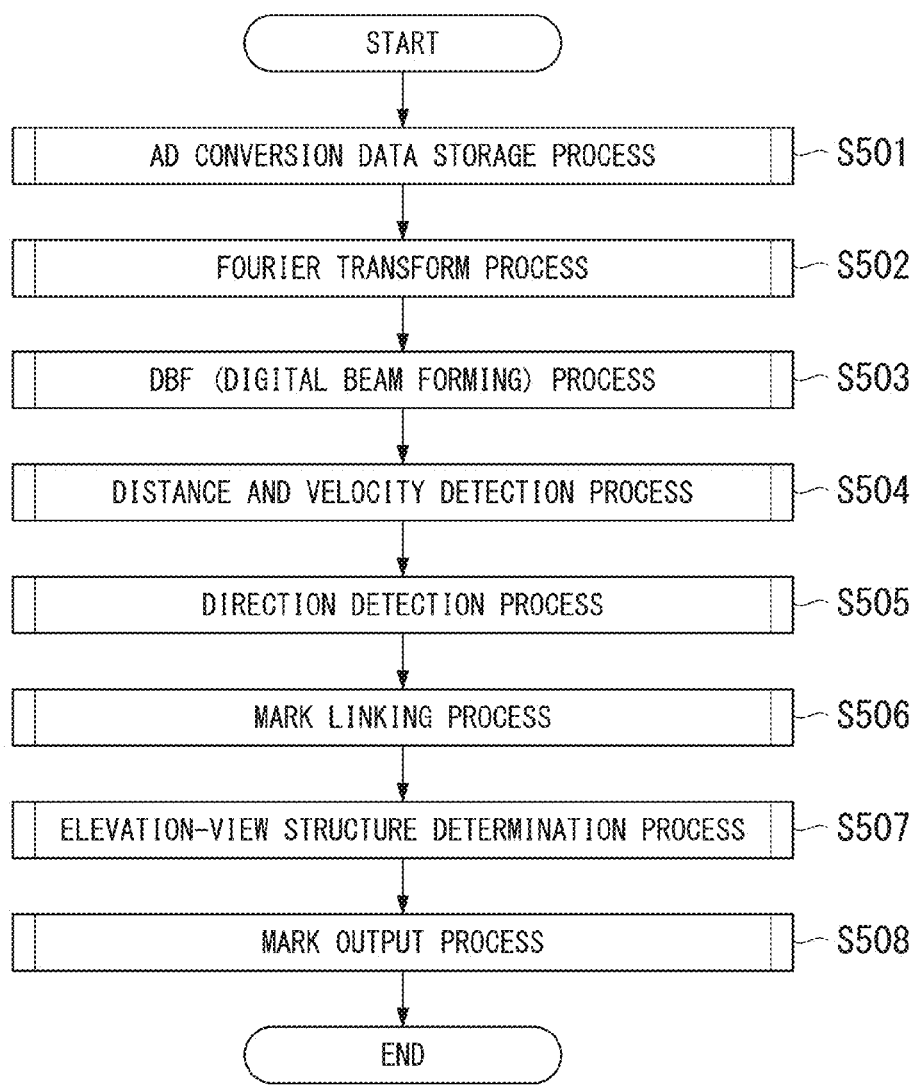
FIG. 16 is a flowchart of an entire mark extraction process.

Then, a target extraction process will be described with reference to a flowchart in FIG. 16. The signal processing unit 20 stores beat signals of respective channels corresponding to the respective reception antennas 11 to 1$n$ which are A/D converted in the memory 21 (step S501).

Then, the reception intensity calculation unit 22 performs Fourier transform for the beat signals of the channels corresponding to the respective reception antennas 11 to 1$n$, to calculate signal levels (step S502).

The reception intensity calculation unit 22 outputs the values Fourier-transformed in the time direction for the respective antennas to the DBF processing unit 23.

Furthermore, the reception intensity calculation unit 22 outputs the frequency modulation width $\Delta f$, the target frequency in the ascending portion and the target frequency in the descending portion to the distance detection unit 24.

Furthermore, the reception intensity calculation unit 22 outputs the central frequency $f_0$, the target frequency in the ascending portion and the target frequency in the descending portion to the vehicle velocity detection unit 25.

Furthermore, the reception intensity calculation unit 22 outputs the peak value of the lower portion of the signal level to the elevation-view structure determination unit 28.

Furthermore, in a case where the intensity of the received waves cannot be detected, the reception intensity calculation unit 22 outputs information that a target candidate is not present to the target output unit 29.

Then, the DBF processing unit 23 performs further Fourier transform in the antenna array direction for the values Fourier-transformed in the time direction for the respective antennas input from the reception intensity calculation unit 22, performs a spatial complex for each angle channel corresponding to the angle resolution, and outputs the result to the direction detection unit 26 for each beat frequency (step S503).

Then, the distance detection unit 24 calculates the distance from the frequency modulation width $\Delta f$, the target frequency in the ascending portion and the target frequency in the descending portion, which are input from the reception intensity calculation unit 22 (step S504). Furthermore, the velocity detection unit 25 calculates the relative velocity from the central frequency, the target frequency in the ascending portion and the target frequency in the descending portion, which are input from the reception intensity calculation unit 22 (step S504).

The direction detection unit 26 outputs an angle which takes the largest amplitude value from among the calculated spatial complexes for each beat frequency to the target linking unit 27 as a direction where the target is present (step S505).

Next, in a case where absolute values of respective differences between the values of the distance, relative velocity and direction of the target which are currently calculated and the values of the distance, relative velocity and direction of the target which are calculated before one cycle and read from the memory 21 are smaller than values which are determined with respect to the respective values, the target linking unit 27 determines that the target which is detected before one cycle and the currently detected target are the same, updates the values of the distance, relative velocity and direction of the target in the memory, and outputs the identification number of the target to the elevation-view structure determination unit 28 (step S506).

Then, the elevation-view structure determination unit 28 determines whether the target input from the target linking unit 27 is an elevation-view structure, and outputs information that the target is an elevation-view structure or a forward-view structure to the target output unit 29 (step S507).

Next, in a case where the target is a forward-view structure, the target output unit 29 outputs an identification number of the target as a target (step S508). In a case where the target output unit 29 takes determination results of a plurality of targets and all the determination results correspond to the forward-view structures, the target output unit 29 outputs the identification numbers of the targets which are present in the lane of the host vehicle as targets. Furthermore, in a case where the target output unit 29 takes determination results of a plurality of targets and all the determination results correspond to the forward-view structures, and in a case where two or more targets are present in the lane of the host vehicle, the target output unit 29 outputs the identification numbers of the targets in which the number of target linking processes read from the memory 21 is as large as the number of targets.

Figure 17:
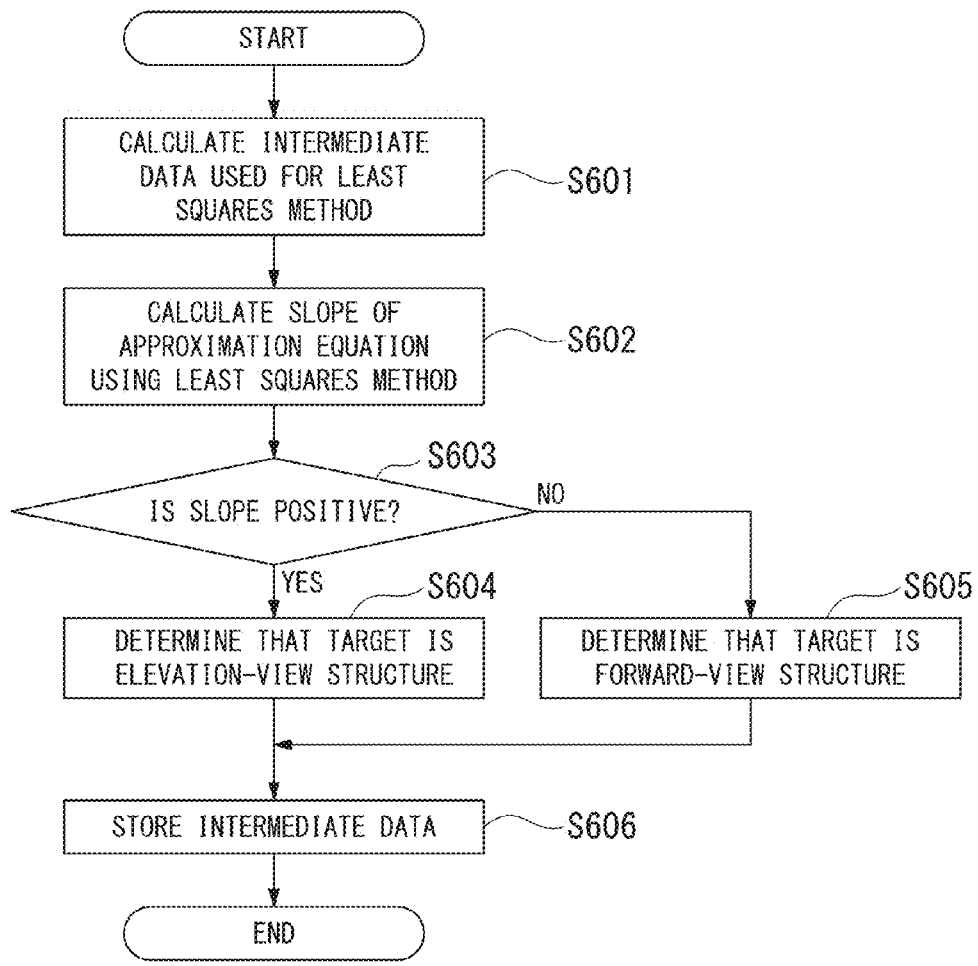
FIG. 17 is a flowchart of an elevation-view structure determination process.

Next, an elevation-view structure determination process will be described in detail with reference to a flowchart in FIG. 17. Firstly, the elevation-view structure determination unit 28 calculates $x^2$, y, xy and x from the current value of the distance x between the target and the vehicle-mounted radar input from the distance detection unit 24, and the intensity y of the received waves input from the reception intensity calculation unit 22, and adds the respective values to A, B, C and D which are respective sums up to the previous cycle read from the memory 21 (step S601).

Then, the elevation-view structure determination unit 28 calculates the slope of an approximation equation obtained when linear approximation is performed for a set of the distance x and the intensity of received waves measured up to the present time, using a least squares method, according to Equation (7) using the updated intermediate data A, B, C and D (step S602).

Then, in a case where the slope is positive (plus) (YES in step S603), the elevation-view structure determination unit 28 determines that the target is an elevation-view structure, and outputs information that the target is an elevation-view structure to the target output unit 29 (step S604). In a case where the slope is negative or zero (NO in step S603), the elevation-view structure determination unit 28 considers that the target is a forward-view structure, and outputs information that the target is a forward-view structure to the target output unit 29 (step S605). Then, the elevation-view structure determination unit 28 stores the updated intermediate data A, B, C and D in the memory 21 (step S606).

The approximation equation in step S602 may be an approximate curve such as polynomial approximation such as a quadratic equation, log approximation, or exponential approximation, as well as linear approximation, and it is sufficient if whether the intensity y of the received waves increases or decreases as the distance x between the target and the vehicle-mounted radar decreases can be understood. In this case, if the intensity y of the received waves decreases as the distance x between the target and the vehicle-mounted radar decreases, the elevation-view structure determination unit 28 determines that the target is an elevation-view structure. On the other hand, in a case where in a case where the intensity y of the received waves increases or stays constant as the distance x between the target and the vehicle-mounted radar decreases, the elevation-view structure determination unit 28 determines that the target is a forward-view structure.

Furthermore, a condition under which the target is determined to be an elevation-view structure in step S603 may be a condition that the slope of an approximation straight line has a value larger than a predetermined threshold value. On the other hand, if the slope of the approximation straight line is equal to or smaller than the predetermined threshold value, the elevation-view structure determination unit 28 may determine that the target is a forward-view structure.

Hereinbefore, the embodiment 1-1 of the invention according to the first related art has been described with reference to the accompanying drawings; however, the specific configuration is not limited to the embodiment, and may also include a design or the like within a scope of the concept the invention.

(Description about the Second Related Art)

Firstly, the background art will be described.

As described above (see the background art of the first related art), in the related art, a millimeter-wave radar (hereinafter, referred to as a radar) is used for a vehicle-mounted radar.

In a case where an obstacle is present in the vicinity of the host vehicle mounted with the radar, the vehicle-mounted radar outputs target data which includes information about a relative distance, direction, velocity or the like between the host vehicle and the obstacle to an inter-vehicular alarm and vehicle velocity control system. The inter-vehicular alarm and vehicle velocity control system performs control of the host vehicle for maintaining the distance between the host vehicle and the obstacle according to position information about a target, and generating an alarm or reducing the velocity of the host vehicle in a case where collision is predicted, to perform control of the host vehicle (hereinafter, referred to as a collision reduction control) (for example, refer to JPA-2006-275840). Thus, there is a demand that a vehicle-mounted radar have a capability of rapidly and correctly detecting a target having a risk of collision with the host vehicle.

On the other hand, in a case where an obstacle is not present in the vicinity of the host vehicle, since the radar does not perform detection at all, the radar does not output target data to the vehicle velocity control system. In this case, the vehicle velocity control system and a steering control system perform control so that the host vehicle travels in accordance with vehicle velocity and a steering operation which are set in advance.

However, in a case where an obstacle is present in the vicinity of the host vehicle, and the obstacle is a detection target which is sufficiently short compared with the floor height of the vehicle (hereinafter, referred to as a low-height detection target), the low-height detection target does not hinder cruising of the host vehicle, and thus, the vehicle velocity control system and the steering control system should perform control so that the host vehicle runs at the vehicle velocity and steering which are set in advance without generation of the inter-vehicular alarm.

However, the vehicle-mounted radar which does not have a vertical resolution may falsely recognize the low-height detection target as an obstacle which hinders running according to an antenna characteristic and a reflection intensity of the low-height detection target. Then, in spite of a safe running situation in which a collision accident does not physically occur, a vehicle control device determines that there is a collision risk due to false recognition of the radar. Due to the false determination, control such as unnecessary alarm sending or unnecessary vehicle deceleration is performed, to thereby cause discomfort to the driver. Furthermore, the unnecessary deceleration of the host vehicle causes an increase in a rear-end collision risk with respect to a following vehicle.

Next, the invention according to the second related art will be described.

To solve the above problem, an object of the invention according to the second related art is to provide a radar device and a program which can determine whether or not a detected target is a low-height detection target.

According to a first aspect of the invention according to the second related art, there is provided a radar device including: a transmission antenna which transmits radio waves, a reception antenna which receives radio waves generated by reflection of the transmitted radio waves to a target, a distance detection unit which detects the distance from the target based on the received radio waves, a reception power calculation unit which calculates electric power of the received radio waves as a function of the detected distance, an area calculation unit which calculates the area of a region which is defined using a curve indicating the function as one boundary in a predetermined distance section, and a detection unit which determines whether the target is a low-height detection target based on the calculated area.

According to the radar device, by indicating reception power as the function of the distance between the radar and the target, it is possible to determine whether or not the target detected by the radar is a low-height detection target.

In the radar device, only in a case where the distance is in a predetermined range, the detection unit may calculate the area based on the intensity of the received waves.

According to the radar device, it is possible to efficiently determine whether or not the target detected by the radar is a low-height detection target, and to enhance the accuracy thereof.

According to a second aspect of the invention according to the second related art, there is provided a radar device including: a transmission antenna which transmits radio waves, a reception antenna which receives radio waves generated by reflection of the transmitted radio waves to a target, a reception power calculation unit which calculates electric power of the received radio waves as a function of time, an area calculation unit which calculates the area of a region which is defined using a curve indicating the function as one boundary in a predetermined distance section, and a detection unit which determines whether the target is a low-height detection target based on the calculated area.

According to the radar device, by indicating reception power as a function of time, it is possible to determine whether or not the target detected by the radar is a low-height detection target.

In the radar device, only in a case where the time is in a predetermined range, the detection unit may calculate the area based on the intensity of the received waves.

According to the radar device, it is possible to efficiently determine whether or not the target detected by the radar is a low-height detection target, and to enhance the accuracy thereof.

In the radar device, the area calculation unit may calculate the area of a region which is defined using the curve and a predetermined straight line as a boundary or the area of a region which is defined using the curve and a predetermined curve as a boundary.

According to the radar device, by calculating the area of the region (closed space) which is defined using the curve and the predetermined straight line as the boundary, it is possible to detect the difference between the area calculated in the case of the low-height detection target and the area calculated in the normal detection target, and thus, it is possible to determine whether or not the target is a low-height detection target.

In the radar device, the area calculation unit may calculate the area of a region which is defined using the curve and a straight line which is determined based on an average value of the electric power of the received radio waves as a boundary.

According to the radar device, it is possible to increase the difference between the area calculated in the case of the low-height detection target and the area calculated in the normal detection target, and thus, it is possible to determine whether or not the target is a low-height detection target with high accuracy.

In the radar device, if the sum of a plurality of sections of the area exceeds a predetermined threshold value, the detection processing unit may determine that the target is a normal detection target.

According to the radar device, by setting the sum of the section areas as a determination reference, it is possible to noticeably express the difference between the normal detection target and the low-height detection target, and thus, it is possible to allow a room in threshold value setting, and to allow determination with high accuracy.

In the radar device, if any one of the areas in the plurality of sections exceeds a predetermined threshold value, the detection processing unit may determine that the target is a normal detection target.

According to the radar device, it is possible to perform determination before all the section areas are calculated, and thus, even when the distance between the radar and the target becomes long, it is possible to determine that the target is a normal detection target. As a result, it is possible to perform deceleration of the vehicle or evasion operation of the target with a temporal room.

In the radar device, if the number of times when the area exceeds a predetermined threshold value exceeds a number which is set in advance, the detection unit may determine that the target is a normal detection target.

According to the radar device, since it is possible to perform determination before all the section areas are calculated, even when the distance between the radar and the target becomes long, it is possible to determine that the target is a normal detection target. As a result, it is possible to perform deceleration of the vehicle or evasion operation of the target with a temporal room.

According to a third aspect of the invention according to the second related art, there is provided a program which causes a computer to execute a routine including: a first step of detecting the distance from a target based on radio waves received by a reception channel, a second step of calculating electric power of the received radio waves as a function of the detected distance, a third step of calculating the area of a region which is defined using a curve indicating the function as one boundary in a predetermined distance section, and a fourth step of determining whether the target is a low-height detection target based on the calculated area.

According to the program, by indicating reception power as a function of distance, it is possible to determine whether or not the target detected by the radar is a low-height detection target.

According to a fourth aspect of the invention according to the second related art, there is provided a program which causes a computer to execute a routine including: a first step of calculating electric power of received radio waves as a function of time, a second step of calculating the area of a region which is defined using a curve indicating the function as one boundary in a predetermined time section, and a third step of determining whether the target is a low-height detection target based on the calculated area.

According to the program, by indicating reception power as a function of time, it is possible to determine whether or not the target detected by the radar is a low-height detection target.

According to the invention according to the second related art, it is possible to determine whether or not the target detected by the radar is a low-height detection target.

Embodiment 2-1

Hereinafter, an electronic scanning type radar device (FMCW type millimeter-wave radar) according to an embodiment 2-1 of the invention according to the second related art will be described with reference to the accompanying drawings. FIG. 19 is a block diagram illustrating a configuration example of the embodiment 2-1.

In the figure, the electronic scanning type radar device according to the embodiment 2-1 includes reception antennas 11 to 1n, mixers 21 to 2n, a transmission antenna 3, a distributor 4, filters 51 to 5n, a SW (switch) 6, an ADC (A/D converter) 7, a control unit 8, a triangular wave generating unit 9, a VCO (Voltage Controlled Oscillator) 10, and a signal processing unit 20.

The signal processing unit 20 includes a memory 21, a reception power calculation unit 22, a DBF detection unit 23, a distance detection unit 24, a velocity detection unit 25, a direction settling unit 26, a target linking unit 27, an area calculation unit 31, a detection unit 32, and a target output unit 29.

Then, an operation of the electronic scanning type radar device according to the embodiment 2-1 will be described with reference to FIG. 19.

The reception antennas 11 to 1n receive reflected waves which are generated by reflection of transmitted waves to a target and come from the target, that is, received waves.

Each of the mixers 21 to 2n mixes the transmitted waves transmitted from the transmission antenna 3 with a signal obtained by amplifying the received waves received through each of the reception antennas 11 to 1n by an amplifier, to generate a beat signal corresponding to each frequency difference.

The transmission antenna 3 transmits a transmission signal obtained by frequency-modulating, in the VCO 10, a triangular wave signal generated in the triangular wave generating unit 9 to the target as the transmitted waves.

The distributor 4 distributes the frequency-modulated transmission signal from the VCO 10 to the mixers 21 to 2n and the transmission antenna 3.

The respective filters 51 to 5n perform band limiting with respect to beat signals of Ch1 to Chn corresponding to the respective reception antennas 11 to 1n which are respectively generated in the mixers 21 to 2*n*, and output the band-limited beat signals to the SW (switch) 6.

The SW 6 sequentially switches the beat signals of Ch1 to Ch*n* corresponding to the respective reception antennas 11 to 1*n* passed through the respective filters 51 to 5*n*, and outputs the result to the ADC (A/D converter) 7 according to sampling signals input from the control unit 8.

The ADC 7 performs A/D conversion for the beat signals of Ch1 to Ch*n* corresponding to the respective reception antennas 11 to 1*n* input in synchronization with the sampling signals from the SW 6, in synchronization with the sampling signals, for conversion to digital signals, and sequentially stores the result in a waveform storage region of the memory 21 in the signal processing unit 20.

Figure 19:
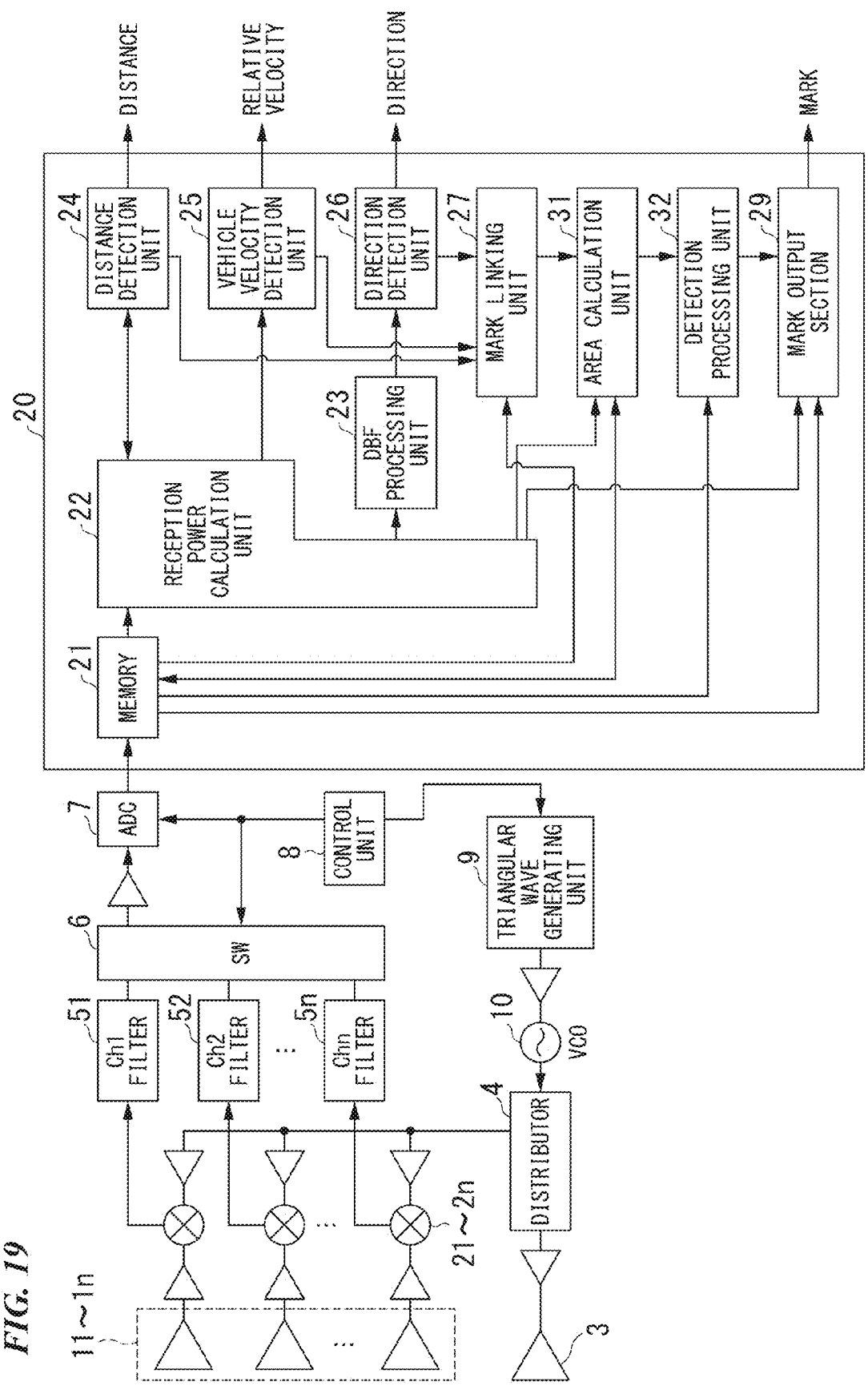
FIG. 19 is a block diagram illustrating a configuration example of an electronic scanning type radar device which is an embodiment of the invention according to a second related art.

The control unit 8 is configured of a microcomputer or the like, and performs the entire operation of the electronic scanning type radar device shown in FIG. 19 based on a control program which is stored in a ROM (not shown) or the like.

The memory 21 in the signal processing unit 20 stores the digital signals which are digital-converted in the A/D converter 7 in respective channels corresponding to the respective reception antennas 11 to 1*n*.

<Detection Principle of Distance, Relative Velocity and Horizontal Angle (Direction)>

Next, a principle of detecting the distance, relative velocity and horizontal angle (direction) between the electronic scanning type radar device and the target which are used in the signal processing unit 20 in the embodiment 2-1 will be briefly described with reference to FIGS. 13A and 13B.

FIGS. 13A and 13B show a transmission signal obtained by frequency-converting a signal generated by the triangular wave generating unit 9 in FIG. 19 at a central frequency $f_0$ and a modulation width $\Delta f$ in the VOC 10 and a state where the transmission signal is reflected from a target and is input as a reception signal. In the example of FIGS. 13A and 13B, the number of targets is one.

As shown in FIG. 13A, a reception signal which corresponds to reflected waves from the target is delayed and received in the right direction (time delay direction) according to the distance between the radar and the target, with respect to the transmission signal.

Furthermore, the reception signal fluctuates in the vertical direction (frequency direction) due to the Doppler effect according to the relative velocity to the target, with respect to the transmission signal.

The reception power calculation unit 22 performs Fourier transform for the beat signals (down in FIG. 13A) in the respective channels corresponding to the respective reception antennas 11 to 1*n* which are stored in the memory 21. Here, the amplitude of complex data after Fourier transform is referred to as a signal level.

By using frequency spectrum with respect to complex data in a certain antenna or added values of complex data in all the antennas, the reception power calculation unit 22 may detect the presence of the target depending on a beat frequency corresponding to each peak value of the spectrum, that is, the distance. Here, by the addition of the complex data on all the antennas, noise components are averaged to enhance the ratio of S/N.

As a result of Fourier transform, as shown in FIG. 13B, in a case where a single target is present, one peak value is present in an ascending region and a descending region, respectively. Here, in FIG. 13B, the transverse axis represents frequency and the longitudinal axis represents signal intensity.

Furthermore, by detecting a signal level which exceeds a numerical value (threshold value) which is set in advance from the signal level for each beat frequency shown in FIG. 13B, the reception power calculation unit 22 determines that a target is present. Here, the peak value of the signal level is referred to as the intensity of the received waves.

In a case where the peak of the signal level is detected, the reception power calculation unit 22 outputs a beat frequency of the peak value (both of an upper portion and a lower portion of the beat signal) to the distance detection unit 24 and the vehicle velocity detection unit 25 as a target frequency. The reception power calculation unit 22 outputs the frequency modulation width $\Delta f$ to the distance detection unit 24, and outputs the central frequency $f_0$ to the vehicle velocity detection unit 25.

Furthermore, the reception power calculation unit 22 calculates the square of the peak value of the lower portion of the signal level as the reception power. The reception power is output to the area calculation unit 31 as a function of the distance from the target input from the distance calculation unit 24 (which will be described later).

In a case where the peak of the signal level cannot be detected, the reception power calculation unit 22 outputs information that a target candidate is not present to the target output unit 29.

In this regard, the peak value of the upper portion of the beat signal, or the average of the peak value of the upper portion of the beat signal and the peak value of the lower portion of the beat signal may be used as the signal level.

In a case where a plurality of targets is present, after Fourier transform, peaks of the same number as that of the targets appear in the upper portion and the lower portion of the beat signal, respectively. Since the reception signal is delayed in proportion to the distance between the radar and the target and the reception signal in an upper part of FIG. 13A is shifted in the right direction, as the distance between the radar and the target becomes long, the frequency of the beat signal in a lower part of FIG. 13A increases.

In a case where a plurality of peaks of the signal level are detected corresponding to the plurality of targets, numbering is performed for the respective peak values in the upper portion and the lower portion in the ascending order of frequency, to be output to the detection unit 32. Here, the peaks having the same number in the upper and lower portions correspond to the same targets, and respective identification numbers are used as the numbers of the targets.

Next, the distance detection unit 24 calculates a distance r from a target frequency $f_u$ corresponding to the ascending portion input from the reception power calculation unit 22 and a target frequency $f_d$ corresponding to the descending portion, using the following equation, and outputs the result to the reception power calculation unit 22 and the target linking unit 27.

$$r = \{C \cdot T/(2 \cdot \Delta f)\} \cdot \{(f_u + f_d)/2\}$$

Furthermore, the vehicle velocity detection unit 25 calculates a relative velocity v from the target frequency $f_u$ corresponding to the ascending portion input from the reception power calculation unit 22 and the target frequency $f_d$ corresponding to the descending portion, using the following equation, and outputs the result to the target linking unit 27.

$$v = \{C/(2 \cdot f_0)\} \cdot \{(f_u - f_d)/2\}$$

In the equations of calculating the distance r and the relative velocity v, C represents a light velocity, T represents a modulation time (ascending portion/descending portion), $f_u$ represents a target frequency in the ascending portion, and $f_d$ represents a target frequency in the descending portion.

Next, the reception antennas 11 to 1n according to the embodiment 2-1 are arc-shaped antennas which are arranged at an interval d, as shown in FIG. 14. Incoming waves from the target (incident waves, that is, waves reflected from the target with respect to waves transmitted from the transmission antenna 3), which are incident in the direction of an angle $\phi$ with respect to an axis perpendicular to a surface on which the antennas are arrayed, are input to the reception antennas 11 to 1n.

Here, the incoming waves are received at the same angle $\phi$ in the reception antennas 11 to 1n. A phase difference of reception signals which are generated between the reception antennas at one end and the other end is calculated by $2\pi f \cdot (d_{n-1} \cdot \sin \phi / C)$, using frequencies f of the reception signals, an interval $d_{n-1}$ between the reception antennas at one end and the other end, and the angle $\phi$.

Using the phase difference, the DBF (digital beam forming) processing unit 23 performs further Fourier transform in the antenna array direction for input complex data which is Fourier-transformed on the time axis corresponding to each antenna, that is, performs Fourier transform on the spatial axis. Furthermore, the DBF processing unit 23 calculates spatial complex data indicating the intensity of spectrum for each angle channel corresponding to the angle resolution, and outputs the result to the direction detection unit 26 for each beat frequency.

The direction detection unit 26 outputs an angle $\phi$ which takes the largest value from among the sizes of the calculated spatial complex data values for each beat frequency to the target linking unit 27 as a direction where the target is present.

In a case where absolute values of respective differences between the values of the distance, relative velocity and direction of the target which are currently calculated and the values of the distance, relative velocity and direction of the target which are calculated before one cycle and read from the memory 21 are smaller than values which are determined with respect to the respective values, the target linking unit 27 determines that the target which is detected before one cycle and the currently detected target are the same.

In this case, the target linking unit 27 increases the number of target linking processes of the target read from the memory 21 by 1. In a case where the absolute values are not smaller than the determined values, the target linking unit 27 considers that a new target is detected. Furthermore, the target linking unit 27 stores the current distance, relative velocity, and direction of the target, and the number of target linking processes of the target in the memory 21. Furthermore, the target linking unit 27 outputs an identification number of the target to the detection processing unit 32.

The area calculation unit 31 receives electric power of the received waves as a function of the detected distance from the reception power calculation unit 22.

The area calculation unit 31 calculates the area of a region which is defined using a curve indicating the function and a straight line determined based on the average value of the electric power of the received waves, in a predetermined distance section.

The area calculation unit 31 adds the area to the sum of the calculated areas up to now, and stores the sum of the areas after addition in the memory 21.

The detection processing unit 32 reads the sum of the areas after addition from the memory 21, determines whether the target is a normal detection target having a collision risk or a low-height detection target which does not hinder cruising, using a low-height detection target determination algorithm (which will be described later), and then outputs the determination result to the target output unit 29. Thus, in a case where the target is a normal detection target having a collision risk, it is possible to perform deceleration to prevent collision or to generate an alarm to get a driver's attention.

In a case where the target is a normal detection target, the target output unit 29 outputs an identification number of the target as a target. In a case where the target output unit 29 takes determination results of a plurality of targets from the detection processing unit 32 and all the determination results correspond to the normal detection targets, the target output unit 29 outputs the identification numbers of the targets which are present in the lane of the host vehicle as targets.

Furthermore, in a case where the target output unit 29 takes determination results of a plurality of targets and all the determination results correspond to the normal detection targets, and in a case where two or more targets are present in the lane of the host vehicle, the target output unit 29 outputs the identification numbers of the targets in which the number of target linking processes read from the memory 21 is as large as the number of targets.

In a case where the target is a low-height detection target, or in a case where information that a target candidate is not present is input from the reception power calculation unit 22, the target output unit 29 outputs information that a target is not present.

<Detection Simulation Result of Low-Height Detection Target Using Radar>

Figure 20:
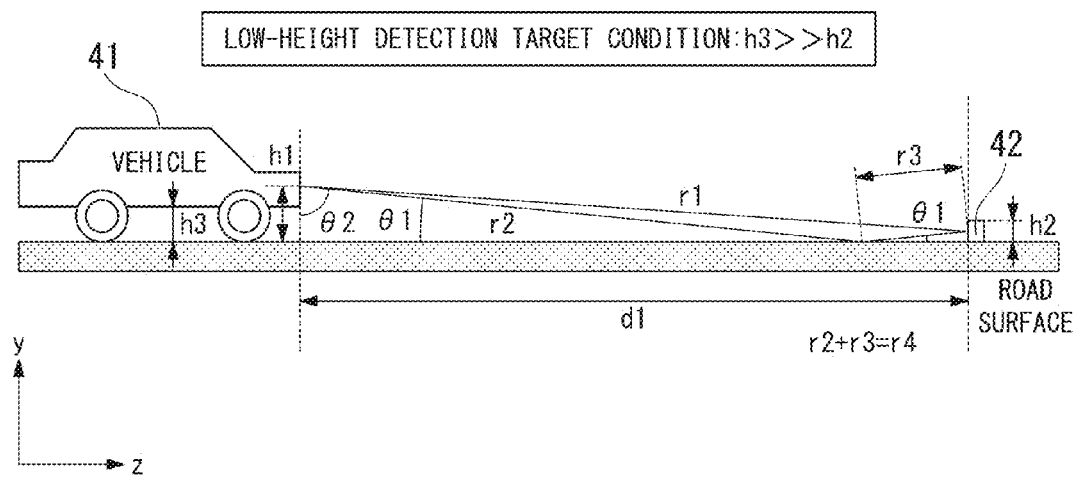
FIG. 20 is a diagram illustrating a traveling condition model in which an empty can is present directly in front of a vehicle.

Before description of a detection simulation result of a low-height detection target using a radar, conditions thereof will be described. FIG. 20 illustrates a running condition model on the yz plane in a case where it is considered that an empty can 42 is present directly in front of a vehicle 41. Here, "d1" represents a direct distance between the vehicle 41 and the empty can 42 which is an example of a low-height detection target, "r1" represents a direct wave propagation route of electromagnetic waves to the target, and "r2" and "r3" represent interference wave propagation routes of the electromagnetic waves to the target. Furthermore, "h1" represents the height of a vehicle-mounted radar, "h2" represents the height of the empty can, and "h3" represents the floor height of the host vehicle.

Figure 21:
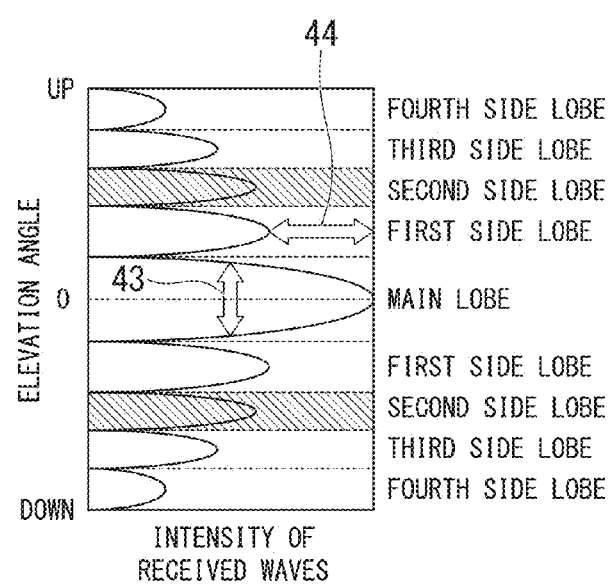
FIG. 21 is a diagram illustrating the relationship between a reception power value of a radar and an elevation angle.

As shown in FIG. 21, antenna conditions are set such that a half-width 43 is 4 degrees and the ratio 44 of reception power of a main lobe and reception power of side lobes (hereinafter, referred to as a side lobe ratio) is 45 dB.

Subsequently, simulation conditions in a case where a normal detection target having a vehicle collision risk is present in front of the host vehicle will be described. The simulation conditions will be described as follows. The vehicle-mounted radar in FIG. 20 uses radio waves of a millimeter-wave band, and the installation height h1 of the radar is 0.55 m. Since straightness of the propagating waves of the radar is strong, the height h2 of a reflection surface of the target is set to 0.55 m which is the same height of the installation height h1 of the radar. The RCS (Radar Cross Section) is set to be 0 dB.

Figure 22A:
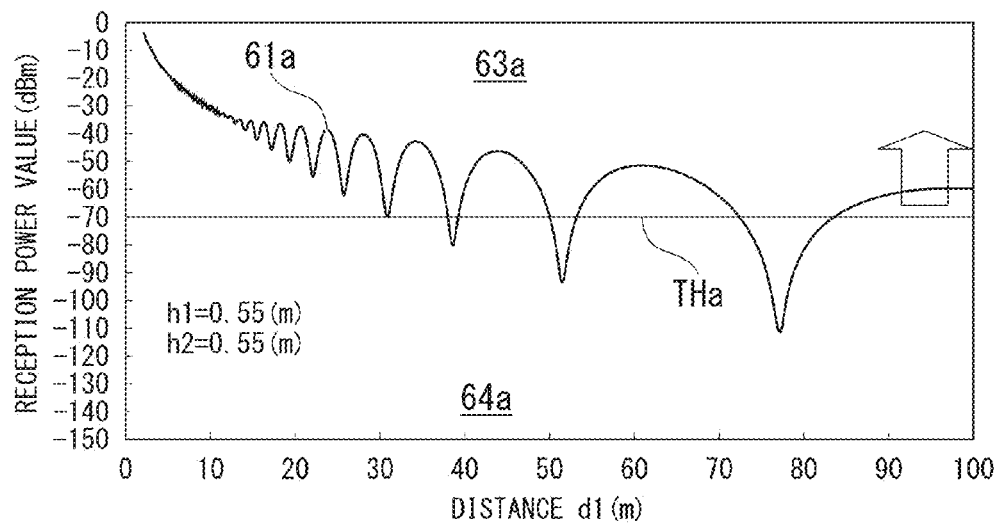
FIG. 22A is a diagram illustrating a distance characteristic of a reception power value of a normal detection target.

FIG. 22A is a simulation result indicating a distance characteristic of radar reception power in a case where a normal detection target having a vehicle collision risk is present in front of the host vehicle. The transverse axis represents the direct distance d1 between the host vehicle and the detection target shown in FIG. 20, and the longitudinal axis represents reception power, which is calculated as 0 dBm when received electric power is 1 mW.

Furthermore, −70 dBm is a detection threshold value THa. In a region (detection region 63a) which is equal to or higher than the detection threshold value THb, the radar can detect the received waves; however, in a region (non-detection region 64a) which is smaller than the detection threshold value THa, the radar cannot detect the received waves. In the case of the normal detection target, a reception power curve 61a is considerably fluctuated according to the direct distance d1.

Subsequently, simulation conditions in a case where a low-height detection target without a vehicle collision risk is present in front of the host vehicle will be described. The simulation conditions will be described as follows. The vehicle-mounted radar in FIG. 20 uses radio waves of a millimeter-wave band, and the installation height h1 of the radar is set to 0.55 m. The height h2 of the target from the road surface is set to 0.1 m. In consideration of an empty can or the like, the RCS is set to a sufficiently small value (−10 dB) compared with the case of FIG. 22A.

Figure 22B:
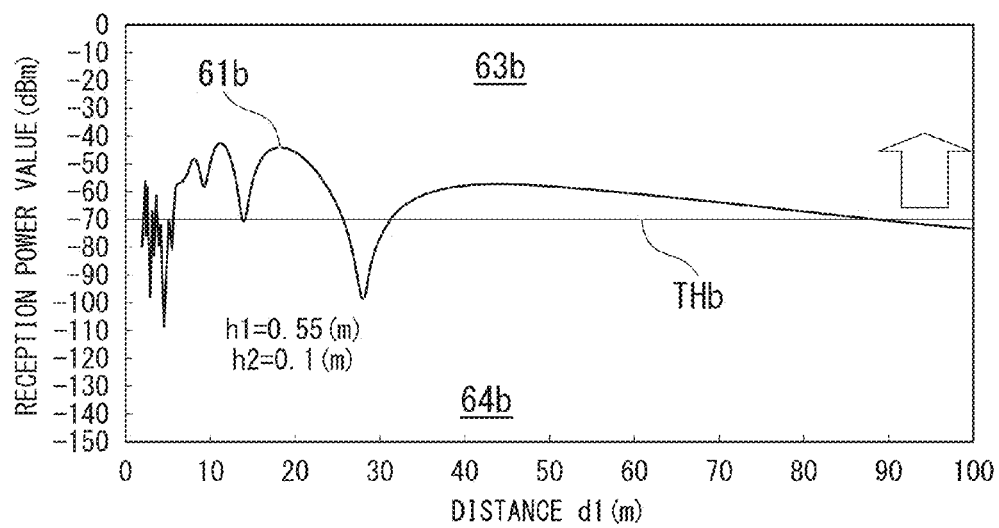
FIG. 22B is a diagram illustrating a distance characteristic of a reception power value of a low-height detection target.

FIG. 22B is a simulation result indicating a distance characteristic of radar reception power in a case where the low-height detection target without a vehicle collision risk is present in front of the host vehicle. The transverse axis represents the direct distance d1 between the host vehicle and the detection target shown in FIG. 20, and the longitudinal axis represents reception power, which is calculated as 0 dB when received electric power is 1 mW.

Furthermore, −70 dBm is a detection threshold value THb. In a region (detection region 63b) which is equal to or higher than the detection threshold value THa, the radar can detect the received waves; however, in a region (non-detection region 64b) which is smaller than the detection threshold value THb, the radar cannot detect the received waves. In the case of the low-height detection target, a reception power curve 61b is slightly fluctuated according to the direct distance d1, compared with the reception power curve 61a in the case of the normal detection target.

From the results of FIGS. 22A and 22B, if all targets which exceeds the detection threshold value are considered to be collision risk targets, when the direct distance d1 is 90 m or shorter, the radar determines that both types of targets are the collision risk targets, which causes an unnecessary collision reduction control. Thus, in order to prevent the unnecessary collision reduction control, a detection processing unit 32 determines a normal detection target having a collision risk, with respect to a low-height detection target which does not interrupt running, using an algorithm described later.

<Principle of Determination Algorithm of Low-Height Detection Target>

Next, a principle of a determination algorithm of a low-height detection target in an area calculation unit 31 and the detection processing unit 32 will be described.

As shown in FIG. 20, electromagnetic waves emitted from the radar reach a detection target which is a reflection point through two routes of a direct wave propagation route r1 and an indirect wave propagation route (a route obtained by combining r2 with r3, hereinafter, referred to as an r4), and are composed. Furthermore, the composite waves are emitted again from the reflection point, propagate on the route r1 and the route r4, and are composed again by the vehicle-mounted radar which is an arrival point.

Due to composition of two propagating waves having the different routes, a "reinforced portion" and a "balanced portion" occur in the reception power which fluctuates according to the direct distance d1 between the radar and the detection target. In such a phenomenon, the height h1 of the radar and the height h2 of the detection target shown in FIG. 20 are main factors of determining the number of occurrences of the reinforced and balanced portions (hereinafter, referred to as the number of generation).

Specifically, according to the difference between the indirect wave propagation route r4 and the direct wave propagation route r1, a phase difference occurs between the direct waves and the indirect waves observed at the arrival point. By composing two waves using such a phase difference, a "reinforced portion" or a "balanced portion" occurs in the reception power characteristic.

The variation in route difference between the direct waves and the indirect waves when the distance d1 is changed is large in the normal detection target, compared with the short target detection.

Here, as the route difference $\Delta r$ (here, $\Delta r = r4 − r1$) is changed according to the distance d1, the phase difference is similarly changed, and thus, the variation in the phase difference between the direct waves and the indirect waves when the distance d1 is changed is large in the normal detection target, compared with the low-height detection target.

Furthermore, as the number of occurrences is large in a certain predetermined distance section, the distance between the adjacent reinforced portion and balanced portion (hereinafter, referred to as a band width) decreases.

Figure 23A:
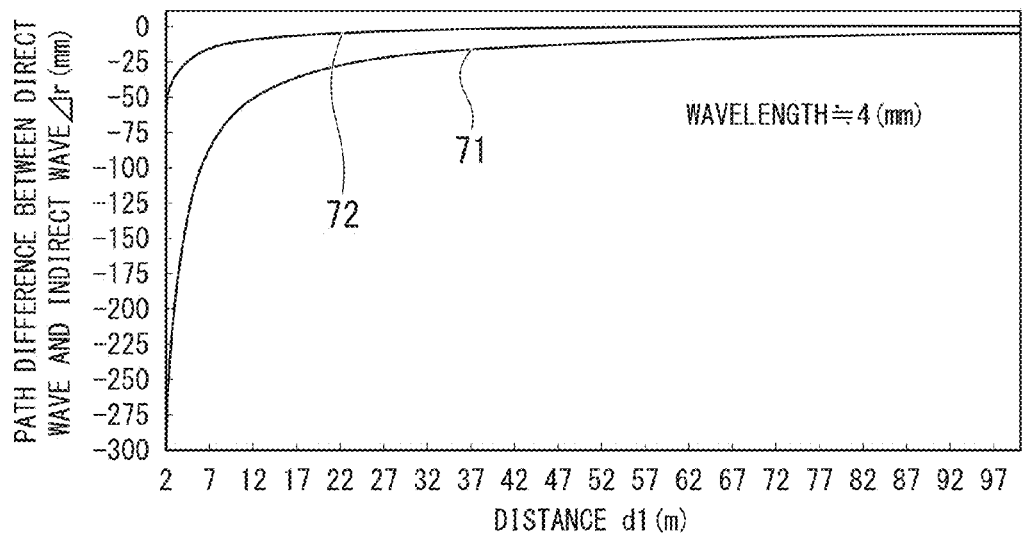
FIG. 23A is a diagram illustrating a distance characteristic of a path difference between direct waves and indirect waves.
Figure 23B:
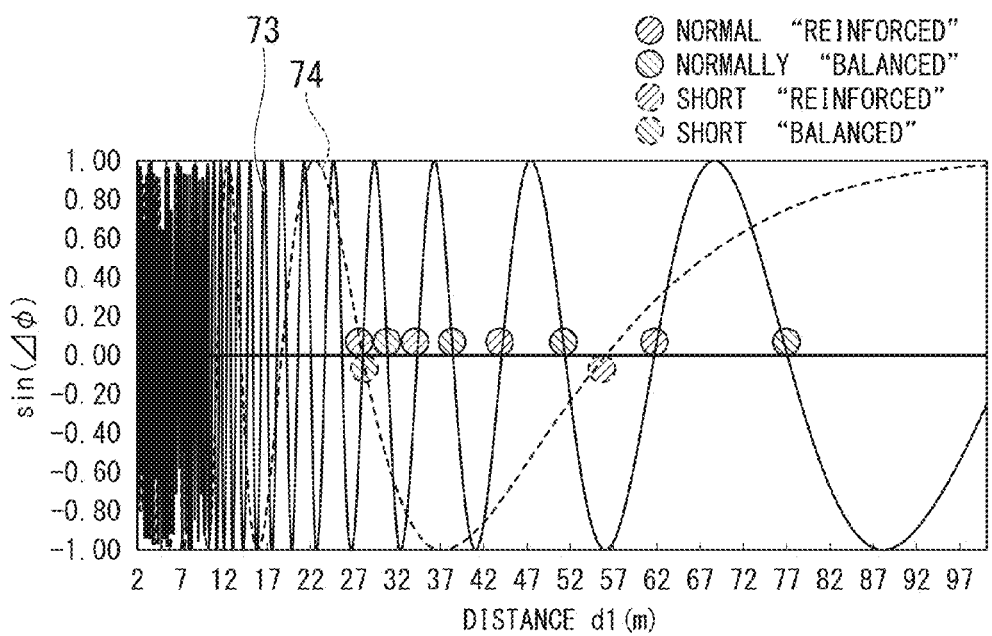
FIG. 23B is a diagram illustrating a distance characteristic of a sine value of phase difference.

In order to specifically show the number of occurrences and band width of the "reinforced portion" and "balanced portion", FIGS. 23A and 23B show that the propagation route difference $\Delta r$ and the phase difference $\Delta \phi$ are compared with each other between the "normal detection target" and the "low-height detection target" under the same conditions as in FIGS. 22A, 22B. In FIG. 23A, in the size of $\Delta r$, "normal detection target">>"low-height detection target". Accordingly, in the variation of $\Delta \phi$, "normal detection target">>"low-height detection target".

Accordingly, in FIG. 23B, in the variation of $\sin(\Delta \phi)$ when the distance is changed, "normal detection target">>"low-height detection target". According to the variation $\Delta r$ when the distance is changed, that is, the phase difference $\Delta \phi$ when the distance is changed, the number of occurrences of the "reinforced portion" and "balanced portion" is determined.

Particularly, when d1 which is a main usage range of the vehicle-mounted radar is in a range of about 30 m to about maximum several hundreds of meters, the "reinforced portion" and "balanced portion" occur several times in the normal detection target, in which band widths of several meters and several tens of meters are present. On the other hand, in the low-height detection target, the "reinforced portion" and the "balanced portion" occur once, respectively, in which band widths of several tens of meters and several hundreds of meters are present. As described above, a considerable difference is recognized. The low-height detection target determination algorithm of the invention employs the principle of recognizing the difference between the number of occurrences and the band width.

<Low-Height Detection Target Determination Algorithm>

Next, the outline of the low-height detection target determination algorithm will be described. As a method of recognizing the normal detection target and the low-height detection target, a method which uses the area of a region defined using, as a boundary, a reception power curve and a straight line where the value on the longitudinal axis represents a section average value of reception power will be described.

Figure 24:
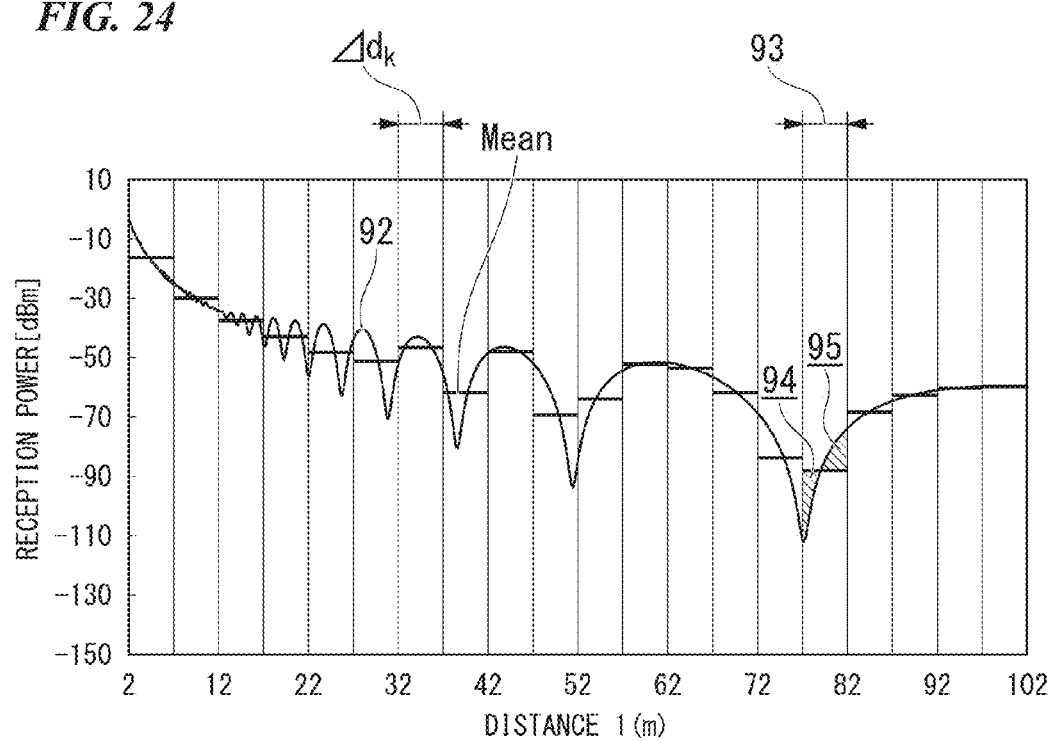
FIG. 24 is a diagram illustrating an arbitrary section and a reference value of a reception power value when a low-height detection target is detected.

Firstly, as shown in FIG. 24, the area calculation unit 31 divides the direct distance d1 between the radar and the detection target into arbitrary N sections ($\Delta d_1, \ldots \Delta d_N$). For example, the sections are divided at an interval of 5 m.

The area calculation unit 31 calculates the area of a region defined using, as a boundary, a reception power curve 92 and the straight line where the value on the longitudinal axis represents the section average value of reception power, in each section. Specifically, for example, in a section 93, the sum of the areas of a region 94 and a region 95 is calculated.

As shown in FIG. 24, the area calculation unit 31 calculates an average power mean in each section, and calculates electric power (hereinafter, referred to as a reference power) obtained by subtracting the average power from the reception power for each section.

For example, assuming that reception power P ($\Delta d_{k,i}$) of n points (i is an integer from 1 to n) is present in a section $\Delta d_k$ (k is an integer from 1 to N), a reference power p ($d_{k,i}$) dB is expressed as the following Equation (9) using subtraction in terms of decibel denotation (division in linear values).

$$p(\Delta d_{k,i}) = P(\Delta d_{k,i}) - \left( \frac{\sum_{i=1}^{n} P(\Delta d_{k,i})}{n} \right) \quad (9)$$

Figure 25:
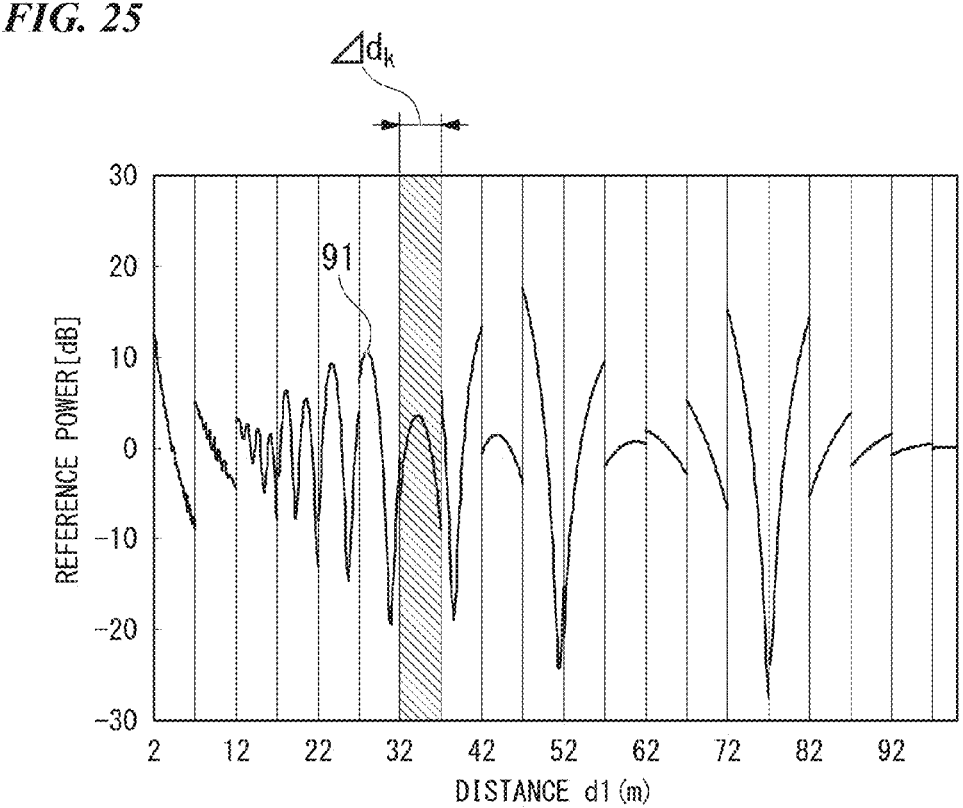
FIG. 25 is a diagram illustrating a distance characteristic of a reference power.

Subsequently, FIG. 25 shows a distance characteristic of the reference power. As shown in FIG. 25, a curve 91 of the reference power intersects the zero dB. Here, in Part (a) of FIG. 26, referring to the section of $\Delta d_k$, the reference power has a positive region 101 and a negative region 102.

Figure 26:
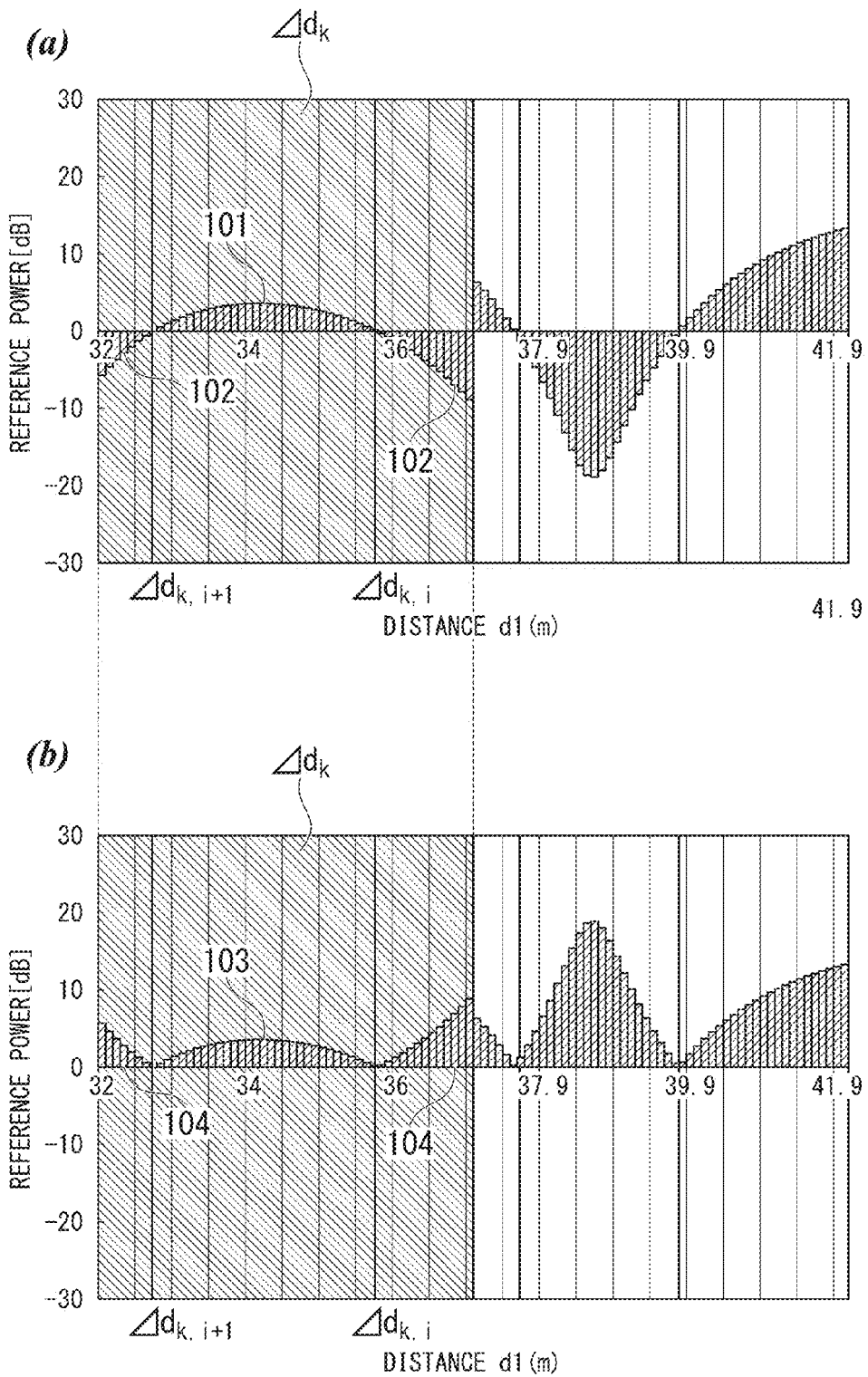
FIG. 26 is a diagram illustrating extraction of a closed section and calculation of the area of the closed section.

As shown in Part (b) of FIG. 26, the area calculation unit 31 calculates an absolute value |p($\Delta d_{k,i}$)|, and determines a closed section (a solid-filled region in Part (b) of FIG. 26), for example, 103 and 104) for realizing an integral calculus in the section, with respect to the absolute value of the reference power.

Figure 27:
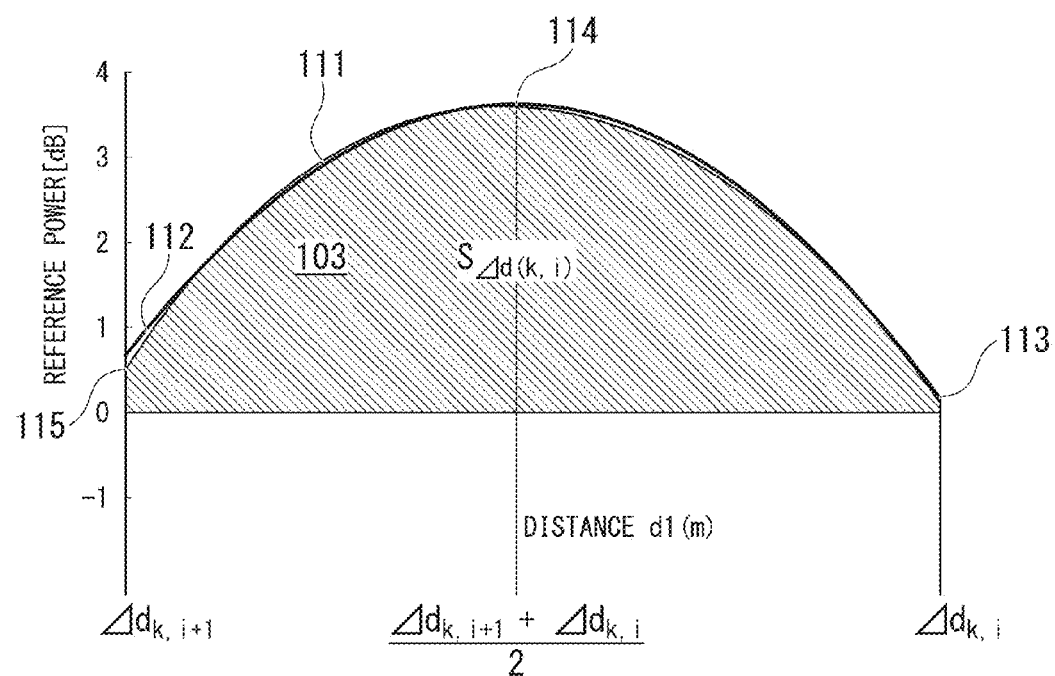
FIG. 27 is a diagram illustrating a calculation example of the area of the closed section.

FIG. 27 is an enlarged view of the region 30 in FIG. 26. An absolute value 111 of the reference power can be preferably approximated using a quadratic function 112. The area calculation unit 31 calculates the approximate area of the region 103 in FIG. 27, using the Simpson's rule.

Specifically, using the Simpson's rule, the area $s_{\Delta d (k, i)}$ of the region 103 can be approximated using an end point 113 (d1=$\Delta d_{k,i}$), an end point 115 (d1=$\Delta d_{k,i+1}$), a distance d1 of an intermediate point 114 (d1=($\Delta d_{k,i}$+$\Delta d_{k,i+1}$)/2), and the value of each reference power p (d1). Accordingly, the area calculation unit 31 approximates the area of the region 103 only using the values of the three coordinates, and calculates the area using the following Equation (10).

$$p(\Delta d_{k,i}) = P(\Delta d_{k,i}) - \left( \frac{\sum_{i=1}^{n} P(\Delta d_{k,i})}{n} \right) \quad (9)$$

The area calculation unit 31 repeats the series of processes, and sequentially adds the calculated area $s_{\Delta d (k, i)}$ to a reception power integrated value S to calculate the reception power integrated value S. The above-described process is expressed as the following Equation (11).

$$S = \sum_{k=1}^{N} \sum_{i=1}^{n} s_{\Delta d(k,i)} \quad (11)$$

The area calculation unit 31 stores the reception power integrated value S which is sequentially updated in the memory 21.

Figure 28A:
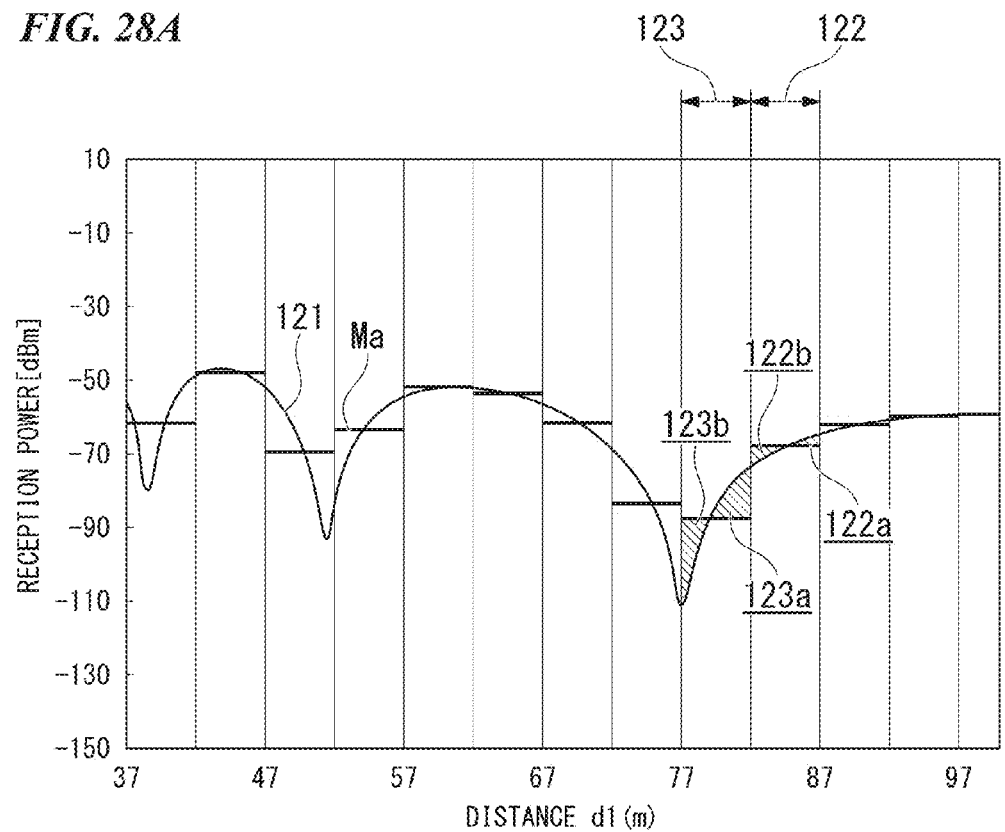
FIG. 28A is a diagram illustrating a reception power curve of a normal detection target and a section average value.

FIG. 28A shows a reception power 121 of a normal detection target and a section average value Ma.

The area of a region which is determined by a curve 121 of reception power of the normal detection target and a straight line of the section average value Ma increases in a section where the reception power of the normal detection target is rapidly changed.

This will be described with reference to a specific example. For example, the area calculated in a section 122 is compared with the area calculated in a section 123. The area calculated in the section 122 is the sum of the area of a region 122a and the area of a region 122b. On the other hand, the area calculated in the section 123 is the sum of the area of a region 123a and the area of a region 123b.

As obvious from FIG. 28A, since the region 123a is longer than the region 122a in the longitudinal axis, the region 123a is larger in area than the region 122a. Similarly, since the region 123b is longer than the region 122b in the longitudinal axis, the region 123b is larger in area than the region 122b.

As described above, in the section where the reception power is rapidly changed, the change width of the reception power is large, and thus, the calculated area is increased.

Figure 28B:
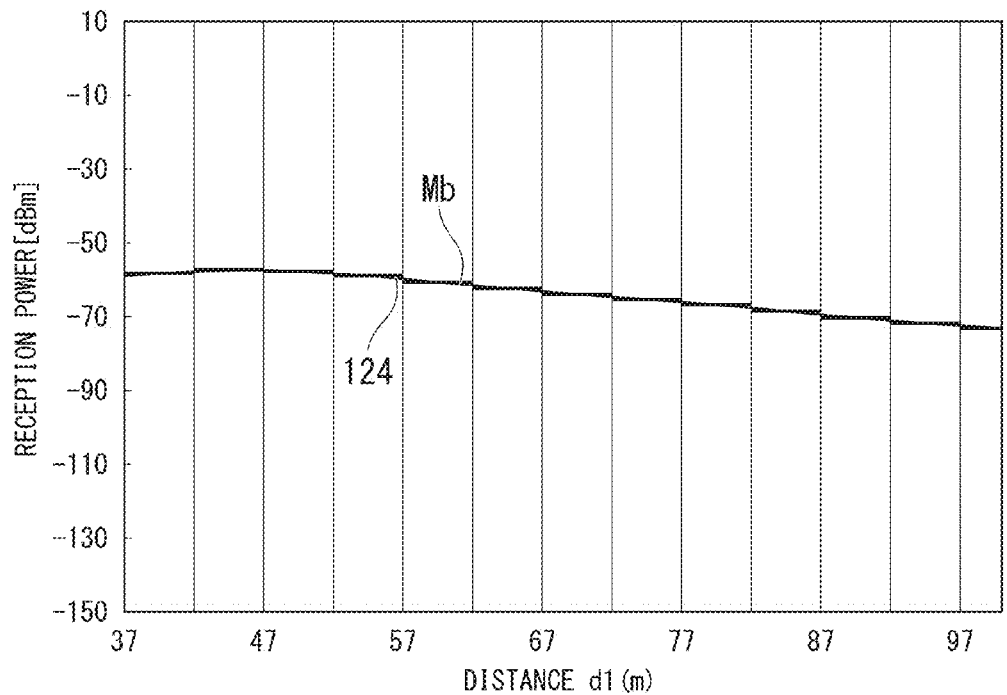
FIG. 28B is a diagram illustrating a reception power curve of a low-height detection target and a section average value.

On the other hand, FIG. 28B shows a reception power 124 of a low-height detection target and a section average value Mb. Since the reception power of the low-height detection target is smoothly changed in all sections instead of being rapidly changed, the area of a region which is determined by a curve 124 of the reception power of the low-height detection target and a straight line of the section average value Mb is decreased in any section.

Accordingly, in a case where the sum of the areas which are determined by the curve of the reception power of the normal detection target and the straight line of the section average value Ma is compared with the sum of the areas which are determined by the curve of the reception power of the low-height detection target and the straight line of the section average value Mb, the sum of the areas which are determined by the curve of the reception power of the normal detection target and the straight line of the section average value Ma is relatively large.

As described above, the number of occurrences is represented as an index of the area of the region determined by the curve of the reception power of the normal detection target and the straight line of the section average value.

In the above embodiment, the area is calculated using the transverse axis as distance; however, the area may be calculated by replacing the transverse axis with time.

Furthermore, in the embodiment, as one boundary when the area is calculated, the straight line in which the longitudinal axis value represents the section average value of the reception power; however, the line which becomes the boundary may be any line if it is a straight line in which the longitudinal axis value is a predetermined value. For example, the straight line may be a straight line in which the longitudinal axis value is a section minimum value, a straight line in which the longitudinal axis value is a section maximum value, or a straight line in which the longitudinal axis value is a section median value.

Figure 29A:
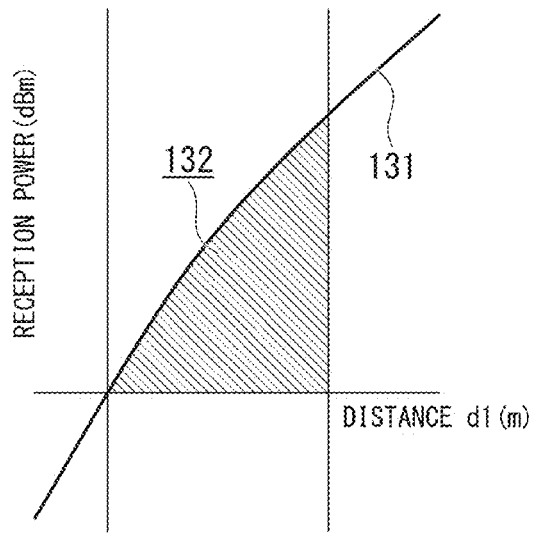
FIG. 29A is a diagram illustrating the area of a reference power of a normal detection target.

For verification, as an example, in a certain section, the area of a region defined using, as a boundary, a reception power curve and a line in which the longitudinal axis value is a minimum value of the section in the case of the normal detection target is compared with that in the case of the low-height detection target. In FIG. 29A, the area of a reception power 131 in the case of the normal detection target in a certain section is represented as a region 132.

Figure 29B:
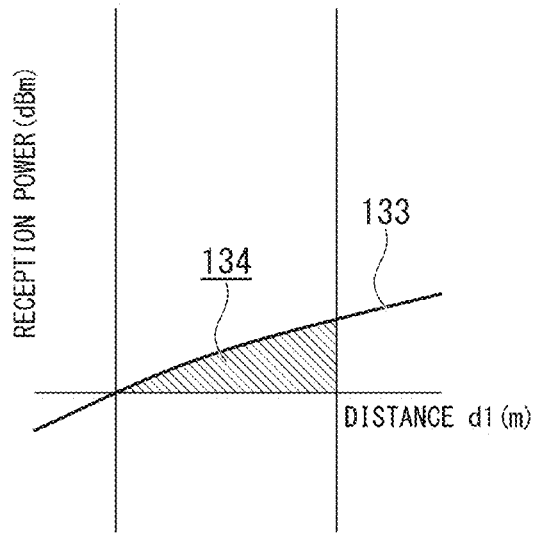
FIG. 29B is a diagram illustrating the area of a reference power of a low-height detection target.

On the other hand, in FIG. 29B, the area of a reception power 133 in the case of the low-height detection target in a certain section is represented as a region 134. Since the variation of the reference power in the case of the normal detection target is larger than the variation of the reference power in the case of the low-height detection target, the area of the region 132 is larger than the area of the region 134.

Accordingly, the number of occurrences is represented as an index of the area of the region defined using, as the boundary, the reception power curve and the line in which the longitudinal axis value is the minimum value of the section. Furthermore, the area of a region defined using, as a boundary, a reception power curve and a line in which the longitudinal axis value is a different predetermined value (for example, a maximum value of the section or a median value of the section) also serves as an index which reflects the number of occurrences.

Furthermore, in the embodiment, the straight line in which the longitudinal axis value is the section average value of the reception power is used as one boundary when the area is calculated; however, the line which becomes the boundary may be a curve. For example, the curve may be a free space propagation attenuation curve. For verification, in a certain section, the area of a region which is determined using a reception power curve and a free space propagation attenuation curve as a boundary in the case of the normal detection target is compared with that in the case of the low-height detection target.

Figure 29C:
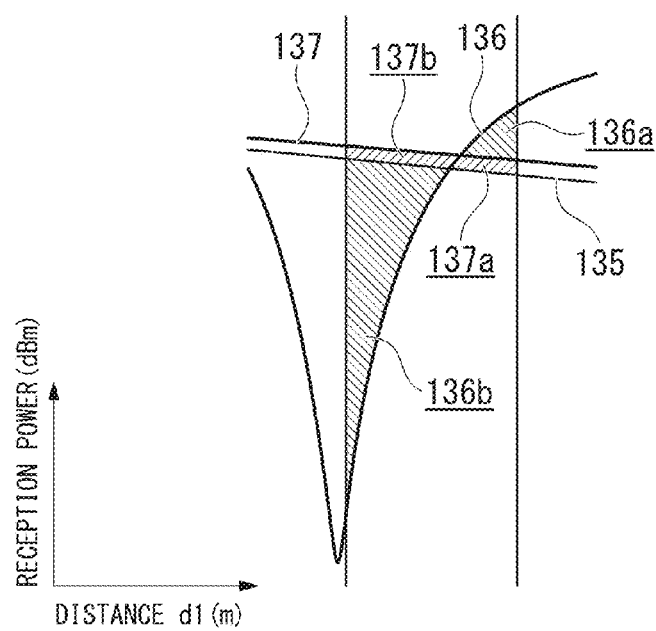
FIG. 29C is a diagram for comparison of the area of the reference power of the normal detection target with the area of the reference power of the low-height detection target.

In FIG. 29C, in the case of the normal detection target, the area of the region which is determined using a reception power curve 136 and a free space propagation attenuation curve 135 as a boundary in a certain section is represented as the sum of the area of a region 136a and the area of a region 136b. On the other hand, in the case of the low-height detection target, the area of a region which is determined using a reception power curve 137 and the free space propagation attenuation curve 135 as a boundary is represented as the sum of the area of a region 137a and the area of a region 137b.

As obvious from FIG. 29C, the area calculated in the normal detection target is larger than the area calculated in the low-height detection target. Accordingly, when the area is calculated, the line which is the boundary may be a curve.

The curve which is the boundary is not limited to the free space propagation attenuation curve; however, may be an approximate curve with respect to a reception power characteristic of a certain target using the least squares method several times. Furthermore, the line which is the boundary may be a predetermined declining (falling to the right) line (including a straight line and a curve).

Accordingly, when the area is calculated, the line which is the boundary may be a straight line or a curve, and may be a predetermined line which is determined in advance.

<Integration Range when Low-Height Detection Target is Determined>

Figure 30:
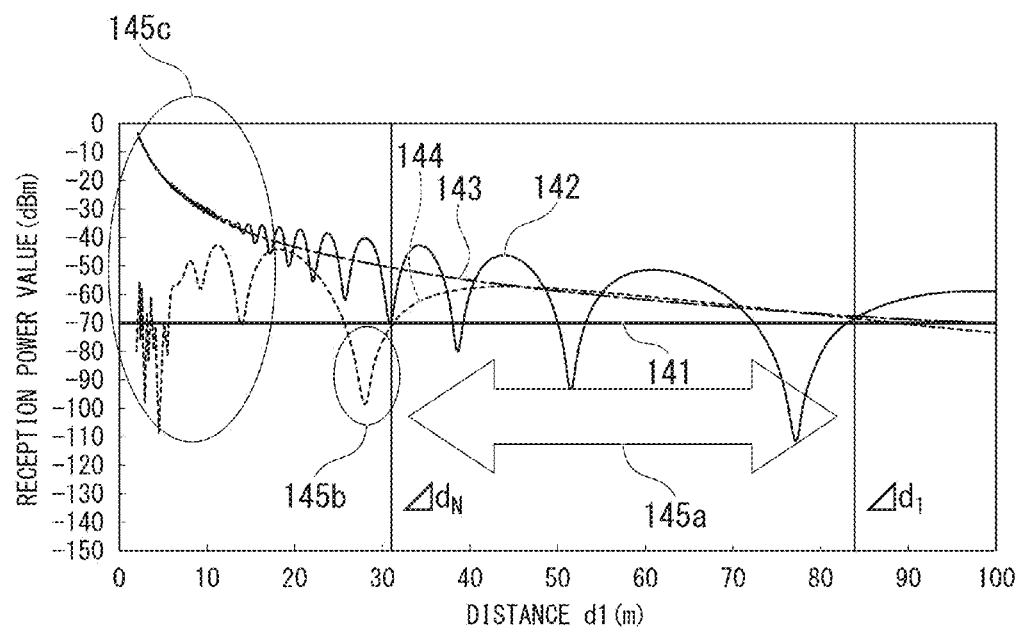
FIG. 30 is a diagram illustrating a method of designating an integration range of the absolute value of a reference power.

Subsequently, in order to enhance efficiency and accuracy of determination of the low-height detection target, designation of an integration range will be described with reference to FIG. 30. In FIG. 30, reference numeral 141 represents a detection threshold value, reference numeral 142 represents a reception power curve of a normal detection target, reference numeral 143 represents a theoretic curve of a reception power due to free space propagation attenuation, reference numeral 144 represents a reception power curve of a low-height detection target, reference numeral 145a is an integration range from $\Delta d_1$ to $\Delta d_N$, reference numeral 145b represents a balance portion in the widest range, and reference numeral 145c represents a vicinity region.

The low-height detection target has a low return power value as a radar reflection sectional area is narrow. In order to positively suppress the amount of calculations, the area calculation unit 31 determines a starting point at a position which is estimated in advance to exceed a detection threshold value. For example, the integration starting position is set to $\Delta d_1$ in FIG. 30.

The area calculation unit 31 determines an ending point at a position which is distant with reference to the balance portion 145b in the widest range which is present in the longest distance which is considered in the range of vision of the radar, with reference to a result calculated under the condition of the maximum assumable height of the low-height detection target.

For example, the integration ending position is set to $\Delta d_N$ in FIG. 30. Accordingly, the area calculation unit 31 calculates the area of reference power in the integration range 145a from $\Delta d_1$ to $\Delta d_N$.

Furthermore, in the vicinity region 145c having a distance of 20 m or shorter, since antenna directionality noticeably appears, a propagation characteristic is greatly changed, the vicinity region 145c is excluded from an integration section.

<Integration Result of Low-Height Detection Target Determination>

Part (a) of FIG. 31 shows an example of an integration result of a normal detection target determination, and Part (b) of FIG. 31 shows an example of an integration result of a low-height detection target determination. Focusing on a section in which is indicated by an arrow at the distance d1 of about 47 m, in numerical comparison which is limited to one closed section, it can be understood that a sufficiently large difference is present between the normal detection target and the low-height detection target (the area of a closed section of the normal detection target is at most 10 or 30 times the area of a closed section of the low-height detection target).

The area calculation unit 31 sequentially adds the section area to the sum of the section areas, and stores the sum of the added section areas in the memory 21. The detection processing unit 32 reads the sum of the section areas from the memory 21, and if the sum of the section integrated values exceeds a predetermined threshold value, the detection processing unit 32 determines that the target is a normal detection target, and outputs the determination result to the target output unit 29.

Thus, as the determination is performed using the sum of the section integrated values, it is possible to targetedly express the difference between the normal detection target and the low-height detection target, and thus, it is possible to perform determination with a large room and with high accuracy.

If any one of the section integrated values exceeds the predetermined threshold value, the detection processing unit 32 may determine that the target is a normal detection target.

Thus, it is possible to perform determination before all the section integrated values are calculated, and thus, even though the distance between the radar and the target becomes long, it is possible to determine that the target is a normal detection target. As a result, it is possible to perform deceleration of the vehicle or evasion operation of the target with a temporal room.

Furthermore, if the number of times when the section integrated value exceeds a predetermined threshold value exceeds a number which is set in advance, the detection processing unit 32 may determine that the target is a normal detection target.

Thus, it is possible to perform determination before all the section integrated values are calculated, and thus, even though the distance between the radar and the distance becomes long, it is possible to determine that the target is a normal detection target. As a result, it is possible to perform deceleration of the vehicle or evasion operation of the target with a temporal room.

Figure 32:
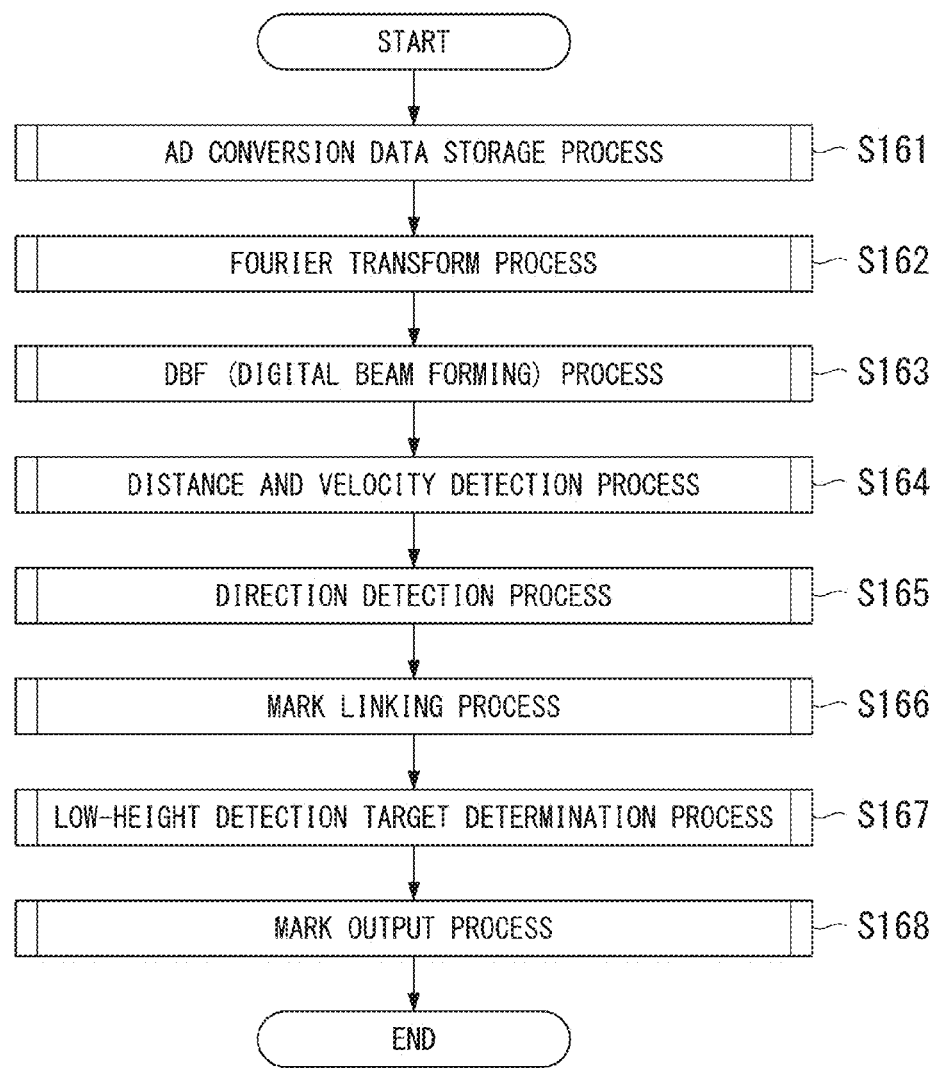
FIG. 32 is a flowchart illustrating an entire target extraction process.

Next, a target extraction process will be described with reference to a flowchart in FIG. 32. The signal processing unit 20 stores beat signals of respective channels corresponding to the respective reception antennas 11 to 1n which are A/D converted in the memory 21 (step S161). Then, the reception intensity calculation unit 22 performs Fourier transform for the beat signals of the channels corresponding to the respective reception antennas 11 to 1n, to calculate signal levels (step S162).

The reception intensity calculation unit 22 outputs the values Fourier-transformed in the time direction for the respective channels to the DBF processing unit 23.

Furthermore, the reception intensity calculation unit 22 outputs the frequency modulation width $\Delta f$, the target frequency in the ascending portion and the target frequency in the descending portion to the distance detection unit 24. Furthermore, the reception intensity calculation unit 22 outputs the central frequency $f_0$, the target frequency in the ascending portion and the target frequency in the descending portion to the vehicle velocity detection unit 25. Furthermore, the reception intensity calculation unit 22 outputs the reception power to the area calculation unit 31 as a function of distance. Furthermore, in a case where the intensity of the received waves cannot be detected, the reception intensity calculation unit 22 outputs information that a target candidate is not present to the target output unit 29.

Then, the DBF processing unit 23 performs further Fourier transform in the antenna array direction for the values Fourier-transformed in the time direction for the respective antennas input from the reception intensity calculation unit 22, performs a spatial complex for each angle channel corresponding to the angle resolution, and outputs the result to the direction detection unit 26 for each beat frequency (step S163).

Then, the distance detection unit 24 calculates the distance from the frequency modulation width $\Delta f$, the target frequency in the ascending portion and the target frequency in the descending portion, which are input from the reception intensity calculation unit 22 (step S164). Furthermore, the velocity detection unit 25 calculates the relative velocity from the central frequency, the target frequency in the ascending portion and the target frequency in the descending portion, which are input from the reception intensity calculation unit 22 (step S164).

The direction detection unit 26 outputs an angle which takes the largest amplitude value from among the calculated spatial complexes for each beat frequency to the target linking unit 27 as a direction where the target is present (step S165).

Next, in a case where absolute values of respective differences between the values of the distance, relative velocity and direction of the target which are currently calculated and the values of the distance, relative velocity and direction of the target which are calculated before one cycle and read from the memory 21 are smaller than values which are determined with respect to the respective values, the target linking unit 27 determines that the target which is detected before one cycle and the currently detected target are the same, updates the values of the distance, relative velocity and direction of the target in the memory 21, and outputs the identification number of the target to the area calculation unit 31 (step S166).

Then, the area calculation unit 31 receives the reception power which is the function of distance, output from the reception power calculation unit 22. The area calculation unit 31 calculates the area of a region which is defined using a curve indicating the function and a straight line determined based on the average value of the electric power of the received waves, in a predetermined distance section. The area calculation unit 31 adds the area to the sum of the calculated areas up to now, and stores the sum of the areas after addition in the memory 21.

The detection processing unit 32 reads the sum of the areas after addition from the memory 21, determines whether the target is a low-height detection target based on the sum of the areas, and then outputs information that the target is a normal detection target or the low-height detection target to the target output unit 29 (step S167). Then, in a case where the target is a normal detection target, the target output unit 29 outputs an identification number of the target as a target (step S168). In a case where the target output unit 29 takes determination results of a plurality of targets and all the determination results correspond to the normal detection targets, the target output unit 29 outputs the identification numbers of the targets which are present in the lane of the host vehicle as targets.

Furthermore, in a case where the target output unit 29 takes determination results of a plurality of targets and all the determination results correspond to the normal detection targets, and in a case where two or more targets are present in the lane of the host vehicle, the target output unit 29 outputs the identification numbers of the targets in which the number of target linking processes read from the memory 21 is as large as the number of targets. Hence, the present flowchart ends.

Figure 33:
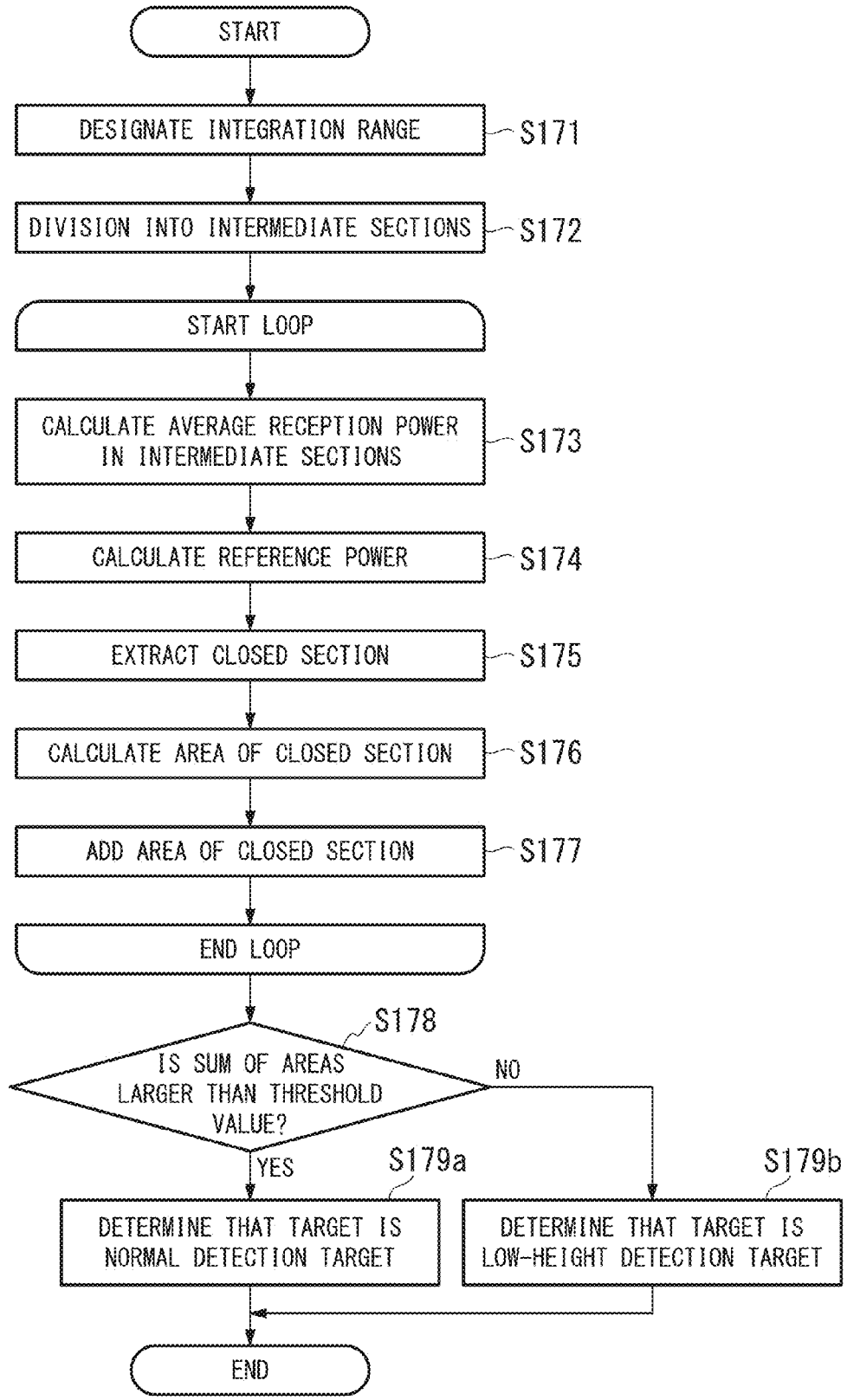
FIG. 33 is a flowchart illustrating a low-height detection target determination process.

Subsequently, the determination process of the low-height detection target in the area calculation unit 31 and the detection processing unit 32 will be described in detail with reference to a flowchart of FIG. 33.

Firstly, the area calculation unit 31 designates an integration range corresponding to the direct distance d1 between the radar and the target (step S171). Next, the area calculation unit 31 divides the direct distance d1 between the radar and the target into arbitrary sections (step S172).

Then, step S173 to step S177 described below are repeated as long as the direct distance d1 is within the integration range designated in step S171.

Firstly, the area calculation unit 31 calculates the average of reception power in the section (hereinafter, referred to as an average reception power) (step S173). Next, the area calculation unit 31 subtracts the average reception power from the reception power in the section, to calculate a reference power (step S174).

Then, the area calculation unit 31 makes the reference power as an absolute value to extract a closed section which is surrounded by a curve of the absolute value of the reference power and an axis of the distance d1 (step S175). Next, the area calculation unit 31 calculates the area of the extracted closed section (step S176). Then, the area calculation unit 31 reads the sum of the areas calculated up to the previous loop from the memory 21, adds the calculated area to the sum of the areas calculated up to the previous loop, and stores the sum of the areas after addition in the memory 21 (step S177). If the area calculation unit 31 completely adds the area calculated for all sections to the sum of the areas, the main loop ends.

In a case where the sum of the calculated areas is larger than a predetermined threshold value (YES in step S178), the detection processing unit 32 determines that the detected target is a normal detection target (step S179a), and outputs information that the target is a normal detection target to the target output unit 29.

On the other hand, in a case where the sum of the calculated areas is equal to or smaller than the predetermined threshold value (NO in step S178), the detection processing unit 32 determines that the detected target is a low-height detection target (step S179b), and outputs information that the target is a low-height detection target to the target output unit 29. Hence, the present flowchart ends.

In the present embodiment, the reception power is calculated as the function of distance; however, the invention is not limited thereto, and a function of time may be used. For example, in a case where the target is stopped, the distance between the radar and the target decreases as time elapses. Thus, in a case where the reception power is represented as a function of time, the sum of the areas of regions which are defined using the reception power curve from the low-height detection target as one boundary is smaller than the sum of the areas of regions which are defined using the reception power curve from the normal detection target as one boundary. Accordingly, the detection processing unit 32 can determine whether or not the target is a low-height detection target according to the difference of the sums of the areas.

In the present embodiment, the electronic scanning type radar device has been described; however, the invention is not limited thereto, and a mechanical operation type radar device may be used. This is because change in the reception power with respect to distance when the mechanical operation type radar device is used is equivalent to a change in the reception power with respect to distance when the electronic scanning type radar device is used.

Hereinbefore, the embodiment 2-1 of the invention according to the second related art has been described; however, the specific configuration is not limited to the embodiment, and may also include a design or the like within a scope of the concept the invention.

(Description about the Third Related Art)

Firstly, the background art will be described.

As described above (see the background art of the first related art), in the related art, a millimeter-wave radar (hereinafter, referred to as a radar) is used as a vehicle-mounted radar.

In general roadways, a reflection structure (hereinafter, referred to as an elevation-view structure) is present at a position which is sufficiently higher than the height of an optical axis of a reception antenna of a radar, such as an overpass, a snow shelter, or a soil and stone shelter. The elevation-view structure should be installed at a position which is sufficiently higher than the height of the vehicle (specifically, 4.5 m or higher) according to safety rules, which does not cause obstruction of vehicle running.

As described above (see the background art of the second related art), at the time of collision reduction control, the performance of rapidly and correctly detecting the target having a risk of collision with the host vehicle is demanded; however, the related art radar device has a problem that an elevation-view structure is falsely detected as a target having a collision risk. Then, in spite of a safe running situation in which a collision accident does not physically occur, a vehicle control device determines that there is a collision risk due to false detection of the radar device. Due to the false detection, control such as unnecessary alarm sending or unnecessary vehicle deceleration is performed to cause discomforts to the driver.

In order to solve the problem, a technique which uses the antenna directionality control has been developed; however, high performance or high functionality of an antenna is demanded for introduction. However, in the vehicle-mounted radar in which a small size and low cost are demanded, it is difficult to completely suppress detection of the elevation-view structure due to the antenna directionality control.

Next, the invention according to the third related art will be described.

To solve the above problem, an object of the invention according to the third embodiment is to provide a radar device and a program which determine whether or not a detected target is an elevation-view structure without antenna directionality control.

According to a first aspect of the invention according to the third related art, there is provided a radar device including: a transmission antenna which transmits radio waves, a reception antenna which receives radio waves generated by reflection of the transmitted radio waves to a target, a received wave acquiring unit which acquires the received radio waves at a predetermined time interval, a reception power calculation unit which calculates electric power of the received radio waves as a function of the number of acquisitions of the received wave acquiring unit, a representative point extraction unit which extracts a plurality of representative points from the function, and a determination unit which determines whether the target is an elevation-view structure positioned at a position which is higher than an optical axis of the reception antenna based on the representative points.

According to the radar device, by extracting appropriate representative points, it is possible to robustly determine whether or not the target is an elevation-view structure without being affected by reception power variation due to spike noise or the like, and thus, it is possible to prevent the elevation-view structure from being falsely detected as a target having a collision risk.

In the radar device, the representative point extraction unit may extract a point of taking an extreme value of the function, and the determination unit may determine whether or not the target is an elevation-view structure based on the extreme value.

According to the radar device, it is possible to robustly determine whether or not the target is an elevation-view structure without being affected by reception power variation due to spike noise or the like, and thus, it is possible to prevent the elevation-view structure from being falsely detected as a target having a collision risk.

In the radar device, the determination unit may calculate the number of the extreme values, and in a case where the number of the extreme values exceeds a predetermined threshold value, the determination unit may determine whether or not the target is an elevation-view structure.

According to the radar device, by appropriately setting the predetermined threshold value using the function that the number of extreme values increases as the height of the elevation-view structure increases, it is possible to robustly determine that the target is an elevation-view structure, and thus, it is possible to prevent the elevation-view structure from being falsely detected as a target having a collision risk.

The radar device may further include a memory which stores the number of extreme values and a height difference between the target and the optical axis of the reception antenna to be matched with each other, and the determination unit may extract the height difference corresponding to the counted number of extreme values from the memory.

According to the radar device, it is possible to extract the height difference between the target and the optical axis of the reception antenna from the counted number of extreme values, and thus, it is possible to calculate the height of the target from the height difference. Accordingly, in a case where the target is an elevation-view structure, by comparing the height of the target with the height of the host vehicle from the ground, it is possible to determine whether or not the host vehicle will collide with the target. Thus, it is possible to notify in advance a collision risk between the target and the host vehicle mounted with the radar device to the driver of the vehicle. On the other hand, in a case where the target is not the elevation-view structure, it is possible to estimate the type of vehicle which is the target from the calculated height of the target.

In the radar device, the determination unit may calculate an approximate function which is obtained by approximating the relationship between the number of acquisitions and electric power in the representative points, and may determine whether or not the target is an elevation-view structure based on the approximate function.

According to the radar device, by calculating the appropriate approximate function, it is possible to determine whether or not the target is an elevation-view structure from a characteristic of the calculated approximate function, and thus, it is possible to prevent the elevation-view structure from being falsely detected as a target having a collision risk.

In the radar device, the determination unit may approximate the relationship between the number of acquisitions and electric power in the representative points using a linear function, and if a linear coefficient of the linear function exceeds a predetermined threshold value, the determination unit may determine that the target is an elevation-view structure.

According to the radar device, by appropriately selecting the predetermined threshold value, it is possible to robustly determine whether or not the target is an elevation-view structure without being affected by reception power variation due to spike noise or the like, and thus, it is possible to prevent the elevation-view structure from being falsely detected as a target having a collision risk.

In the radar device, the relationship between the number of acquisitions and electric power in the representative points may be approximated using a linear function, the difference between a value of the linear function in a predetermined number of acquisitions and electric power of the received radio waves or electric power at the representative points may be calculated, and it may be determined whether or not the target is an elevation-view structure based on the difference.

According to the radar device, it is possible to determine whether or not the target is an elevation-view structure by comparing the difference between the linear function value and the received electric power with a predetermined threshold value, and thus, it is possible to prevent the elevation-view structure from being falsely detected as a target having a collision risk.

In the radar device, the relationship between the number of acquisitions and electric power at the representative points may be approximated using a linear function, the relationship between the number of acquisitions and electric power at the representative points may be approximated using a different function such as a quadratic or higher-order function, the difference between a value of the linear function and a value of the different function such as a quadratic or higher-order function in a predetermined number of acquisitions may be calculated, and it may be determined whether or not the target is an elevation-view structure based on the difference.

According to the radar device, since the difference between the value of the liner function and the value of the different function such as a quadratic or higher-order function at the same distance is increased, it is possible to robustly determine whether or not the target is an elevation-view structure without being affected by variance of extreme values of reception power due to spike noise or the like. Accordingly, it is possible to prevent the elevation-view structure from being falsely detected as a target having a collision risk.

In the radar device, the determination unit may determine whether or not the target is an elevation-view structure based on electric power of the representative points at the number of acquisitions which is determined in advance.

According to the radar device, by appropriately determining the predetermined number of acquisitions (for example, the number of acquisitions corresponding to a distance of 150 m from the target), it is possible to determine whether or not the target is an elevation-view structure based on electric power of the representative points at the number of acquisitions, and thus, it is possible to prevent the elevation-view structure from being falsely detected as a target having a collision risk.

In the radar device, the determination unit may calculate the difference between electric power of the representative points at the number of acquisitions which is determined in advance and electric power of the representative points at a predetermined number of acquisitions, and may determine whether or not the target is an elevation-view structure based on the difference.

According to the radar device, it is possible to determine whether or not the target is an elevation-view structure based on the difference between electric power of the representative points at the number of acquisitions (for example, the number of acquisitions corresponding to a distance of 150 m from the target) which is determined in advance and electric power of the representative points at the predetermined number of acquisitions (for example, the number of acquisitions corresponding to a distance of 100 m from the target), and thus, it is possible to prevent the elevation-view structure from being falsely detected as a target having a collision risk.

In the radar device, the determination unit may approximate the relationship between the number of acquisitions and electric power at the representative points using a different function such as a quadratic or higher-order function, may calculate a value of the linear function and a value of the different function such as a quadratic or higher-order function in a predetermined number of acquisitions, and may determine whether or not the target is an elevation-view structure based on the difference therebetween.

According to the radar device, it is possible to determine whether or not the target is an elevation-view structure based on the difference between a value of a different approximation such as a quadratic or higher-order approximate and an initial value, without being affected by variation of reception power due to spike noise or the like, and thus, it is possible to prevent the elevation-view structure from being falsely detected as a target having a collision risk.

In the radar device, the determination unit may calculate the reflection sectional area of the target based on electric power at the representative points, may calculate an estimated value of electric power of the received radio waves at a predetermined number of acquisitions based on the reflection sectional area, and may determine whether or not the target is an elevation-view structure based on the estimated value.

According to the radar device, by comparing the estimated value of electric power with electric power of the received radio waves or electric power of the representative points, it is possible to determine whether or not the target is an elevation-view structure, and thus, it is possible to prevent the elevation-view structure from being falsely detected as a target having a collision risk.

In the radar device, the determination unit may calculate an approximate function which is obtained by approximating the relationship between the number of acquisitions and electric power of the representative points, may calculate the difference between the estimated value of electric power at the predetermined number of acquisitions and a value of the approximate function, and determine whether or not the target is an elevation-view structure based on the difference.

According to the radar device, it is possible to robustly determine whether or not the target is an elevation-view structure based on the difference between electric power of the representative points and the estimated value of electric power, without being affected by variation of reception power due to spike noise or the like, and thus, it is possible to prevent the elevation-view structure from being falsely detected as a target having a collision risk.

In the radar device, the determination unit may calculate an approximate function which is obtained by approximating the relationship between the number of acquisitions and electric power of the representative points, may calculate the difference between the estimated value of electric power at a predetermined number of acquisitions and a value of the approximate function, and may determine whether or not the target is an elevation-view structure based on the difference.

According to the radar device, it is possible to robustly determine whether or not the target is an elevation-view structure based on the difference between the estimated value of electric power at the predetermined number of acquisitions and the value of the approximate function, and thus, it is possible to prevent the elevation-view structure from being falsely detected as a target having a collision risk.

In the radar device, the representative point extraction unit may extract the plurality of representative points from electric power of the received radio waves in a range of the predetermined number of acquisitions, and the determination unit may determine whether or not the target is an elevation-view structure based on the plurality of representative points at the predetermined number of acquisitions.

According to the radar device, it is possible to determine whether or not the target is an elevation-view structure based on the plurality of representative points with respect to the number of acquisitions in the range of the predetermined number of acquisitions, and thus, it is possible to prevent the elevation-view structure from being falsely detected as a target having a collision risk.

In the radar device, if the locus of the plurality of representative points with respect to the number of acquisitions in the predetermined number of acquisitions is downward convex, it may be determined that the target is an elevation-view structure.

According to the radar device, if a point of taking a lower extreme value among the plurality of representative values in the number of acquisitions which is determined in advance is present, it is possible to determine that the target is an elevation-view structure, and thus, it is possible to prevent the elevation-view structure from being falsely detected as a target having a collision risk.

In the radar device, in a case where a lower extreme value is present in a curve obtained by connecting the plurality of representative points in the predetermined number of acquisitions in the order of the number of acquisitions, it may be determined that the target is an elevation-view structure.

According to the radar device, it is possible to robustly determine that the target is an elevation-view structure without being affected by variation of an upper extreme value of reception power due to spike noise or the like, and without being affected by an acquisition leakage of a value of reception power due to a low sampling frequency of the radar device, it is possible to prevent the elevation-view structure from being falsely detected as a target having a collision risk.

In the radar device, the determination unit may approximate electric power of the plurality of representative points with respect to the predetermined number of acquisitions using a quadratic function, may calculate the number of acquisitions at which the quadratic function takes a lower extreme value or a minimum value, and may determine whether or not the target is an elevation-view structure based on the number of acquisitions taking the lower extreme value or the minimum value.

According to the radar device, it is possible to robustly determine that the target is an elevation-view structure without being affected by variation of an upper extreme value of reception power due to spike noise or the like, and without being affected by an acquisition leakage of a value of reception power due to a low sampling frequency of the radar device, it is possible to prevent the elevation-view structure from being falsely detected as a target having a collision risk.

In the radar device, the radar device may further include a memory which stores the number of acquisitions and a height difference between the target and the optical axis of the reception antenna to be matched with each other, and the determination unit may extract the height difference corresponding to the number of acquisitions taking the lower extreme value or the minimum value from the memory.

According to the radar device, it is possible to extract the height difference corresponding to the distance taking the lower extreme value from the memory, and thus, it is possible to calculate the height of the target using the height difference. Accordingly, in a case where the target is an elevation-view structure, by comparing the height of the target with the height of the host vehicle from the ground, it is possible to determine whether or not the host vehicle will collide with the target. Thus, it is possible to notify in advance a collision risk between the target and the host vehicle mounted with the radar device to the driver of the vehicle. On the other hand, in a case where the target is not the elevation-view structure, it is possible to estimate the type of vehicle which is the target from the calculated height of the target.

According to a second aspect of the invention according to the third related art, there is provided a program which causes a computer to execute a routine including: a first step of acquiring radio waves by a reception antenna at a predetermined time interval, a second step of calculating electric power of the received radio waves as a function of the number of acquisitions; a third step of extracting a plurality of representative points from the function, and a fourth step of determining whether the target is an elevation-view structure which is present above an optical axis of the reception antenna based on the representative points.

According to the program, it is possible to extract the plurality of representative points from the function of the radio waves received with respect to the number of acquisitions, and to determine whether or not the target is an elevation-view structure based on the plurality of representative points. Accordingly, by extracting appropriate representative points, it is possible to robustly determine whether or not the target is an elevation-view structure without being affected by variation of reception power due to spike noise or the like.

According to the invention according to the third related art, it is possible to determine whether or not the detected target is an elevation-view structure regardless of antenna directionality control.

Hereinafter, an electronic scanning type radar device (FMCW type millimeter-wave radar) which is common in respective embodiments of the invention according to the third related art will be described with reference to the accompanying drawings. FIG. 34 is a block diagram illustrating a configuration example of an electronic scanning type radar device which is common in the respective embodiments of the invention.

In the figure, the electronic scanning type radar device 1 which is common in the respective embodiments of the invention according to the third related art includes reception antennas $1_1$ to $1_n$, mixers $2_1$ to $2_n$, a transmission antenna 3, a distributor 4, filters $5_1$ to $5_n$ (n is a positive integer), a SW (switch) 6, an ADC (A/D converter, received waves acquiring unit) 7, a control unit 8, a triangular wave generating unit 9, a VCO (Voltage Controlled Oscillator) 10, and a signal processing unit 20.

The signal processing unit 20 includes a memory 21, a reception intensity calculation unit 22, a DBF detection unit 23, a distance detection unit 24, a velocity detection unit 25, a direction settling unit 26, a target linking unit 27, a representative point extraction unit 33, a determination unit 34, a target output unit 29.

Then, an operation of the electronic scanning type radar device which is common in the respective embodiments of the invention according to the third related art will be described with reference to FIG. 34.

The reception antennas to $1_1$ to $1_n$ receive reflected waves which are generated by reflection of transmitted waves to a target and come from the target, that is, received waves.

Each of the mixers $2_1$ to $2_n$ mixes the transmitted waves transmitted from the transmission antenna 3 with a signal obtained by amplifying the received waves received through each of the reception antennas $1_1$ to $1_n$ by an amplifier, to generate a beat signal corresponding to each frequency difference.

The transmission antenna 3 transmits a transmission signal obtained by frequency-modulating, in the VCO 10, a triangular wave signal generated in the triangular wave generating unit 9 to the target as the transmitted waves.

The distributor 4 distributes the frequency-modulated transmission signal from the VCO 10 to the mixers $2_1$ to $2_n$ and the transmission antenna 3.

The respective filters $5_1$ to $5_n$ perform band limiting with respect to beat signals of Ch1 to Chn corresponding to the respective reception antennas $1_1$ to $1_n$ which are respectively generated in the mixers $2_1$ to $2_n$, and supply the band-limited beat signals to the SW (switch) 6.

The SW 6 sequentially switches the beat signals of $Ch_1$ to $Ch_n$ corresponding to the respective reception antennas $1_1$ to $1_n$ passed through the respective filters $5_1$ to $5_n$ and supplies the result to the ADC (received waves acquiring unit) 7 according to sampling signals input from the control unit 8.

The ADC (received waves acquiring unit) 7 performs A/D conversion for the beat signals of $C_1$ to $Ch_n$ corresponding to the respective reception antennas $1_1$ to $1_n$ input in synchronization with the sampling signals, in synchronization with the sampling signals at a predetermined sampling frequency, for conversion to digital signals from the SW 6, and sequentially stores the result in a waveform storage region of the memory 21 in the signal processing unit 20. In other words, the ADC (received waves acquiring unit) 7 acquires the beat signals at a predetermined time interval.

Figure 34:
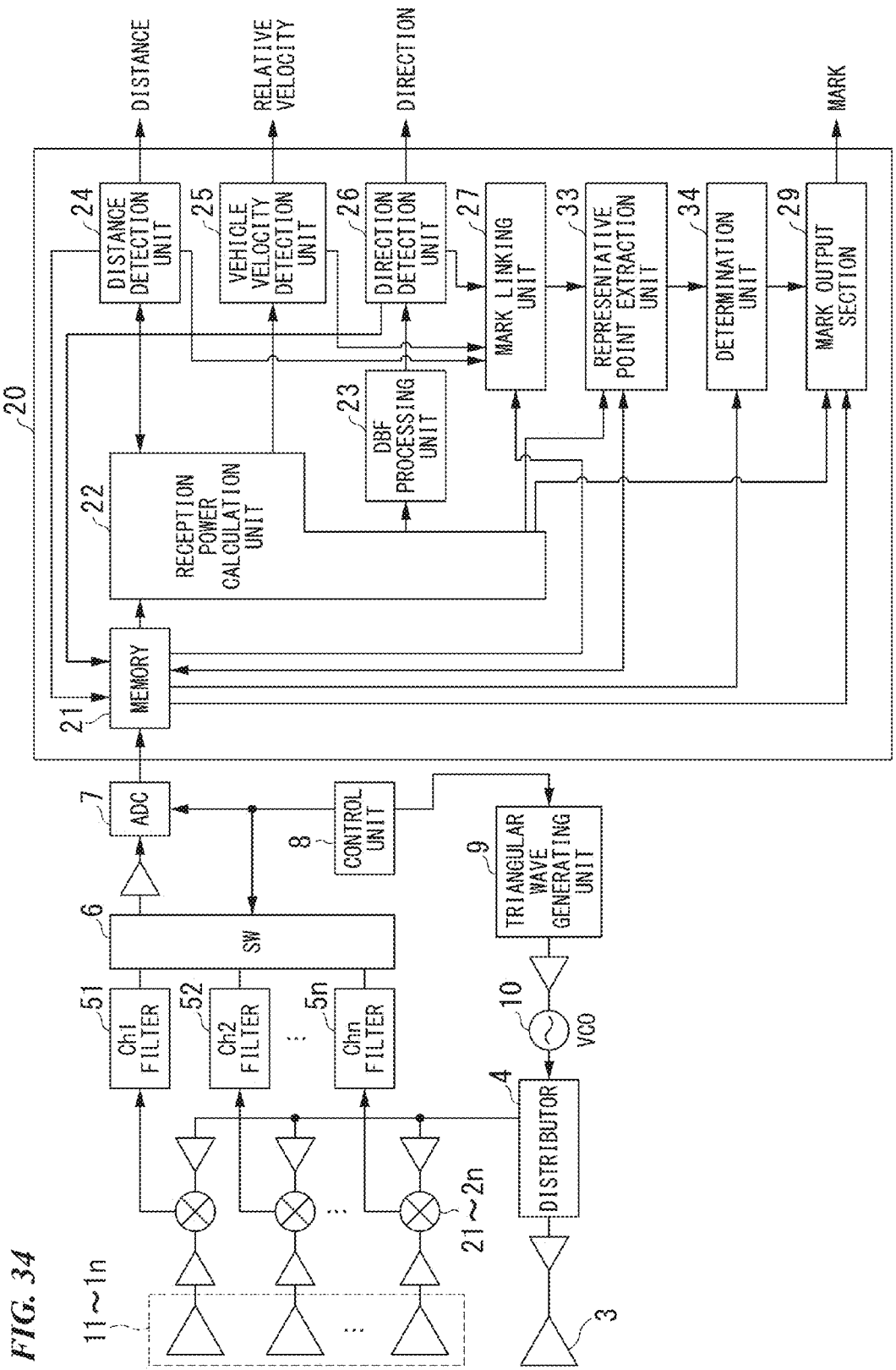
FIG. 34 is a block diagram illustrating a configuration example of an electronic scanning type radar device which is common in respective embodiments of the invention according to a third related art.

The control unit 8 is configured of a microcomputer or the like, and performs the entire operation of the electronic scanning type radar device shown in FIG. 34 based on a control program which is stored in a ROM (not shown) or the like.

The memory 21 in the signal processing unit 20 stores the digital signals which are digital-converted in the A/D converter 7 in the respective channels corresponding to the respective reception antennas $1_1$ to $1_n$.

Furthermore, the memory 21 stores the height of the host vehicle from the ground and the height of goods mounted on the host vehicle. Furthermore, the memory 21 stores a table 100 in which the number of detections of extreme values (which will be described later) and the height difference are matched with each other. Furthermore, the memory 21 stores a table 270 in which a theoretical value of a distance corresponding to a first null point (which will be described later) and the height difference are matched with each other.

<Detection Principle of Distance, Relative Velocity and Horizontal Angle (Direction)>

Next, a principle of detecting the distance, relative velocity and horizontal angle (direction) between the electronic scanning type radar device which is used in the signal processing unit 20 in each embodiment of the invention according to the third related art and the target will be briefly described with reference to FIGS. 13A and 13B.

FIGS. 13A and 13B show a transmission signal obtained by frequency-converting a signal generated by the triangular wave generating unit 9 in FIG. 34 at a central frequency $f_0$ and a modulation width $\Delta f$ in the VOC 10 and a state where the transmission signal is reflected from a target and is input as a reception signal. In the example of FIGS. 13A and 13B, the number of targets is one.

As shown in FIG. 13A, a reception signal which corresponds to reflected waves from the target is delayed and received in the right direction (time delay direction) according to the distance between the radar and the target, with respect to the transmission signal.

Furthermore, the reception signal fluctuates in the vertical direction (frequency direction) due to the Doppler effect according to the relative velocity to the target, with respect to the transmission signal.

The reception intensity calculation unit 22 performs Fourier transform for the beat signals (lower diagram in FIG. 13A) in the respective channels corresponding to the respective reception antennas $1_1$ to $1_n$ which are stored in the memory 21. Here, the amplitude of complex data after Fourier transform is referred to as a signal level.

By using frequency spectrum with respect to complex data in a certain antenna or added values of complex data in all the antennas, the reception intensity calculation unit 22 may detect the presence of the target depending on a beat frequency corresponding to each peak value of the spectrum, that is, the distance. Here, by the addition of the complex data on all the antennas, noise components are averaged to enhance the ratio of S/N.

As a result of Fourier transform, as shown in FIG. 13B, in a case where a single target is present, one peak value is present in an ascending region and a descending region, respectively. Here, in FIG. 13B, the transverse axis represents frequency and the longitudinal axis represents signal intensity.

Furthermore, by detecting a signal level which exceeds a numerical value (threshold value) which is set in advance from the signal level for each beat frequency shown in FIG. 13B, the reception intensity calculation unit 22 determines that a target is present. Here, the peak value of the signal level is referred to as the intensity of the received waves.

In a case where the peak of the signal level is detected, the reception intensity calculation unit 22 supplies a beat frequency of the peak value (both of an upper portion and a lower portion of the beat signal) to the distance detection unit 24 and the vehicle velocity detection unit 25 as a target frequency. The reception intensity calculation unit 22 supplies the frequency modulation width Δf to the distance detection unit 24, and supplies the central frequency $f_0$ to the vehicle velocity detection unit 25.

Furthermore, the reception intensity calculation unit 22 calculates the square of the peak value of the descending portion of the signal level at a predetermined cycle as a reception power. The reception power is supplied to the representative point extraction unit 33 as a function of the distance from the target input from the distance detection unit 24 which will be described later.

In a case where the peak of the signal level cannot be detected, the reception intensity calculation unit 22 outputs information that a target candidate is not present to the target output unit 29.

In this regard, the peak value of the upper portion of the beat signal, or the average of the peak value of the upper portion of the beat signal and the peak value of the lower portion of the beat signal may be used as the signal level.

In a case where a plurality of targets is present, after Fourier transform, peaks of the same number as that of the targets appear in the upper portion and the lower portion of the beat signal, respectively. Since the reception signal is delayed in proportion to the distance between the radar and the target and the reception signal in FIG. 13A is shifted in the right direction, as the distance between the radar and the target becomes long, the frequency of the beat signal in a lower part of FIG. 13A increases.

In a case where a plurality of peaks of the signal level are detected corresponding to the plurality of targets, numbering is performed for the respective peak values in the upper portion and the lower portion in the ascending order of frequency, to be supplied to the determination unit 34. Here, the peaks having the same number in the upper and lower portions correspond to the same targets, and respective identification numbers are used as the numbers of the targets.

Next, the distance detection unit 24 calculates a distance r from a target frequency $f_u$ corresponding to the ascending portion input from the reception intensity calculation unit 22 and a target frequency $f_d$ corresponding to the descending portion, using the following equation. The distance detection unit 24 supplies the calculated distance from the target to the reception intensity calculation unit 22 and the target linking unit 27. Furthermore, the distance detection unit 24 stores the distance from the target in the memory 21.

$$r = \{C \cdot T/(2 \cdot \Delta f)\} \cdot \{(f_u + f_d)/2\}$$

Furthermore, the vehicle velocity detection unit 25 calculates a relative velocity v from the target frequency $f_u$ corresponding to the ascending portion input from the reception intensity calculation unit 22 and the target frequency $f_d$ corresponding to the descending portion, using the following equation, and supplies the result to the target linking unit 27.

$$v = \{C/(2 \cdot f_0)\} \cdot \{(f_u - f_d)/2\}$$

In the equations of calculating the distance r and the relative velocity v, C represents a light velocity, T represents a modulation time (ascending portion/descending portion), $f_u$ represents a target frequency in the ascending portion, and $f_d$ represents a target frequency in the descending portion.

Next, the reception antennas $1_1$ to $1_n$ which are common in the respective embodiments of the invention according to the third related art are arc-shaped antennas which are arranged at an interval d, as shown in FIG. 14. Incoming waves from the target (incident waves, that is, waves reflected from the target with respect to waves transmitted from the transmission antenna 3), which are incident in the direction of an angle φ with respect to an axis perpendicular to a surface on which the antennas are arrayed, are input to the reception antennas $1_1$ to $1_n$.

Here, the incoming waves are received at the same angle φ in the reception antennas $1_1$ to $1_n$. A phase difference of reception signals which are generated between the reception antennas at one end and the other end is calculated by $2\pi f \cdot (d_{n-1} \cdot \sin \phi / C)$, using frequencies f of the reception signals, an interval $d_{n-1}$ between the reception antennas at one end and the other end, and the angle φ.

Using the phase difference, the DBF (digital beam forming) processing unit 23 performs further Fourier transform for input complex data which is Fourier-transformed on a time axis corresponding to each antenna, in the antenna array direction, that is, performs Fourier transform on a spatial axis. Furthermore, the DBF processing unit 23 calculates spatial complex data indicating the intensity of spectrum for each angle channel corresponding to the angle resolution, and supplies the result to the direction detection unit 26 for each beat frequency.

The direction detection unit 26 supplies an angle φ which takes the largest value from among the sizes of the calculated spatial complex data values for each beat frequency to the target linking unit 27 as a direction where the target is present. Furthermore, the direction detection unit 26 stores the direction of the target in the memory 21.

In a case where absolute values of respective differences between the values of the distance, relative velocity and direction of the target which are currently calculated and the values of the distance, relative velocity and direction of the target which are calculated before one cycle and read from the memory 21 are smaller than values which are determined with respect to the respective values, the target linking unit 27 determines that the target which is detected before one cycle and the currently detected target are the same.

In this case, the target linking unit 27 increases the number of target linking processes of the target read from the memory 21. In a case where the absolute values are not smaller than the determined values, the target linking unit 27 considers that a new target is detected. Furthermore, the target linking unit 27 stores the current distance, relative velocity, and direction of the target, and the number of target linking processes of the target in the memory 21. Furthermore, the target linking unit 27 supplies an identification number of the target to the representative point extraction unit 33.

The representative point extraction unit 33 receives reception power which is a function of the distance from the target, which is supplied from the reception power calculation unit 22. Furthermore, the representative point extraction unit 33 extracts an upper extreme value of the reception power which is the function of the distance from the target as a representative value. Furthermore, the representative point extraction unit 33 calculates an extreme value of the reception power as the function of the distance from the target. The representative point extraction unit 33 supplies the calculated extreme value of the reception power which is the function of the distance from the target to the determination unit 34.

The representative point extraction unit 33 does not only extract the upper extreme value as the representative value, but also may extract a lower extreme value as a representative value. Furthermore, the representative point extraction unit 33 may extract an average value or a median value in a predetermined distance section as a representative value. Furthermore, the representative point extraction unit 33 may extract an average value or a median value between an upper extreme value and a lower extreme value which are adjacent to each other as a representative value.

The determination unit 34 receives the extreme value of the reception power which is the function of the distance from the target, which is supplied from the representative point extraction unit 33. Furthermore, the determination unit 34 determines whether the target is a normal detection target having a collision risk or an elevation-view structure which does not hinder running, using an elevation-view structure determination algorithm (which will be described later), and then outputs information about the determination result to the target output unit 29.

In a case where the target is a normal detection target, the target output unit 29 supplies an identification number of the target as a target. In a case where the target output processing unit 29 receives information about determination results of a plurality of targets supplied from the determination unit 34 and all the determination results correspond to the normal detection targets, the target output unit 29 reads the direction of each target from the memory 21. The target output unit 29 extracts a target which is present in the lane of the host vehicle from the direction of each target, and supplies identification numbers of the targets which are present in the lane of the host vehicle as targets to an external device (not shown).

Thus, in a case where the target is a normal detection target having a collision risk, the external device may perform deceleration to prevent collision, or may generate an alarm to call the driver's attention.

Furthermore, in a case where the target output unit 29 receives information about determination results of a plurality of targets and all the determination results correspond to the normal detection targets, and in a case where two or more targets are present in the lane of the host vehicle, the target output unit 29 supplies the identification numbers of the targets in which the number of target linking processes read from the memory 21 is as large as the number of targets. In a case where the target is a low-height detection target, or in a case where information that a target candidate is not present is input from the reception power calculation unit 22, the target output unit 29 supplies information that a target is not present.

Next, the entire flow of a target extraction process will be described with reference to a flowchart in FIG. 16. FIG. 16 is a flowchart of the entire target extraction process. The signal processing unit 20 stores beat signals of respective channels corresponding to the respective reception antennas 11 to 1$n$ which are A/D converted in the memory 21 (step S501).

Then, the reception power calculation unit 22 performs Fourier transform for the beat signals of the channels corresponding to the respective reception antennas $1_1$ to $1_n$, to calculate signal levels (step S502).

The reception power calculation unit 22 supplies the values Fourier-transformed in the time direction for the respective channels to the DBF processing unit 23.

Furthermore, the reception power calculation unit 22 supplies the frequency modulation width Δf, the target frequency in the ascending portion and the target frequency in the descending portion to the distance detection unit 24.

Furthermore, the reception power calculation unit 22 outputs the central frequency $f_0$, the target frequency in the ascending portion and the target frequency in the descending portion to the vehicle velocity detection unit 25.

Furthermore, the reception power calculation unit 22 supplies the peak value of the lower portion of the signal level to the determination unit 34.

Furthermore, in a case where the intensity of the received waves cannot be detected, the reception power calculation unit 22 supplies information that a target candidate is not present to the target output unit 29.

Then, the DBF processing unit 23 performs further Fourier transform in the antenna array direction for the values Fourier-transformed in the time direction for the respective antennas input from the reception power calculation unit 22, calculates a spatial complex for each angle channel corresponding to the angle resolution, and supplies the result to the direction detection unit 26 for each beat frequency (step S503).

Then, the distance detection unit 24 calculates the distance from the frequency modulation width Δf, the target frequency in the ascending portion and the target frequency in the descending portion which are input from the reception power calculation unit 22 (step S504). Furthermore, the velocity detection unit 25 calculates the relative velocity from the central frequency, the target frequency in the ascending portion and the target frequency in the descending portion which are input from the reception power calculation unit 22 (step S504).

The direction detection unit 26 supplies an angle which takes the largest amplitude value from among the calculated spatial complexes for each beat frequency to the target linking unit 27 as a direction where the target is present (step S505).

Next, in a case where absolute values of respective differences between the values of the distance, relative velocity and direction of the target which are currently calculated and the values of the distance, relative velocity and direction of the target which are calculated before one cycle and read from the memory 21 are smaller than values which are determined with respect to the respective values, the target linking unit 27 determines that the target which is detected before one cycle and the currently detected target are the same, updates the values of the distance, relative velocity and direction of the target in the memory, and supplies the identification number of the target to the determination unit 34 (step S506).

Then, the determination unit 34 determines whether the target input from the target linking unit 27 is an elevation-view structure, and supplies information that the target is an elevation-view structure or a forward-view structure to the target output unit 29 (step S507).

Next, in a case where the target is a forward-view structure, the target output unit 29 supplies an identification number of the target as a target (step S508). In a case where the target output unit 29 takes determination results of a plurality of targets and all the determination results correspond to the forward-view structures, the target output unit 29 supplies the identification numbers of the targets which are present in the lane of the host vehicle as targets. Furthermore, in a case where the target output unit 29 takes determination results of a plurality of targets and all the determination results correspond to the forward-view structures, and in a case where two or more targets are present in the lane of the host vehicle, the target output unit 29 supplies the identification numbers of the targets in which the number of target linking processes read from the memory 21 is as large as the number of targets.

<Elevation-View Structure Determination Algorithm>

Next, an elevation-view structure determination algorithm in the determination unit 34 will be described. In general, as conditions of a structure from which radio waves are reflected strongly, a structure having a sufficiently wide reflection sectional area, a structure of an object (or conductor) having low reflection loss, a structure having a flat reflection surface (that is, surface of low dispersion other than reflection), a structure having a reflection surface perpendicular to an optical axis of an antenna, a structure having a reflection surface of a corner reflector structure, or the like is used, for example.

In consideration of these conditions, if actual road conditions are assumed, a structure such as an overpass, a snow shelter, or a soil and stone shelter is suitable. Particularly, a copper bridge which is a kind of overpass is sufficiently wider than the reflection sectional area of the vehicle and is planar. Furthermore, the copper bridge is completely made of metallic materials, and has a corner reflector structure. Thus, a reflection power level $P(d_z)$ which is large, compared with a front vehicle which is a kind of structure which is present on the optical axis of an antenna (hereinafter, referred to as an optical axis structure), may be observed ($d_z$ represents the horizontal distance from the target).

FIG. 35 is a schematic diagram illustrating the position relationship between a vehicle and an elevation-view structure used for a numerical simulation. In the figure, a vehicle 45 includes a radar device. Here, "h1" represents the height of an antenna optical axis of the radar device, "h2" represents the height of a reflection point of a target 46, and "h3" represents the vehicle height of the vehicle 45. Furthermore, "r1" is a direct distance between the vehicle 45 and the elevation-view structure 46.

Furthermore, "r2" represents the distance at which radio waves advance between the vehicle and the road surface when the radio waves indirectly propagate between the vehicle 45 and the elevation-view structure 46. "r3" represents the distance at which radio waves advance between the road surface and the elevation-view structure when the radio waves indirectly propagate between the vehicle 45 and the elevation-view structure 46. "r4" (=r2+r3) represents a propagation distance in indirect propagation.

Furthermore, "$d_z$" represents the horizontal distance between the vehicle 45 and the elevation-view structure 46, and "θ1" represents an angle formed by the road surface and transmitted radio waves or the road surface and received radio waves in indirect propagation.

Figure 36A:
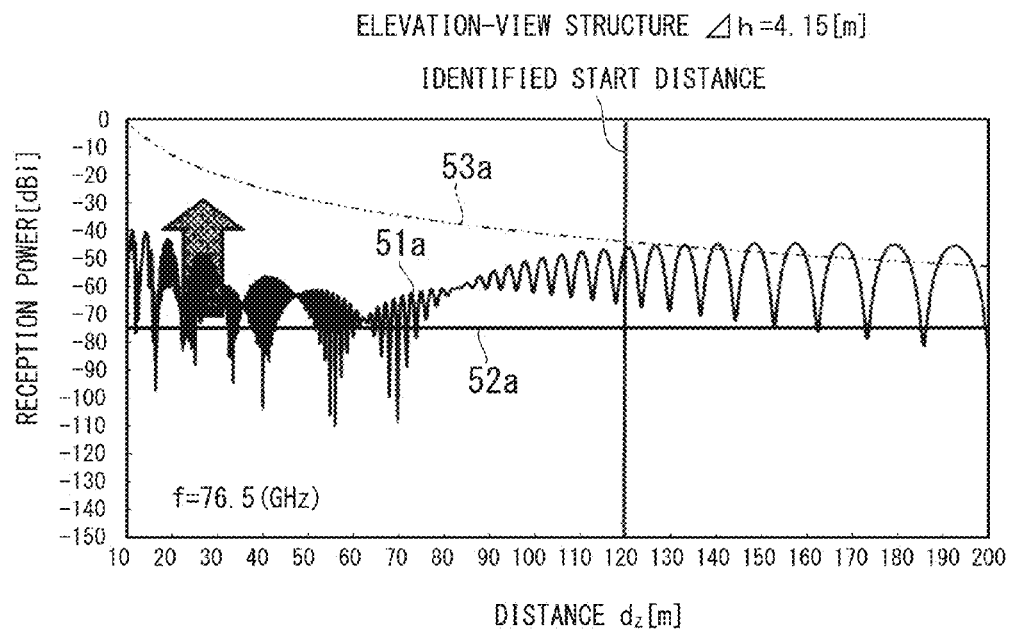
FIG. 36A is a diagram in which reception power estimated by a simulation in which an elevation-view structure is assumed is represented as a function of distance.
Figure 36B:
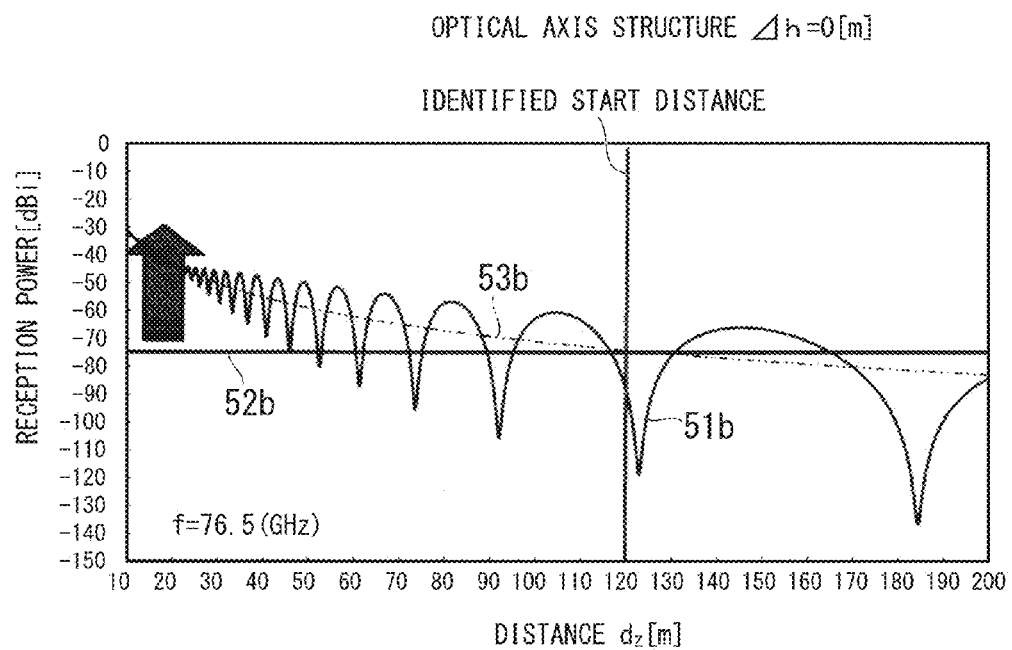
FIG. 36B is a diagram in which reception power estimated by a simulation in which an optical axis structure is assumed is represented as a function of distance.

FIGS. 36A and 36B are diagrams in which reception power estimated by a simulation in which an elevation-view structure or an optical axis structure is assumed is represented as a function of distance. The transverse axis represents the distance $d_z$ (horizontal distance between a host vehicle and a detection target) in the z axis (antenna optical axis) in FIG. 35. The longitudinal axis represents the reception power $P(d_z)$. Antenna conditions in this calculation are set such that a half-width main lobe is 4 degrees and the ratio of reception power of a main lobe and reception power of side lobes is 35 dB.

Firstly, reception power which is estimated by a simulation in which an elevation-view structure is assumed will be described. A height difference Δh (=h2–h1) between the height h1 of the antenna optical axis of the radar device and the height h2 of the reflection point of the target is 4.15 m. Here, the installation height of the radar is 1 m.

Furthermore, an RCS (Radar Cross Section) is set to 30 dB in consideration of an elevation-view structure which is an overpass made of a steel member. This means that the value has a sufficiently wide RCS compared with that of a vehicle which runs in front (which will be described later).

FIG. 36A is a diagram in which the reception power estimated by the simulation in which the elevation-view structure is assumed is represented as the function of distance. In FIG. 36A, a reception power curve 51a which is estimated by the simulation represents the relationship of the reception power with respect to distance in which the phase difference between transmitted waves and received waves is considered. The reception power curve 51a has a point exceeding a detection threshold value 52a if the distance $d_z$ to the target is shorter than 200 m. Furthermore, a free space propagation curve 53a represents the relationship of the theoretical reception power with respect to distance in a case where space attenuation is considered.

Subsequently, reception power estimated by a simulation in which an optical axis structure is assumed will be described. The height difference Δh (=h2–h1) is 0 m. Here, the height h2 of the structure and the installation height h1 of the radar are 1 m. Furthermore, the optical axis structure has an RCS (Radar Cross Section) which is set to 0 dB in consideration of a vehicle which runs in front. Here, the RSC is an amount indicating the degree that an object scatters electromagnetic waves in a case where an incident direction on the radar and a reflection direction from the radar are reversed by 180 degrees.

FIG. 36B is a diagram in which reception power estimated by a simulation in which an optical axis structure is assumed is represented as a function of distance. In FIG. 36B, a reception power curve 51b which is estimated by the simulation represents the relationship of the reception power with respect to distance in which the phases of transmitted waves and received waves are considered. The reception power curve 51b has a point exceeding a detection threshold value 52b if the distance $d_z$ to the target is shorter than 160 m. Furthermore, a free space propagation curve 53b represents the relationship of the theoretical reception power with respect to distance in a case where space attenuation is considered.

Here, the reception power curve 51a in FIG. 36A is compared with the reception power curve 51b in FIG. 36B. In a range where the distance $d_z$ is equal to or longer than 80 m, since the RCS of the elevation-view structure is large, the reception power curve 51a exceeds the detection threshold value 52a in a major portion thereof. On the other hand, in the optical axis structure, since the RCS is smaller than the RCS of the elevation-view structure, the reception power curve 51b exceeds the detection threshold value 52b in an approximately half portion thereof.

Accordingly, the radar device detects the elevation-view structure regardless of the distance from the target. It is difficult to determine whether or not the target is an elevation-view structure or an optical axis structure only using the size of the reception power.

A plurality of factors are included in the locus of the reception power, as shown in FIGS. 36A and 36B. Furthermore, in an environment that the radar device is actually used, since external noise due to multi-pass phasing, internal noise of a circuit and the like are randomly added, the locus is measured as a very complicated non-linear function. The radar should rapidly and correctly extract some characteristics used for recognition from such a complicated locus.

Thus, the determination unit 34 determines the elevation-view structure using any method among the following methods.

Embodiment 3-1

Figure 37:
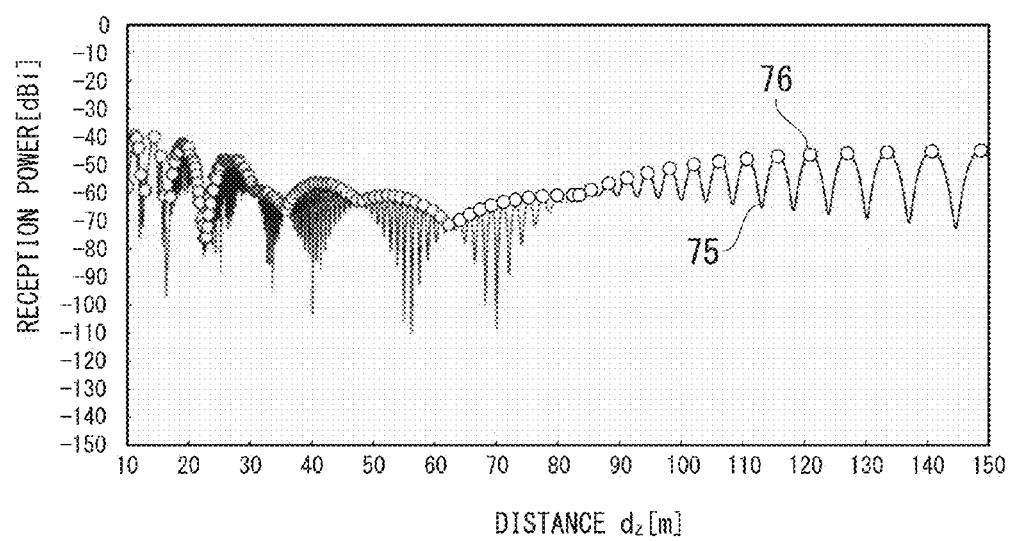
FIG. 37 is a diagram illustrating reception power of an elevation-view structure with respect to the distance from a target, and an upper extreme point thereof.

Firstly, a determination method of an elevation-view structure according to an embodiment 3-1 will be described. FIG. 37 shows reception power of an elevation-view structure with respect to the distance from a target, and an upper extreme point. In the figure, an upper extreme point 76 of a reception power curve 75 is indicated by a white circle.

The determination unit 34 compares reception power in which a propagation characteristic of radio waves is sampled before and after for each distance with respect to a reception power curve, to extract an upper extreme point. Specifically, the determination unit 34 extracts a reception power $P(d_{z,n})$ which satisfies $P(d_{z, n-1}) < P(d_{z, n+1}) < P(d_{z, n})$. Here, n is a positive integer indicating an index of a distance from which reception power is calculated.

Extraction of the upper extreme point is efficient in that a wave propagation characteristic is detected in view of the following three reasons. Firstly, the first reason is that since the upper extreme point takes a value exceeding a detection threshold value even though the distance increases, it is possible to start an analysis process from as a distant place as possible.

The second reason is that when a target is at a predetermined distance, since it is possible to acquire the largest reception power from reception power which can be taken in the vicinity of a position at the distance, it is possible to increase the SN (signal to noise) ratio. Thus, it is possible to avoid interference waves which become noise.

The third reason is that since it is possible to stably observe the reception power, the wave propagation characteristic does not heavily depend on the performance of a measuring apparatus.

Figure 38:
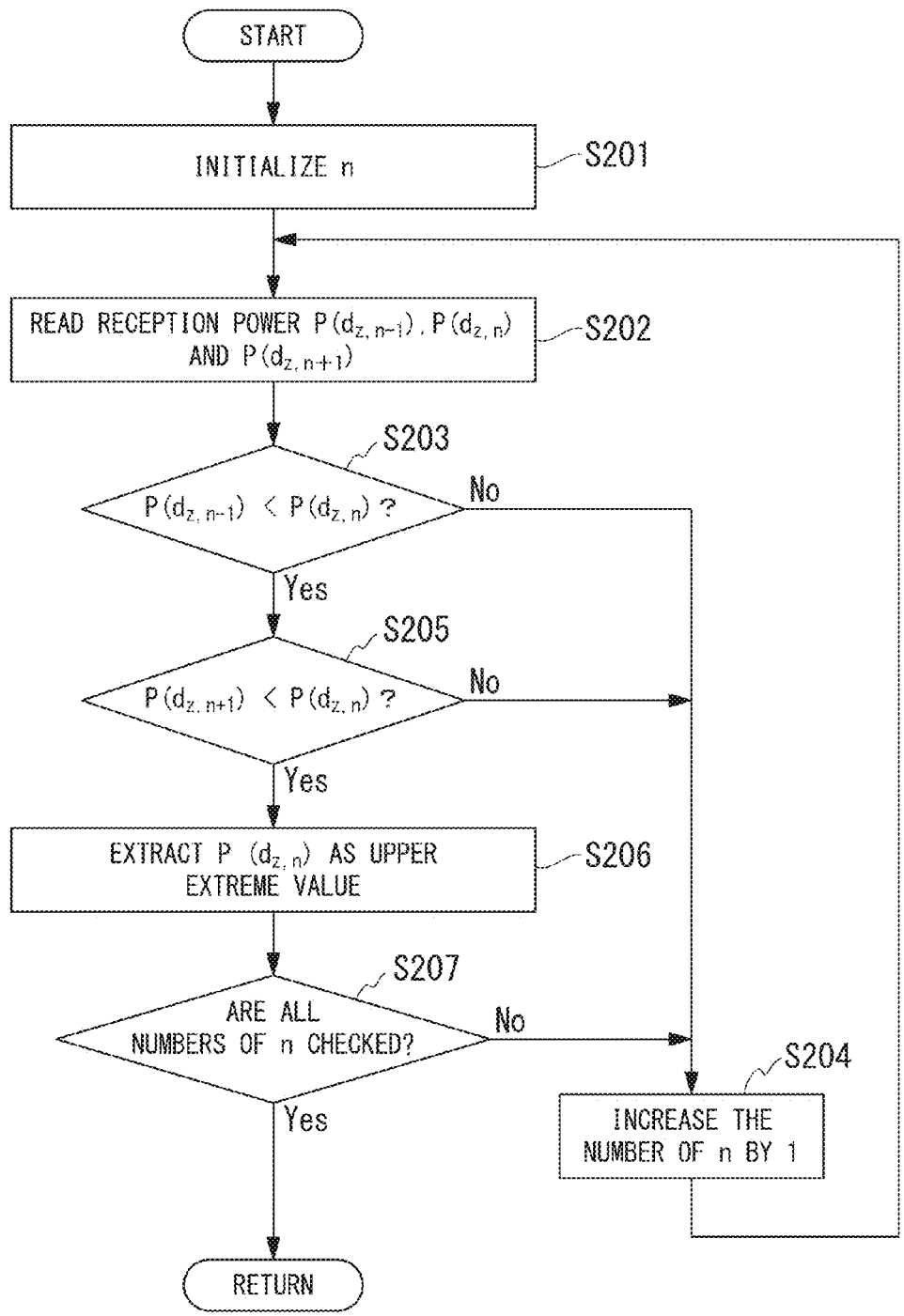
FIG. 38 is a flowchart illustrating an upper extreme point extraction process.

Next, a routine in which the representative point extraction unit 33 extracts an upper extreme point at the same cycle as the cycle when the reception power calculation unit 22 calculates reception power will be described. FIG. 38 is a flowchart illustrating an upper extreme point extraction process, and corresponds to a detailed flowchart of step S301, step S401, step S511, step S611, step S701, step S801, and step S901 in various embodiments (which will be described later). Firstly, the representative point extraction unit 33 initializes n (n is a positive integer which is 2 or more) to 2 (step S201). Then, the representative point extraction unit 33 reads reception power $P(d_{z, n-1})$ before two cycles from the current cycle, $P(d_{z, n})$ before one cycle from the current cycle, and the current reception power $P(d_{z, n+1})$ (step 202). Here, $d_{z, n}$ represents a distance corresponding to reception power which is sampled at the n-th order, and as n increases, the value of $d_{z, n}$ decreases.

Next, the representative point extraction unit 33 compares $P(d_{z, n-1})$ with $P(d_{z, n})$ (step S203). If $P(d_{z, n-1})$ is equal to or greater than $P(d_{z, n})$ (NO in step S203), the representative point extraction unit 33 increases the number of n by 1 (step S204), and then, the routine returns to the process of step S202.

On the other hand, if $P(d_{z, n-1})$ is smaller than $P(d_{z, n})$ (YES in step S203), the representative point extraction unit 33 compares $P(d_{z, n+})$ (step S205).

If $P(d_{z, n-1})$ is equal to or greater than $P(d_{z, n})$ (NO in step S205), the representative point extraction unit 33 increases the number of n by 1 (step S204), and then, the routine returns to the process of step S202.

On the other hand, if $P(d_{z, n+1})$ is smaller than $P(d_{z, n})$ (YES in step S205), the representative point extraction unit 33 extracts $P(d_{z, n})$ as an upper extreme value (step S206).

Next, the representative point extraction unit 33 determines whether all the numbers of n are checked (step S207). As a result, if all the numbers of n are not checked (NO in step S207), the representative point extraction unit 33 increases the number of n by 1 (step S204), and then, the routine returns to the process of step S202.

On the other hand, if all the numbers of n are checked (YES in step S207), the representative point extraction unit 33 terminates the upper extreme point extraction process. Hence, the present flowchart ends.

The representative point extraction unit 33 may extract a lower extreme value instead of the upper extreme value. Thus, since a curve of the reception power with respect to distance has a sharp peak in the vicinity of a lower extreme value compared with the vicinity of the upper extreme value, it is possible to more accurately detect a distance where the lower extreme value is taken.

In this case, the representative point detection unit 33 may extract reception power $P(d_{z, n})$ which satisfies $P(d_{z, n-1}) > P(d_{z, n})$ and $P(d_{z, n+1}) > P(d_{z, n})$.

Subsequently, in order to exemplify the number of upper extreme values, a height difference between the optical axis structure and the elevation-view structure is re-regulated. From the general radar installation height, h1 is lm. In the case of the optical axis structure, the height difference Δh is 0 m.

Generally, the height at which safe cruising of a vehicle is secured is 4.5 m or more from road surface. Accordingly, since the height of the elevation-view structure is set to 4.5 m which is a minimum value of the height, the height difference Δh is 3.5 m. Under the above-mentioned conditions, an example in which upper extreme points of reception power with respect to the respective structures and numbers of the respective maximum points are calculated is shown in FIG. 39.

Figure 39:
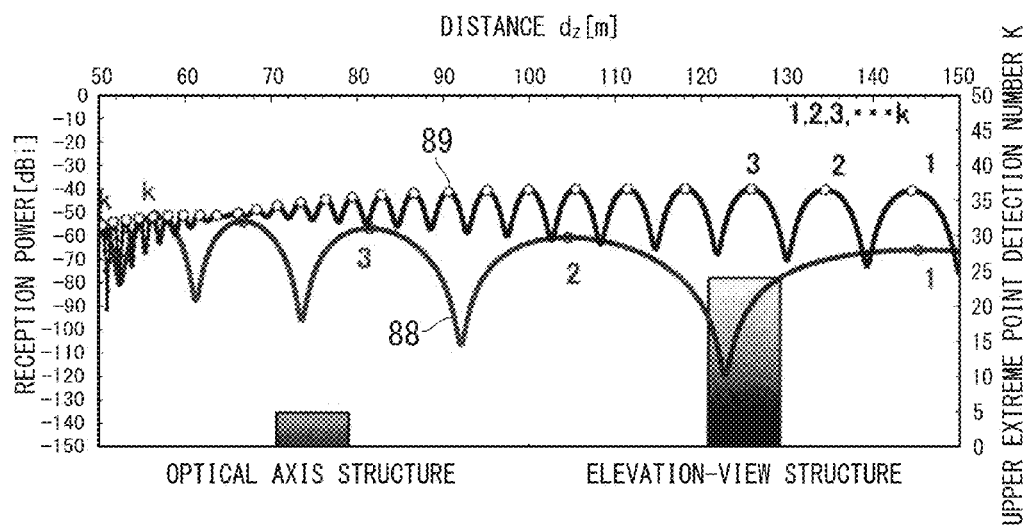
FIG. 39 is a diagram illustrating upper extreme points of reception power indicated on a curve of reception power with respect to the distance from a target and numbers of the respective upper extreme points.

FIG. 39 shows upper extreme points of reception power indicated on a curve of reception power with respect to the distance from a target and numbers of the respective upper extreme points. In the figure, upper extreme values of a reception power curve 88 of the optical axis structure are indicated by white circles. Furthermore, upper extreme values of a reception power curve 89 of the elevation-view structure are indicated by white circles.

The number of detections K of the upper extreme values is large in the elevation-view structure, compared with the optical axis structure. Here, the upper extreme value detection number K is detected once whenever reception power with respect to distance is vibrated once, and thus, the value of frequency of reception power is the same as the value of the upper extreme value detection number K. Accordingly, the upper extreme value detection number K is large in the elevation-view structure compared with the optical axis structure, which means that the frequency of the reception power is large in the elevation-view structure compared with the optical axis structure.

Figure 40:
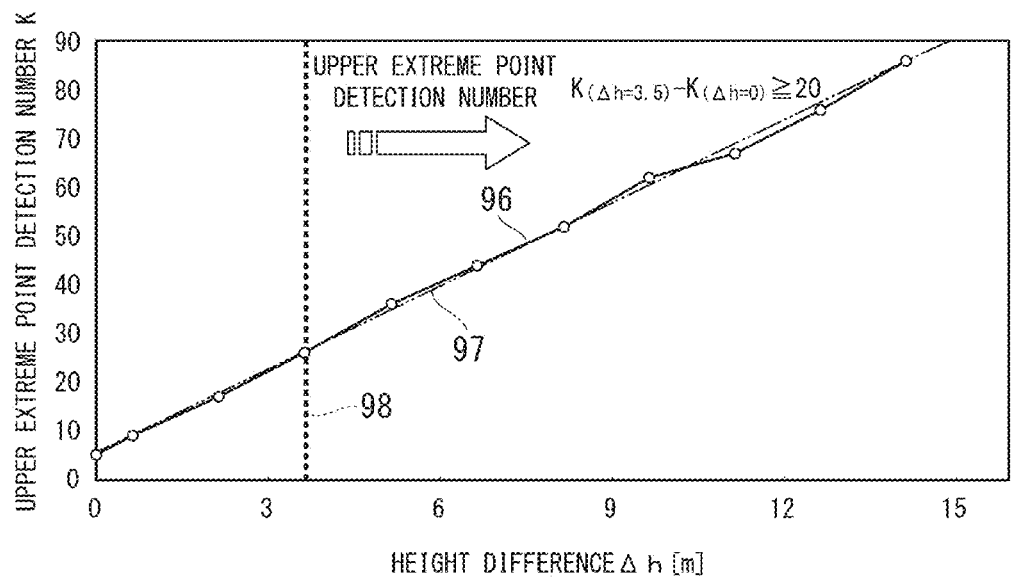
FIG. 40 is a diagram illustrating the number of detections of upper extreme values with respect to height difference.

FIG. 40 is a diagram illustrating the number of detections of upper extreme values with respect to height difference. Referring to an upper extreme value detection number curve 96 calculated by a simulation, the number of detections of the upper extreme points is linearly increased with respect to the height difference Δh. That is, the relationship is established that as the height of the elevation-view structure increases, the number of detections of the upper extreme points increases. The upper extreme value detection number curve 96 can be linearly approximated by a linear approximate line 97.

The upper extreme value detection number $K_{(\Delta h=3.5)}$ in a case where the height difference Δh is 3.5 m is 26, from a point where a straight line 98 where the height difference Δh is 3.5 m intersects with the upper extreme value detection number curve 96. Furthermore, the upper extreme value detection number $K_{(\Delta h=0)}$ in a case where the height difference Δh is 0 m is 5. Accordingly, $K_{(\Delta h=3.5)} - K_{(\Delta h=0)} \geq 20$.

Figure 41:
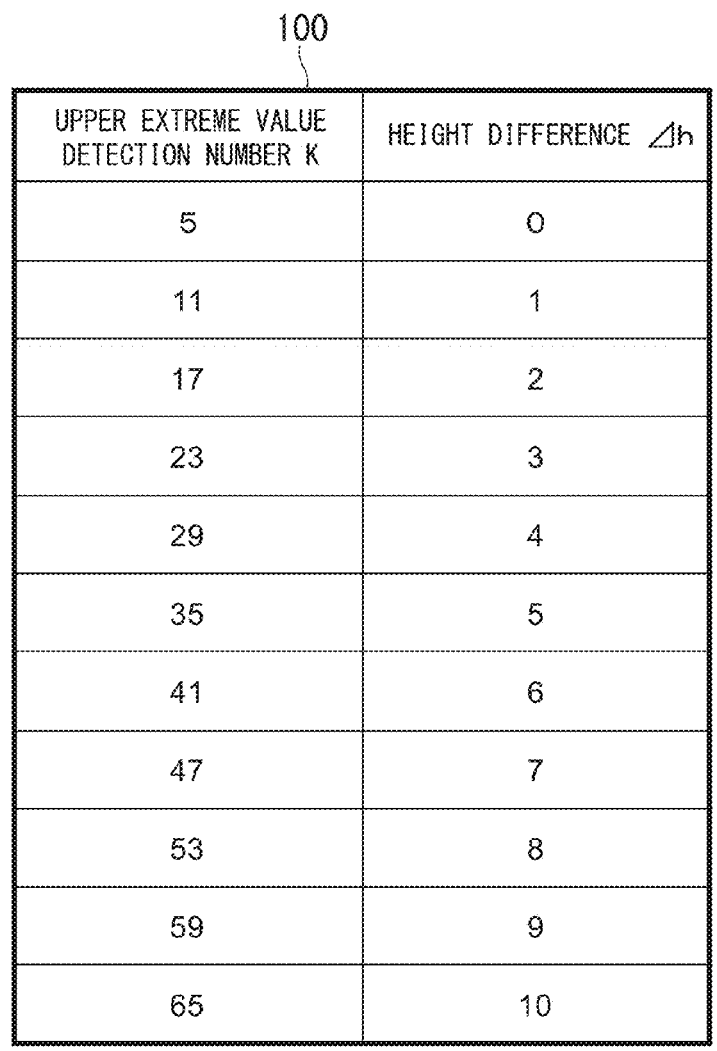
FIG. 41 is a diagram illustrating a table in which an upper extreme value detection number K is matched with a height difference $\Delta h$.

FIG. 41 is a diagram illustrating a table in which the upper extreme value detection number K is matched with the height difference Δh. In the figure, a table 100 stores a combination of the upper extreme value detection number K and the height difference Δh, from the linear approximate line 97 in FIG. 40. Thus, in the table 100, the upper extreme value detection number K is matched with the height difference Δh to be one-to-one.

The memory 21 stores in advance the table 100 in which the upper extreme value detection number K is matched with the height difference Δh. The determination unit 34 extracts the height difference Δh corresponding to the upper extreme value detection number K from the table 100 stored in the memory 21, in order to estimate the height h2 of the target.

Alternatively, the memory 21 stores coefficients of the formula of the linear approximate line 97. The determination unit 34 reads the coefficients of the formula in order to estimate the height h2 of the target. Furthermore, the determination unit 34 substitutes the upper extreme value detection number K for the formula of the linear approximate line 97, to calculate the height difference Δh.

Figure 42:
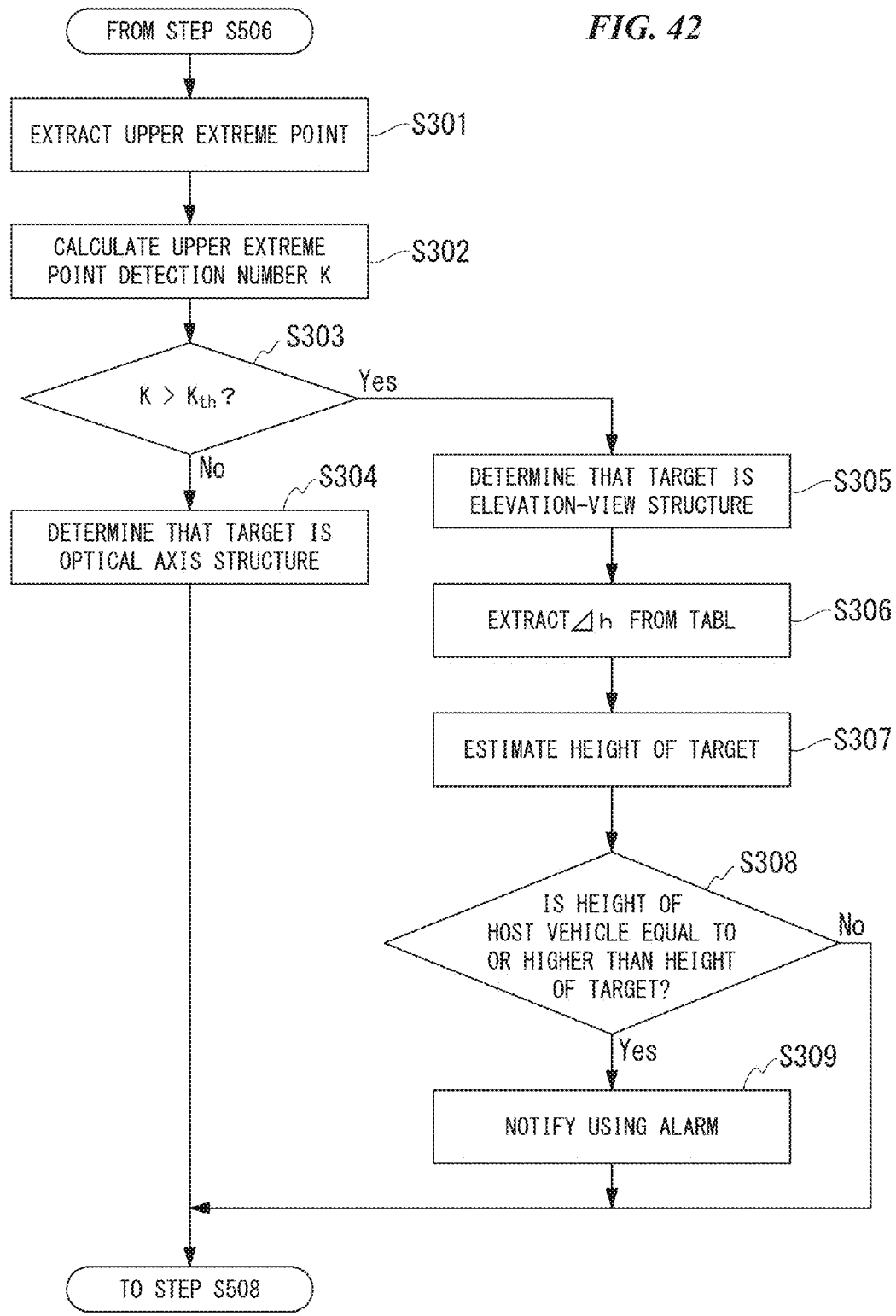
FIG. 42 is a flowchart illustrating an elevation-view structure determination process using the number of detections of upper extreme points.

FIG. 42 is a flowchart illustrating an elevation-view structure determination process using the number of detections of upper extreme points. Furthermore, FIG. 42 is a flowchart illustrating an example of details of the elevation-view structure determination process of step S507 in FIG. 16. Firstly, the representative point extraction unit 33 sequentially extracts upper extreme points at a predetermined cycle from the relationship of the reception power with respect to distance in the routine of the flowchart shown in FIG. 38 (step S301). Next, the determination unit 34 calculates the upper extreme point detection number K (step S302). If the upper extreme point detection number K is equal to or less than a predetermined threshold value $K_{th}$ (NO in step S303), the determination unit 34 determines that the target is an optical axis structure.

On the other hand, if the upper extreme point detection number K is larger than the predetermined threshold value $K_{th}$ (YES in step S303), the determination unit 34 determines that the target is an elevation-view structure. Next, the determination unit 34 reads the table 100 which is stored in the memory 21, and extracts the height difference Δh from the upper extreme point detection number K (step S306). Then, the determination unit 34 adds the height h1 of the antenna optical axis of the radar device to the extracted height difference Δh to calculate the height of the target (step S307).

Next, after calculating the height of the target, the determination unit 34 determines whether the host vehicle mounted with the radar device will collide with the target (for example, a traffic light, a railway viaduct or the like) (step S308). The determination unit 34 reads the height of the host vehicle from the ground which is stored in advance in the memory 21.

Furthermore, in a case where the read height of the host vehicle from the ground is equal to or higher than the height of the calculated height of the target (YES in step S308), the determination unit 34 performs control for sending an alarm through a speaker (not shown) (step S309). On the other hand, in a case where the read height of the host vehicle from the ground is lower than the height of the calculated height of the target (NO in step S308), the determination unit 34 terminates the process. Hence, the present flowchart ends.

As described above, by comparing the height of the target with the height of the host vehicle, the determination unit 34 can determine whether or not the host vehicle will collide with the target. Thus, the determination unit 34 can notify in advance a collision risk between the target and the host vehicle to the driver of the vehicle mounted with the radar device.

In the present flowchart, in a case where it is determined that the target is an elevation-view structure, the height difference is extracted from the table 100 to estimate the height of the target; however, the invention is not limited thereto, and the height difference may be calculated from the formula of the linear approximate line 97 to estimate the height of the target.

Furthermore, in the present flowchart, the height of the target is estimated in a case where it is determined that the target is an elevation-view structure; however, the invention is not limited thereto, and the height of the target may be estimated in a case where it is determined that the target is an optical axis structure. Thus, it is possible to estimate the type of vehicle which is the target from the height of the target.

Furthermore, in the present flowchart, in a case where the height of the host vehicle from the ground read from the memory 21 is equal to or higher than the height of the target, the determination unit 34 performs control for sending an alarm; however, the invention is not limited thereto. In a case where the height, from the ground, of goods loaded on the host vehicle is higher than the height of the host vehicle from the ground, the determination unit 34 reads the height from the ground of the goods loaded on the host vehicle from the memory 21, and in a case where the height from the ground of the goods loaded on the host vehicle is equal to or higher than the height of the target, the determination unit 34 may perform control for sending an alarm.

Furthermore, after it is determined that the target is an optical axis structure in step S304, the determination unit 34 may estimate the vehicle type of the target. Specifically, for example, the determination unit 34 may estimate the height of the target by the same method as in step S306 and step S307. Furthermore, the determination unit 34 reads the height from the ground of the host vehicle from the memory 21.

Furthermore, in a case where the estimated value of the height h2 of the target is 2 m or higher, the determination unit 34 determines that the target is a normal truck. On the other hand, in a case where the estimated value of the height h2 of the target is 2 m or lower, the determination unit 34 determines that the target is a passenger car.

As described above, according to the embodiment 3-1, from the relationship that the number of extreme values increases as the height of the elevation-view structure increases, it is possible to robustly determine whether or not the target is an elevation-view structure without being affected by reception power variation due to spike noise or the like, as the height of the elevation-view structure increases.

Furthermore, it is possible to extract the height difference between the target and the optical axis of the reception antenna from the counted number of extreme values, and thus, it is possible to calculate the height of the target from the difference of the height. Accordingly, in a case where the target is an elevation-view structure, by comparing the height of the target with the height of the host vehicle from the ground, it is possible to determine whether or not the host vehicle will collide with the target. Thus, it is possible to notify in advance the collision risk between the target and the host vehicle mounted with the radar device to the driver of the vehicle. On the other hand, in a case where the target is not the elevation-view structure, it is possible to estimate the type of vehicle which is the target, from the calculated height of the target.

Embodiment 3-2

Subsequently, an elevation-view structure determination method according to an embodiment 3-2 will be described. The determination unit 34 determines the elevation-view structure by the method of the embodiment 3-2. FIG. 43 is a diagram illustrating a curve (hereinafter, referred to as an upper extreme value curve) obtained by connecting upper extreme values of a curve of the reception power with respect to distance and an approximation straight line of the upper extreme value curve.

Part (a) of FIG. 43 shows an upper extreme value curve of a curve indicating the relationship of the reception power with respect to distance in the elevation-view structure shown in FIG. 36A and an approximation straight line of the upper extreme value curve. An upper extreme value curve 165a of a curve of the reception power with respect to distance in the figure is calculated from reception power calculated in a case where it is assumed that an elevation-view structure having a difference height Δh of 5.15 m is present, using the above-mentioned method.

A linear approximation straight line 166a is a straight line obtained by linear approximation of the upper extreme value curve 165a of the curve of the reception power with respect to distance.

Here, a calculation range of the approximation straight line or the approximate curve is a range from a distance $d_z$ of 150 m to a distance $d_{null}$ of a point 167a in which direct waves becomes a first null point. The first null point corresponds to an elevation angle at which reception sensitivity is 0 in an interval between a main lobe and a first side lobe of an antenna. The first null point is a point determined by an antenna directivity pattern.

Part (b) of FIG. 43 shows an upper extreme value curve of a curve indicating the relationship of the reception power with respect to distance in the optical axis structure and an approximation straight line of the upper extreme value curve. An upper extreme value curve 165b of the reception power in the figure is calculated from the reception power calculated in a case where it is assumed that an optical axis structure having a difference height Δh of 0 m is present, using the above-mentioned method.

A linear approximation straight line 166b is a straight line obtained by linear approximation of the upper extreme value curve 165b of the curve of the reception power with respect to distance. Here, a calculation range of the approximation straight line or the approximate curve is a range from the distance $d_z$ of 150 m to the distance $d_{null}$ of the first null point 167a.

Figure 44:
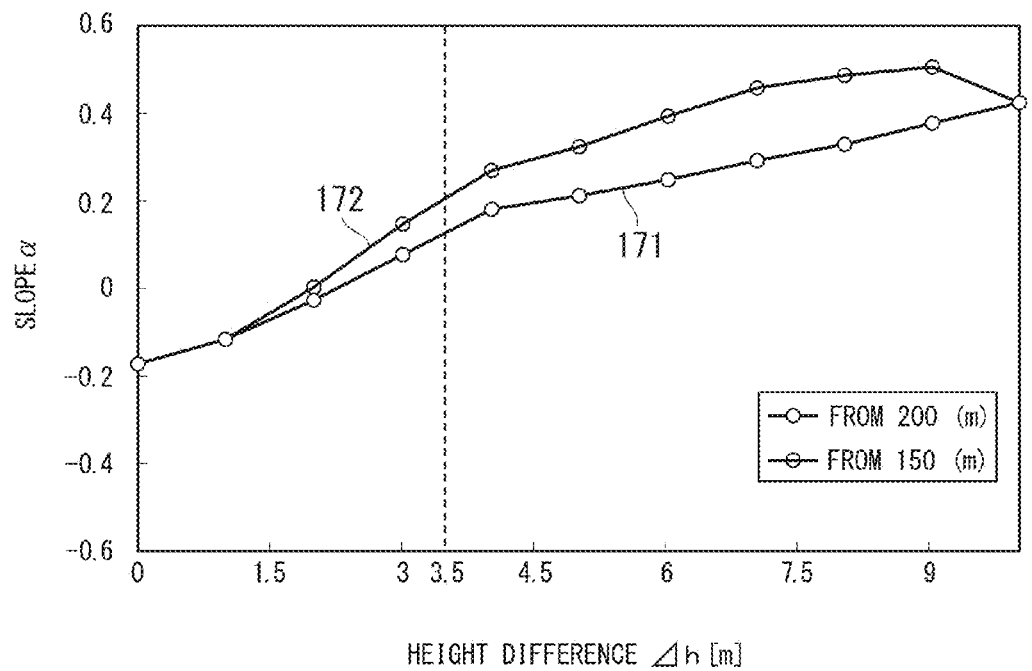
FIG. 44 is a diagram illustrating the relationship between a linear coefficient of a linear approximation straight line and height difference.

FIG. 44 is a diagram illustrating the relationship between a linear coefficient of a linear approximation straight line and the height difference. A polygonal line 171 represents the relationship between the linear coefficient of the linear approximation straight line and the height difference in a case where the linear approximation straight line is calculated from a distance of 200 m. The polygonal line 172 represents the relationship between the linear coefficient of the linear approximation straight line and the height difference in a case where the linear approximation straight line is calculated from a distance of 150 m.

In any polygonal line, the sign of a linear coefficient α (slope) is reversed to be positive from the height difference Δh of about 2 m. Accordingly, in a case where the height difference Δh in the elevation-view structure is 3.5 m or higher, the sign of the linear coefficient α (slope) is positive. Accordingly, the sign of the linear coefficient α (slope) may be used for determination of the elevation-view structure.

Figure 45:
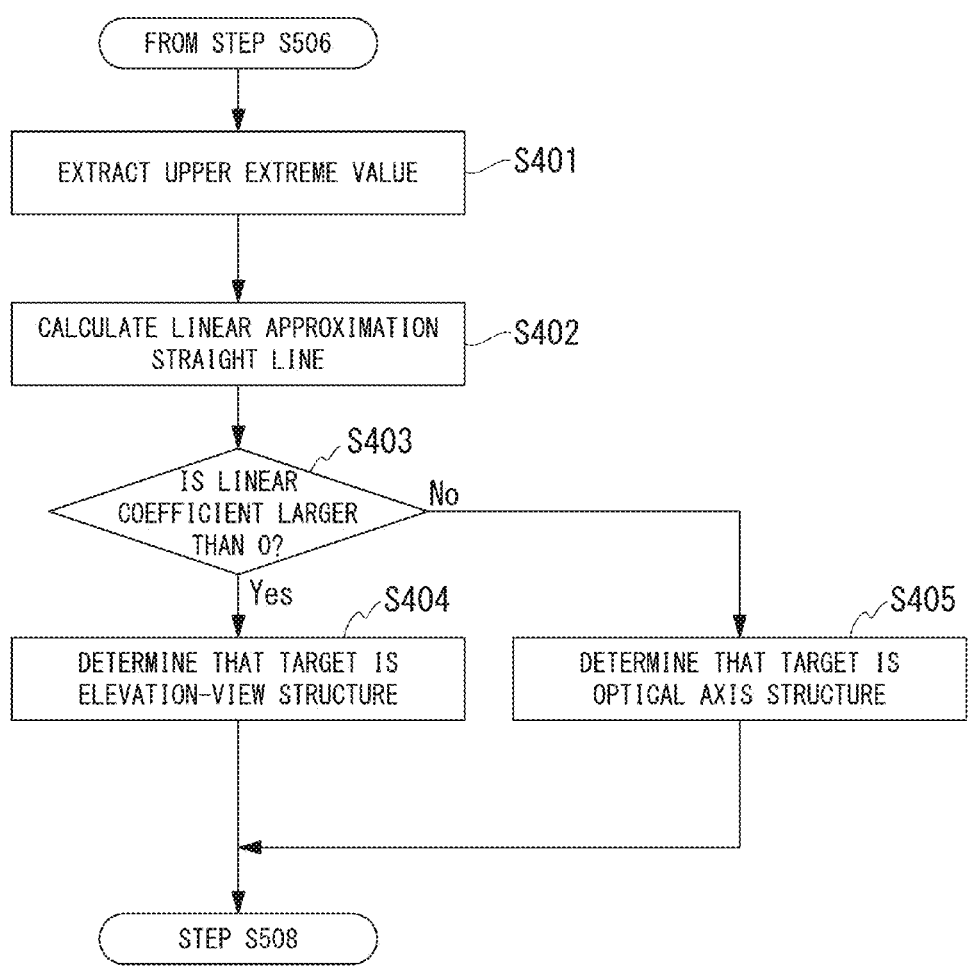
FIG. 45 is a flowchart illustrating an elevation-view structure determination process using a linear coefficient of a linear approximation straight line.

FIG. 45 is a flowchart illustrating an elevation-view structure determination process using a linear coefficient of a linear approximation straight line. Furthermore, FIG. 45 is a flowchart illustrating an example of details of the elevation-view structure determination process in step S507 of FIG. 16. Firstly, the representative point extraction unit 33 sequentially extracts upper extreme points at a predetermined cycle from the relationship of the reception power with respect to distance in the routine of the flowchart shown in FIG. 38 (step S401). Next, the determination unit 34 calculates a linear approximation equation obtained by approximating the relationship between the upper extreme points and the distance (step S402).

If the linear coefficient α is larger than 0 (YES in step S403), the determination unit 34 determines that the target is an elevation-view structure (step S404).

On the other hand, if the linear coefficient α is 0 or less (NO in step S403), the determination unit 34 determines that the target is an optical axis structure (step S404). Hence, the present flowchart ends.

As described above, according to the embodiment 3-2, since it is possible to approximate the extreme values of the reception power with respect to distance using the linear function, in a case where the linear coefficient of the linear function is larger than a predetermined threshold value, it is possible to determine that the target is an elevation-view structure. Accordingly, by appropriately determining the predetermined threshold value, it is possible to robustly determine whether or not the target is an elevation-view structure without being affected by reception power variation due to spike noise or the like.

Embodiment 3-3

Figure 46A:
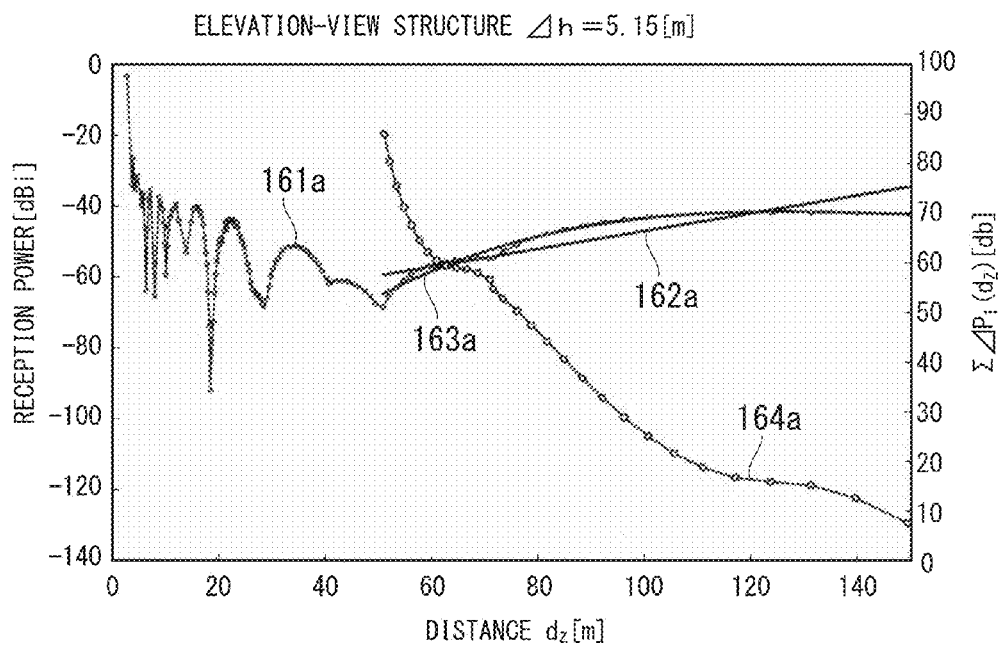
FIG. 46A is a diagram illustrating an upper extreme value curve of reception power, a linear approximation straight line thereof, a cubic approximate curve thereof, and the sum of absolute values of differences between electric power values on the linear approximation straight line and electric power values of the cubic approximate curve, with respect to an elevation-view structure.
Figure 46B:
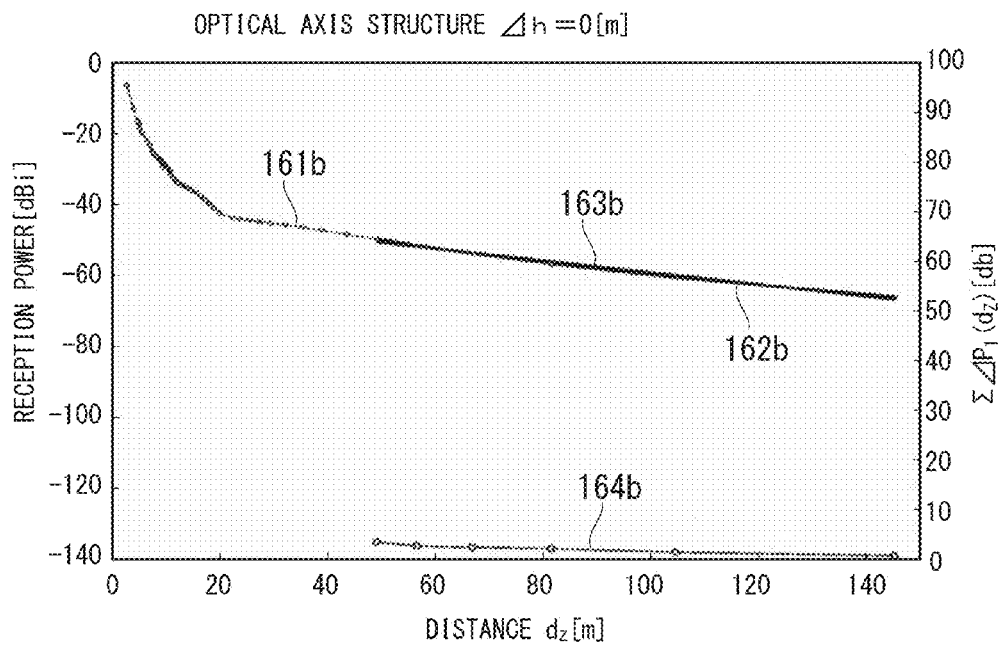
FIG. 46B is a diagram illustrating an upper extreme value curve of reception power, a linear approximation straight line thereof, a cubic approximate curve thereof, and the sum of absolute values of differences between electric power values on the linear approximation straight line and electric power values of the cubic approximate curve, with respect to an optical axis structure.

Subsequently, an elevation-view structure determination method according to an embodiment 3-3 will be described. FIGS. 46A and 46B are diagrams illustrating an upper extreme value curve of the reception power with respect to distance, a linear approximation straight line of the reception power with respect to distance, a cubic approximate curve of the reception power with respect to distance, and a curve obtained by associating a value (the sum of absolute values of differences) $\Sigma|\Delta P_1(d_z)|$ obtained by summing, as the distance decreases, absolute values of differences between electric power values on the linear approximation straight line and electric power values of the cubic approximate curve in each distance, with the distance. In this figure, the longitudinal axis on the left side represents an upper extreme value curve of reception power, a linear approximation straight line, and reception power [dBi] of a cubic approximate curve. On the other hand, the longitudinal axis on the right side represents the sum $\Sigma|\Delta P_1(d_z)|$ dB of absolute values of differences.

FIG. 46A is a diagram illustrating an upper extreme value curve 161a of the reception power with respect to distance, a linear approximation straight line 162a of the reception power with respect to distance, a cubic approximate curve 163a of the reception power with respect to distance, and a curve 164a obtained by associating, with the distance, a value (the sum of absolute values of differences) obtained by summing, as the distance decreases, absolute values of differences between electric power values on the linear approximation straight line 162a and electric power values of the cubic approximate curve 163a in each distance, in an elevation-view structure having a height difference Δh of 4.15 m. In the figure, as the distance $d_z$ decreases, the sum 164a of the absolute values of the differences is continuously increased while ascending to the left side.

FIG. 46B is a diagram illustrating an upper extreme value curve 161b of the reception power with respect to distance, a linear approximation straight line 162b of the reception power with respect to distance, a cubic approximate curve 163b of the reception power with respect to distance, and a curve 164b obtained by associating, with the distance, a value (the sum of absolute values of differences) obtained by summing, as the distance decreases, absolute values of differences between electric power values on the linear approximation straight line 162b and electric power values of the cubic approximate curve 163b in each distance, in an optical axis structure having a height difference Δh of 0 m. In the figure, even though the distance $d_z$ decreases, the sum 164b of the absolute values of the differences is not increased as much as the sum 164a of the absolute values of the differences.

As shown in FIG. 46A, in a range from the distance of the elevation-view structure of 150 m to the distance $d_{null}$, due to the affect of antenna directionality, a cubic function preferably fits to the upper extreme value curve of reception power. On the other hand, in the above-mentioned range, since the upper extreme value curve of reception power of the optical axis structure is approximately treated as a linear function, the linear approximate function preferably fits to the upper extreme value curve of reception power.

According to the above mentioned characteristic, the relationship is established that the linear approximation straight line preferably fits to the upper extreme value curve of reception power of the optical axis structure; however, it does not fit to the upper extreme value curve of reception power of the elevation-view structure. The determination unit 34 identifies the elevation-view structure using this relationship.

Specifically, the determination unit 34 identifies the elevation-view structure using the difference $\Delta P(d_z)$ between electric power calculated from the linear approximation equation and electric power calculated from the quadratic or higher-order approximation equation in a certain distance.

The determination unit 34 may identify the elevation-view structure using the difference between electric power calculated from the linear approximation equation and electric power extracted from the upper extreme value curve of reception power in a certain distance.

As an identification method using $\Delta P(d_z)$, there are three methods in the ascending order of time taken for the process, as follows. (1) A method of determining that the target is an elevation-view structure in a case where $\Delta P(d_z)$ exceeds a predetermined threshold value. (2) A method of determining whether $\Delta P(d_z)$ exceeds a predetermined threshold value for each distance, and determining that the target is an elevation-view structure in a case where the number of times when $\Delta P(d_z)$ exceeds a predetermined threshold value exceeds a predetermined count threshold value. (3) A method of calculating the area of a region surrounded by a linear approximation equation and a quadratic or higher-order approximation equation or an upper extreme value curve of reception power, and determining that the target is an elevation-view structure in a case where the calculated area exceeds a predetermined area threshold value.

Here, rapidity and reliability of the elevation-view structure determination process establishes a trade-off relationship. Hereinafter, specific description will be made according to the above-mentioned order.

In the first method, the determination unit 34 calculates an electric power $P_1$ at a distance which is determined in advance using the linear approximation equation. Furthermore, the determination unit 34 calculates an electric power $P_3$ at the same distance using the quadratic or higher-order approximation equation or the upper extreme value curve of reception power. Furthermore, the determination unit 34 calculates a difference ΔP between $P_1$ and $P_3$ or the absolute value of the difference ΔP. Furthermore, in a case where the calculated ΔP or the absolute value of ΔP exceeds a predetermined threshold value, the determination unit determines that the target is an elevation-view structure.

In the second method, the determination unit 34 calculates an electric power $P_1(d_z)$ using the linear approximation equation for each distance $d_z$ which is determined in advance. Furthermore, the determination unit 34 calculates an electric power $P_3(d_z)$ using the quadratic or higher-order approximation equation or the upper extreme value curve of reception power for each distance $d_z$ which is determined in advance. Furthermore, the determination unit 34 calculates a difference $\Delta P(d_z)$ between $P_1(d_z)$ and $P_3(d_z)$ or the absolute value of the difference $\Delta P(d_z)$.

Furthermore, the determination unit 34 counts the number of times when the difference $\Delta P(d_z)$ or the absolute value of the difference $\Delta P(d_z)$ exceeds a predetermined threshold value. In a case where the counted number of times exceeds a predetermined count threshold value, the determination unit 34 determines that the target is an elevation-view structure.

In the third method, the determination unit 34 calculates the power $P_1(d_z)$ using the linear approximation equation for each distance $d_z$ which is determined in advance. Furthermore, the determination unit 34 calculates the power $P_3(d_z)$ using the quadratic or higher-order approximation equation or the upper extreme value curve of reception power for each distance $d_z$ which is determined in advance. Furthermore, the determination unit 34 calculates the absolute value of the difference $\Delta P(d_z)$ between $P_1(d_z)$ and $P_3(d_z)$.

Furthermore, the determination unit 34 calculates the sum $\Sigma \Delta P(d_z)$ of the differences $\Delta P(d_z)$ or the sum $\Sigma |\Delta P(d_z)|$ of the absolute values of the differences $\Delta P(d_z)$. In a case where the calculated sum $\Sigma \Delta P(d_z)$ or the sum $\Sigma |\Delta P(d_z)|$ exceeds a predetermined sum threshold value, the determination unit 34 determines that the target is an elevation-view structure.

Subsequently, the sum $\Sigma \Delta P(d_z)$ calculated using the third method will be described. If the sum $\Sigma \Delta P(d_z)$ exceeds the predetermined threshold value, the determination unit 34 determines that the target is an elevation-view structure. On the other hand, if the sum $\Sigma \Delta P(d_z)$ is equal to or less than the predetermined threshold value, the determination unit 34 determines that the target is an optical axis structure.

Here, the predetermined threshold value is determined using the minimum necessary height difference Δh when the target is identified to be an elevation-view structure, and the elevation angle pattern of the antenna sensitivity. Here, the height difference Δh is determined by the height h1 of the antenna optical axis of the radar device and the height h2 of the elevation-view structure. Accordingly, the predetermined threshold value is determined using the height h1 of the antenna optical axis of the radar device, the minimum necessary height of the elevation-view structure when the target is identified to be an elevation-view structure, and the elevation angle pattern of the antenna sensitivity.

Figure 47:
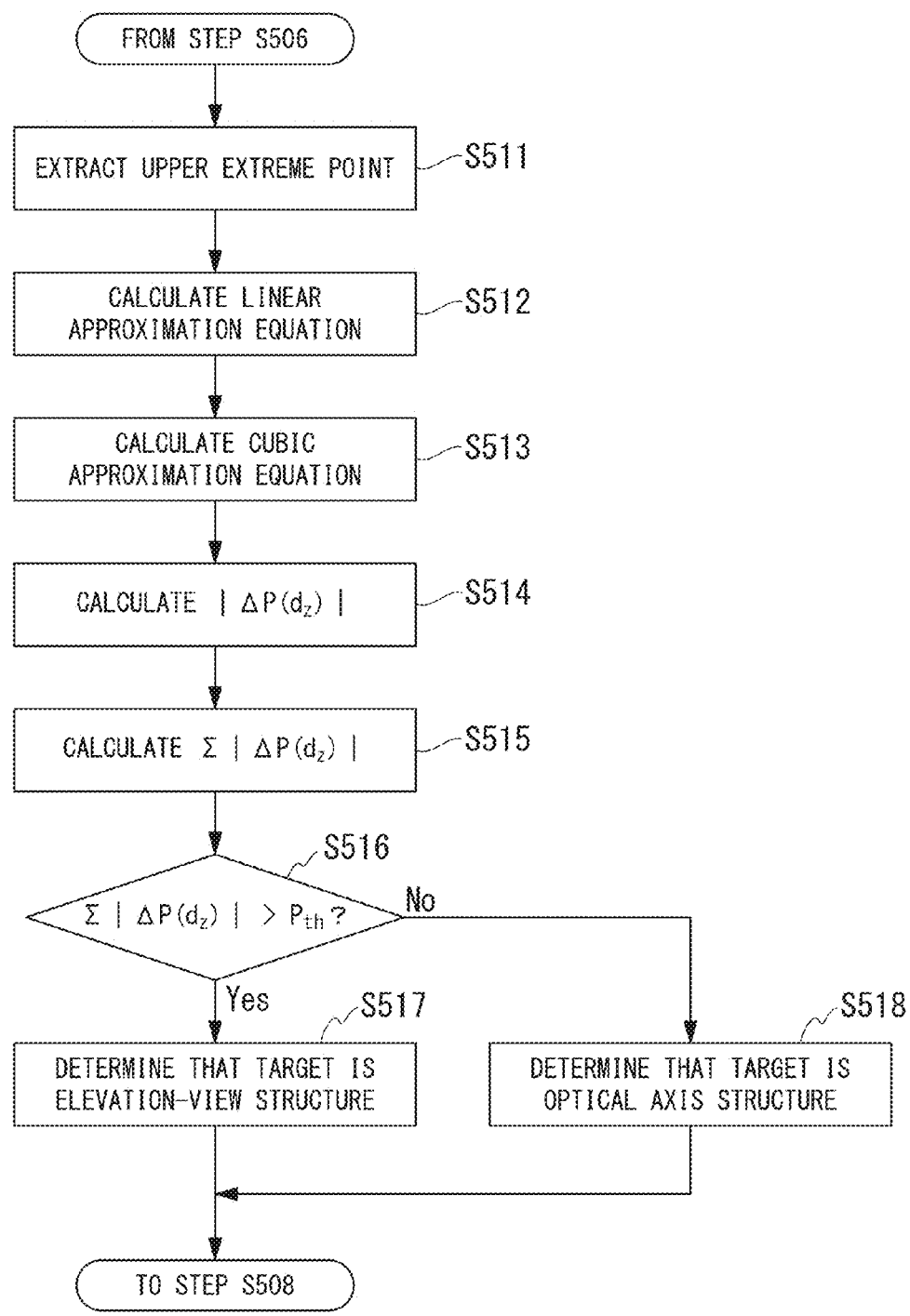
FIG. 47 is a flowchart illustrating an elevation-view structure determination process using the sum of absolute values of differences between electric power calculated from a linear approximation equation and electric power calculated from a cubic approximation equation.

FIG. 47 is a flowchart illustrating an elevation-view structure determination process using the sum of absolute values of differences between electric power calculated from the linear approximation equation and electric power calculated from the cubic approximation equation. Furthermore, FIG. 47 is a flowchart illustrating an example of details of the elevation-view structure determination process of step S507 in FIG. 16.

Firstly, the representative point extraction unit 33 sequentially extracts upper extreme points at a predetermined cycle from the relationship of the reception power with respect to distance in the routine of the flowchart shown in FIG. 38 (step S511). Next, the determination unit 34 calculates a linear approximation equation obtained by approximating the relationship between the upper extreme points and distance (step S512).

Next, the determination unit 34 calculates the cubic approximate curve obtained by approximating the relationship between the upper extreme points and distance (step S513). Then, the determination unit 34 calculates an electric power $P_1(d_z)$ using the linear approximation equation for each distance $d_z$ which is determined in advance. Furthermore, the determination unit 34 calculates an electric power $P_3(d_z)$ using the cubic approximation equation for each distance $d_z$ which is determined in advance. Furthermore, the determination unit 34 calculates an absolute value $|\Delta P(d_z)|$ of the difference between $P_1(d_z)$ and $P_3(d_z)$ (step S514).

In a case where the absolute value $|\Delta P(d_z)|$ of the difference exceeds a predetermined threshold value $P_{th}$ (YES in step S516), the determination unit 34 determines that the target is an elevation-view structure (step S517).

In a case where the difference absolute value $|\Delta P(d_z)|$ is equal to or less than a predetermined threshold value $P_{th}$ (NO in step S516), the determination unit 34 determines that the target is an elevation-view structure (step S518). Hence, the present flowchart ends.

As described above, according to the embodiment 3-3, since the extreme values of the reception power with respect to distance in the elevation-view structure can be approximated using the quadratic or higher-order function instead of the linear function, the difference between the value of the linear function and the value of the quadratic or higher-order function at the same distance increases. Thus, it is possible to robustly determine that the target is an elevation-view structure without being affected by variation in extreme values of reception power variation due to spike noise or the like In the embodiment 3-3, it is determined whether or not the target is an elevation-view structure based on the difference between the value of the linear function and the value of the quadratic or higher-order function at the same distance; however, the invention is not limited thereto. That is, it may be determined whether or not the target is an elevation-view structure based on the difference between the value of the linear function and electric power of the received waves or electric power in the upper extreme value which is one of the representative points at the same distance.

Embodiment 3-4

Subsequently, an elevation-view structure determination method according to an embodiment 3-4 will be described. As described above, as an example, a curve of reception power $P(d_z)$ from an upper extreme value (hereinafter, referred to as an initial power value) of reception power in the vicinity of a distance of 150 m to a target to a first null point or a distance of 40 m in an optical axis structure is compared with that in an elevation-view structure.

Figure 48A:
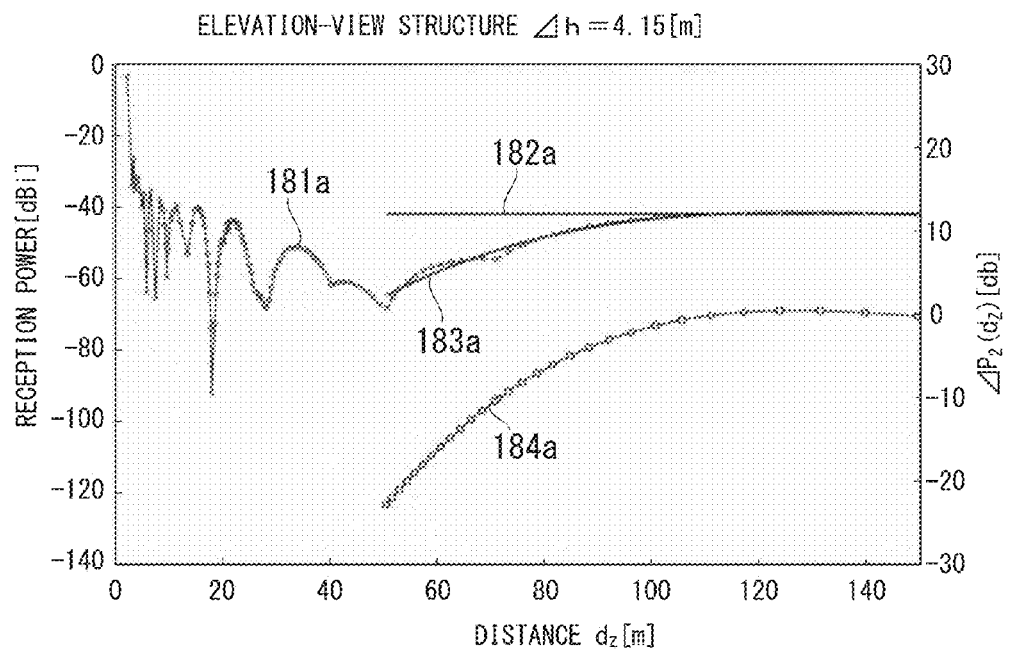
FIG. 48A is a diagram illustrating an upper extreme value curve of reception power, a straight line indicating an initial power value thereof, a cubic approximate curve thereof, and the sum of absolute values of differences between the initial power value and a power value on the cubic approximate curve, with respect to an elevation-view structure.
Figure 48B:
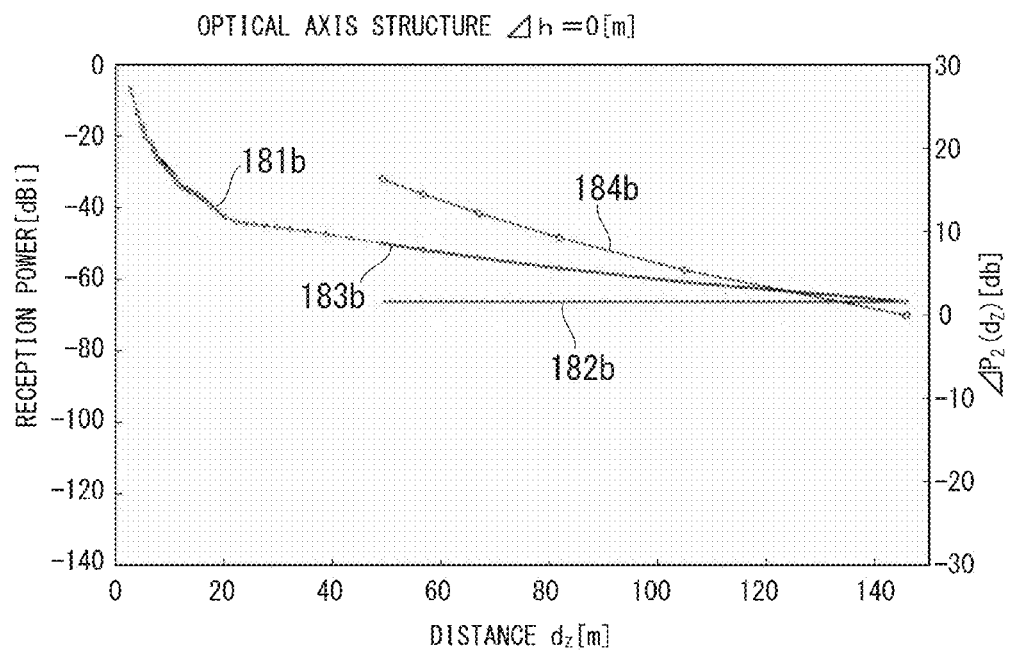
FIG. 48B is a diagram illustrating an upper extreme value curve of reception power, a straight line indicating an initial power value thereof, a cubic approximate curve thereof, and the sum of absolute values of differences between the initial power value and a power value on the cubic approximate curve, with respect to an optical axis structure.

FIGS. 48A and 48B are diagrams illustrating an upper extreme value curve of the reception power with respect to distance, a straight line obtained by associating an initial power value thereof with distance, a cubic approximate curve of upper extreme values of the reception power with respect to distance, and a curve obtained by associating, with the distance, a value (difference) $\Delta P_2(d_z)$ obtained by subtracting, from a power value on the cubic approximate curve, an initial power value thereof in each distance. In the figure, the longitudinal axis on the left side represents an upper extreme value curve of reception power, an initial power value, and reception power [dBi] of a cubic approximate curve. On the other hand, the longitudinal axis on the right side represents the difference $\Delta P_2(d_z)$ dB.

FIG. 48A is a diagram illustrating an upper extreme value curve 181a of the reception power with respect to distance, a straight line 182a obtained by associating an initial power value thereof with distance, a cubic approximate curve 183a of the reception power with respect to distance, and a curve 184a obtained by associating, with the distance, a value obtained by subtracting, from a power value on a cubic approximate curve, an initial power value thereof in each distance, in an elevation-view structure having a height difference $\Delta h$ of 4.15 m.

In the figure, the curve 181a of reception power $P(d_z)$ of an elevation-view structure is attenuated according to a high-order function as the distance $d_z$ decreases. That is, the curve 181a descends to the left.

The curve 184a is formed by adding up the value obtained by subtracting the power value on the cubic approximate curve 183a from the initial power value as the distance $d_z$ decreases.

FIG. 48B is a diagram illustrating an upper extreme value curve 181b of the reception power with respect to distance, a straight line 182b obtained by associating an initial power value thereof with distance, a cubic approximate curve 183b of the reception power with respect to distance, and a curve 184b obtained by associating, with the distance, a value obtained by subtracting, from a power value on a cubic approximate curve, an initial power value thereof in each distance, in an optical axis structure having a height difference $\Delta h$ of 0 m.

In the figure, the curve 181b of reception power $P(d_z)$ of an optical axis structure is linearly increased as the distance $d_z$ decreases. That is, the curve 181b rises to the left.

The curve 184b is formed by adding up the value obtained by subtracting the power value on the cubic approximate curve 183b from the initial power value as the distance $d_z$ decreases.

Accordingly, in a case where the upper extreme value of the reception power value decreases from the initial power value as the distance $d_z$ decreases, the determination unit 34 can determine that the target is an elevation-view structure.

Specifically, the determination unit 34 identifies the elevation-view structure using the difference $\Delta P_s(d_z)$ between the initial power value $P_s$ and the quadratic or higher-order approximation equation or the upper extreme value curve of reception power.

As an identification method using $\Delta P_s(d_z)$, there are three methods in the ascending order of time taken for the process, as follows.

A method (1) of determining that the target is an elevation-view structure in a case where $\Delta P_s(d_z)$ or the absolute value of $\Delta P_s(d_z)$ exceeds a predetermined threshold value.

A method (2) of counting the number of times when the difference $\Delta P_s(d_z)$ is smaller than a predetermined threshold value, and determining that the target is an elevation-view structure in a case where the counted number of times exceeds a predetermined second count threshold value.

A method (3) of calculating an integrated value of a region surrounded by an initial power value $P_s$ and a quadratic or higher-order approximation equation or an upper extreme value curve of reception power, and determining that the target is an elevation-view structure in a case where the integrated value exceeds a predetermined threshold value.

Here, rapidity and reliability of the elevation-view structure determination process establishes a trade-off relationship. Hereinafter, specific description will be made according to the above-mentioned order.

In the method (1), the determination unit 34 calculates an electric power $P_4(d_z)$ at a distance $d_z$ which is determined in advance using the quadratic or higher-order approximation equation or the upper extreme value curve of reception power. Furthermore, the determination unit 34 calculates a difference $\Delta P_s$ between an initial power value $P_s$ and the reception power $P_4(d_z)$ at the distance $d_z$ or the absolute value of the difference $\Delta P_s$. Furthermore, in a case where the calculated $\Delta P_s$ or the absolute value of $\Delta P_s$ is smaller than a predetermined threshold value, the determination unit 34 determines that the target is an elevation-view structure.

In the method (2), the determination unit 34 calculates an electric power $P_4(d_z)$ using the quadratic or higher-order approximation equation or the upper extreme value curve of reception power for each distance $d_z$ which is determined in advance. Furthermore, the determination unit 34 calculates a difference $\Delta P_s(d_z)$ between $P_s$ and $P_4(d_z)$ or the absolute value of the difference $\Delta P_s(d_z)$.

Furthermore, the determination unit 34 counts the number of times when the difference $\Delta P_s(d_z)$ is smaller than a predetermined threshold value. In a case where the counted number of times exceeds a second predetermined count threshold value, the determination unit 34 determines that the target is an elevation-view structure.

In this regard, in the method (2), the determination unit 34 may also determine the elevation-view structure as follows. The determination unit 34 counts the number of times when the absolute value of the difference $\Delta P_s(d_z)$ exceeds a predetermined threshold value. In a case where the counted number of times exceeds a second predetermined count threshold value, the determination unit 34 determines that the target is an elevation-view structure.

In the method (3), the determination unit 34 calculates the electric power $P_4(d_z)$ using the quadratic or higher-order approximation equation or the upper extreme value curve of reception power for each distance $d_z$ which is determined in advance. Furthermore, the determination unit 34 calculates the absolute value of the difference $\Delta P_s(d_z)$ between $P_s$ and $P_4(d_z)$.

Furthermore, the determination unit 34 calculates the sum $\Sigma \Delta P_s(d_z)$ of the differences $\Delta P_s(d_z)$. In a case where the calculated sum $\Sigma \Delta P_s(d_z)$ is smaller than a second predetermined sum threshold value, the determination unit 34 determines that the target is an elevation-view structure.

In this regard, the determination unit 34 may also determine the elevation-view structure as follows. The determination unit 34 calculates the sum $\Sigma |\Delta P_s(d_z)|$ of the absolute values of the differences $\Delta P_s(d_z)$. In a case where the calculated sum $\Sigma |\Delta P_s(d_z)|$ exceeds a predetermined sum threshold value, the determination unit 34 determines that the target is an elevation-view structure.

Figure 49:
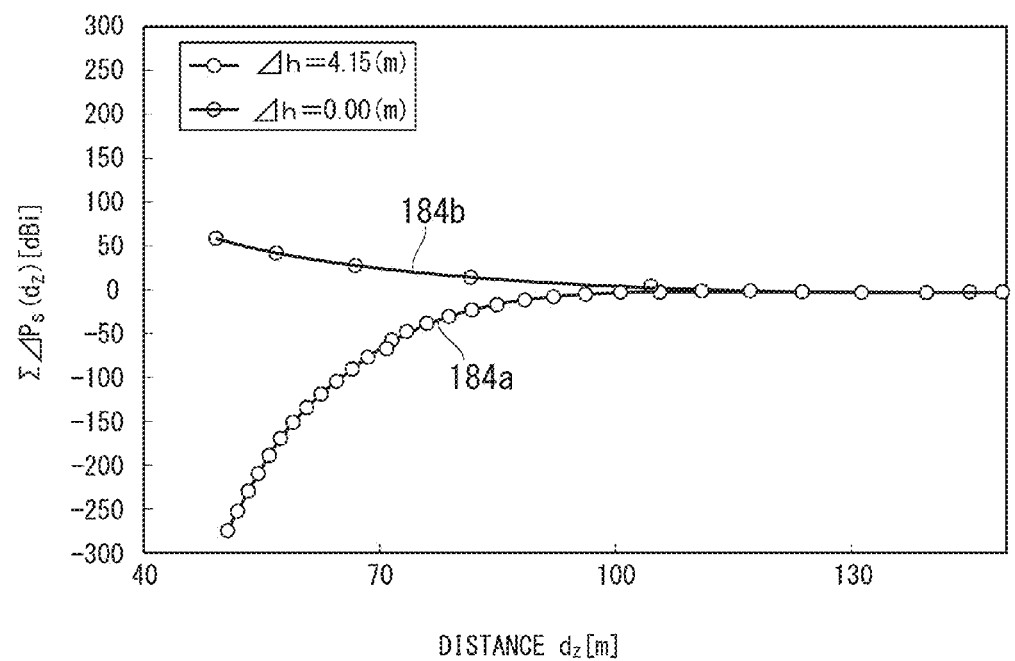
FIG. 49 is a diagram illustrating comparison of the sum of differences between an initial power value and an upper extreme value of a reception power value in an elevation-view structure with that in an optical axis structure.

Subsequently, the sum $\Sigma \Delta P_s(d_z)$ calculated using the method (3) will be described. FIG. 49 is a diagram illustrating comparison of the sum of differences between an initial power value and upper extreme values of a reception power value in an elevation-view structure with that in an optical axis structure. In the elevation-view structure, referring to a curve 184*a* indicating the sum of differences between the initial power value and the upper extreme values of the reception power value, as the distance $d_z$ is shorter than 100 m, the sum is monotonically decreased from 0.

On the other hand, in the optical axis structure, referring to a curve 184*b* indicating the sum of differences between the initial power value and the upper extreme values of the reception power value, as the distance $d_z$ is shorter than 100 m, the sum is monotonically increased from 0.

Accordingly, if the predetermined threshold value is set, the determination unit 34 can determine that the target is an elevation-view structure. The predetermined threshold value is determined using the minimum necessary height difference $\Delta h$ when the target is identified to be an elevation-view structure, and the elevation angle pattern of the antenna sensitivity. Here, the height difference $\Delta h$ is determined by the height h1 of the antenna optical axis of the radar device and the height h2 of the elevation-view structure. Accordingly, the predetermined threshold value is determined using the height h1 of the antenna optical axis of the radar device, the minimum necessary height of the elevation-view structure when the target is identified to be an elevation-view structure, and the elevation angle pattern of the antenna sensitivity.

Figure 50:
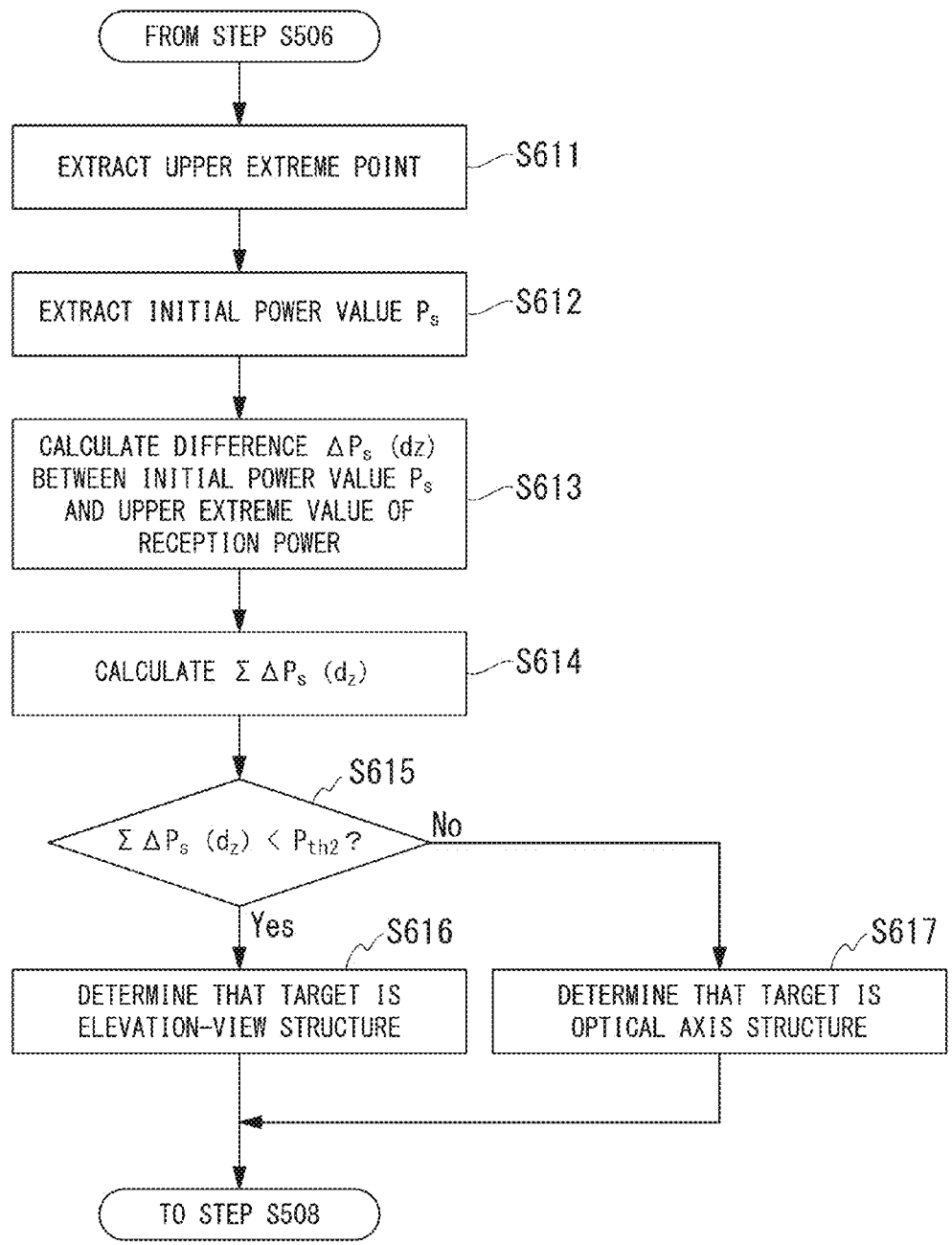
FIG. 50 is a flowchart illustrating an elevation-view structure determination process using the sum of differences between an initial power value and electric power calculated from a cubic approximation equation.

FIG. 50 is a flowchart illustrating an elevation-view structure determination process using the sum of differences between an initial power value and electric power calculated from the cubic approximation equation. Furthermore, FIG. 50 is a flowchart illustrating an example of details of the elevation-view structure determination process of step S507 in FIG. 16.

Firstly, the representative point extraction unit 33 sequentially extracts upper extreme points at a predetermined cycle from the relationship of the reception power with respect to distance in the routine of the flowchart shown in FIG. 38 (step S611). Next, the determination unit 34 extracts an upper extreme point in the vicinity of the distance of 150 m as the initial power value $P_s$ (step S612).

Then, the determination unit 34 calculates the difference $\Delta P_s(d_z)$ between the initial power value $P_s$ and the upper extreme values of reception power for each distance $d_z$ (step S613). Next, the determination unit 34 adds up the differences $\Delta P_s(d_z)$ in a predetermined distance range (for example, from 150 m to a distance corresponding to a first null point) for each distance $d_z$, to calculate the sum $\Sigma \Delta P_s(d_z)$ (step S614).

In a case where the calculated sum $\Sigma \Delta P_s(d)$ is smaller than a predetermined threshold value $P_{th2}$ (YES in step S615), the determination unit 34 that the target is an elevation-view structure (step S616).

On the other hand, in a case where the calculated sum $\Sigma \Delta P_s(d_z)$ is equal to or higher than the predetermined threshold value $P_{th2}$ (NO in step S615), the determination unit 34 determines that the target is an optical axis structure (step S617). Hence, the present flowchart ends.

As described above, according to the embodiment 3-4, it is possible to calculate the difference between the value of a quadratic or higher-order approximation equation and an initial power value at a predetermined distance. The extreme value increases from the initial value as the distance decreases in the case of the optical axis structure which is a structure present on the optical axis of the reception antenna, whereas the extreme value decreases from the initial value as the distance decreases in the case of the elevation-view structure. Thus, it is possible to robustly determine whether or not the target is an elevation-view structure based on the difference between the value of the quadratic or higher-order approximation equation and the initial value, without being affected by variation of extreme values of reception power due to spike noise or the like.

According to the embodiment 3-4, the difference between the value of the quadratic or higher-order approximation equation and the initial power value; however, the invention is not limited thereto. That is, it is possible to calculate the difference between electric power of a representative point and an initial power value at a predetermined distance.

Furthermore, in the embodiment 3-4, the initial power value is an example, and thus, electric power of a representative point at a distance which is determined in advance may be used.

Embodiment 3-5

Subsequently, an elevation-view structure determination method according to an embodiment 3-5 will be described. In the above-described embodiment 3-4, the elevation-view structure is determined using the difference between the initial value which is set to a reference value and the upper extreme value of reception power.

In the embodiment 3-5, in order to clarify the difference between the elevation-view structure and the optical axis structure, a theoretical value of reception power at the time of free space propagation calculated from a radar equation is used as a reference value.

The radar equation is expressed using the following Equation (12).

$$P_{ff,s} = \frac{P_t G_t G_r \sigma \lambda^2}{(4\pi)^3 r_1^4} \quad (12)$$

Here, $P_{ff,s}$ represents a reception power value at the time of free space propagation, $P_t$ represents a transmitted power value, $G_t$ represents a transmission antenna gain, $G_r$ represents a reception antenna gain, $\sigma$ represents a reflection sectional area, and $\lambda$ represents a radar wavelength. The reflection sectional area is calculated using Equation (13) to be described later.

The free space propagation curve 53a shown in FIG. 36A is determined by Equation (12). A main parameter in this case is only the distance $r_1$. Here, $\lambda$ fluctuates due to the Doppler's effect, but in a negligible range under the condition that the free space propagation curve 53a is calculated.

$P_t$, $G_t$ and $G_r$ are constants determined under a radar usage condition, and thus, have no relation to a traveling environment condition. Accordingly, a theoretic curve shape of a locus (that is, a free space propagation attenuation curve) of the reception power value $P_{ff,s}$ to distance at the time of free space propagation is unique. Furthermore, the locus moves in an axis direction (longitudinal direction) of the reception power value, according to determination of the reflection sectional area σ fluctuated under the traveling environment condition (reflection condition).

The determination unit 34 calculates an initial value (for example, an upper extreme value of reception power in the vicinity of the distance of 150 m) of an upper extreme value of reception power. Here, the reflection sectional area σ is calculated using the following Equation (13).

$$\sigma = \frac{P'_{ff,s}(4\pi)^3 r_1^4}{P_t G_t G_r \lambda^2} * \frac{1}{P^{\wedge}[12-L_{\theta 1}/10]} \quad (13)$$

Here, $P'_{ff,s}$ represents an estimated attenuation power value, and $L_{\theta 1}$ represents an attenuation amount of an indirect wave component. The estimated attenuation power value $P'_{ff,s}$ is an estimated value of reception power in which attenuation of amplitude due to attenuation of the indirect wave component is considered at an observed target distance. The determination unit 34 calculates the reflection sectional area σ using upper extreme values in a curve indicating the relationship of the reception power with respect to distance as the estimated attenuation power value $P'_{ff,s}$.

Here, the upper extreme values in the curve indicating the relationship of the reception power with respect to distance is formed so that reception power is strengthened as the phases of direct waves and indirect waves are matched with each other. Accordingly, since the upper extreme values are hardly affected due to spike noise or the like, in a case where the reflection sectional area σ is used as the estimated attenuation power value $P'_{ff,s}$, it is possible to estimate the reflection sectional area σ with high accuracy.

If a specification of the antenna is already known, it is possible to calculate a theoretical value of the amplitude attenuation amount to distance $r_1$, and thus, a theoretical value of the amplitude attenuation amount with respect to the observed target distance may be used as $P'_{ff,s}$.

The determination unit 34 substitutes the initial value of the upper extreme values of reception power for the estimated attenuation power value $P'_{ff,s}$, to calculate the reflection sectional area σ. Furthermore, the determination unit 34 substitutes the calculated reflection sectional area σ for the radar equation (12), to calculate a predicted free space attenuation value (estimated power value) which is a value obtained by estimating the reception power value $P_{ff,s}$ at the time of free space propagation.

In a case where the target is an optical axis structure, the reception antenna can receive a direct wave component of radio waves reflected from the target using a main lobe. Accordingly, the reception power value $P_{ff,s}$ at the time of free space propagation and a reception power value which is actually observed are close to each other.

On the other hand, in a case where the target is an elevation-view structure, the reception power value $P_{ff,s}$ at the time of free space propagation, which is calculated by the same method as described above, and a reception power value which is actually observed are far different from each other due to the affection of the antenna directionality.

As described above, the determination unit 34 determines whether or not the target is an elevation-view structure using the difference between the reception power value $P_{ff,s}$ at the time of free space propagation and the reception power value which is actually observed.

Accordingly, the determination unit 34 identifies the elevation-view structure using a difference $\Delta P_{ff}(d_z)$ between the reception power value $P_{ff,s}$ at the time of free space propagation and the upper extreme value of reception power.

Specifically, the determination unit 34 extracts an initial upper extreme value of reception power (for example, upper extreme value of reception power in the vicinity of the distance 150 m) as an initial value. The upper extreme value of the reception power is a value which allows estimation of the estimated attenuation power value $P'_{ff,s}$ with high accuracy.

Figure 51A:
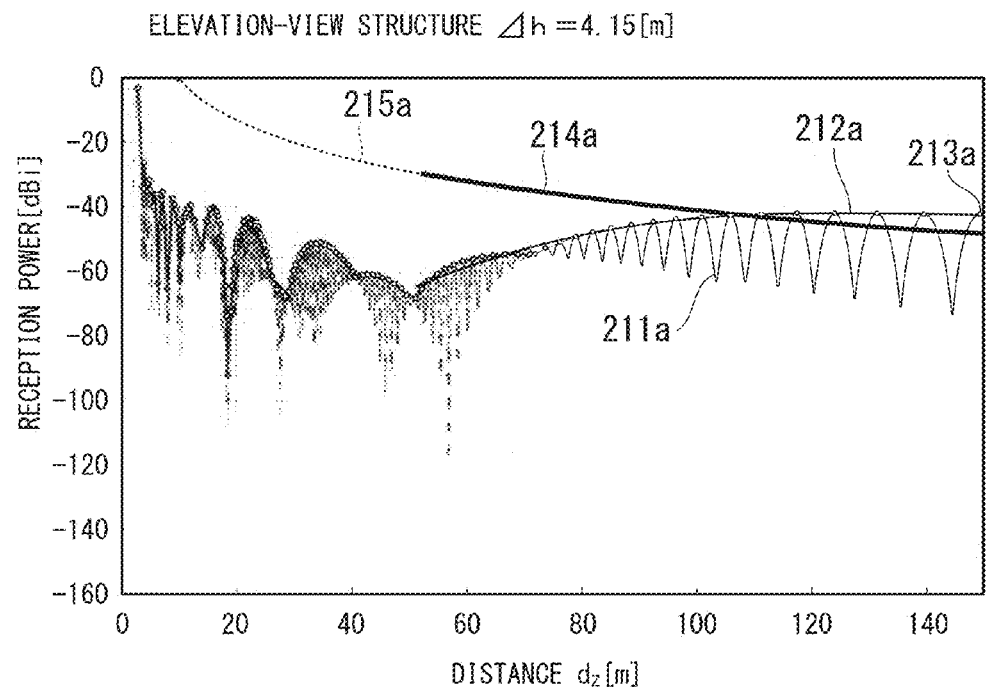
FIG. 51A is a diagram in which a predicted free space propagation curve is compared with a theoretic free space propagation attenuation curve with respect to an elevation-view structure.
Figure 51B:
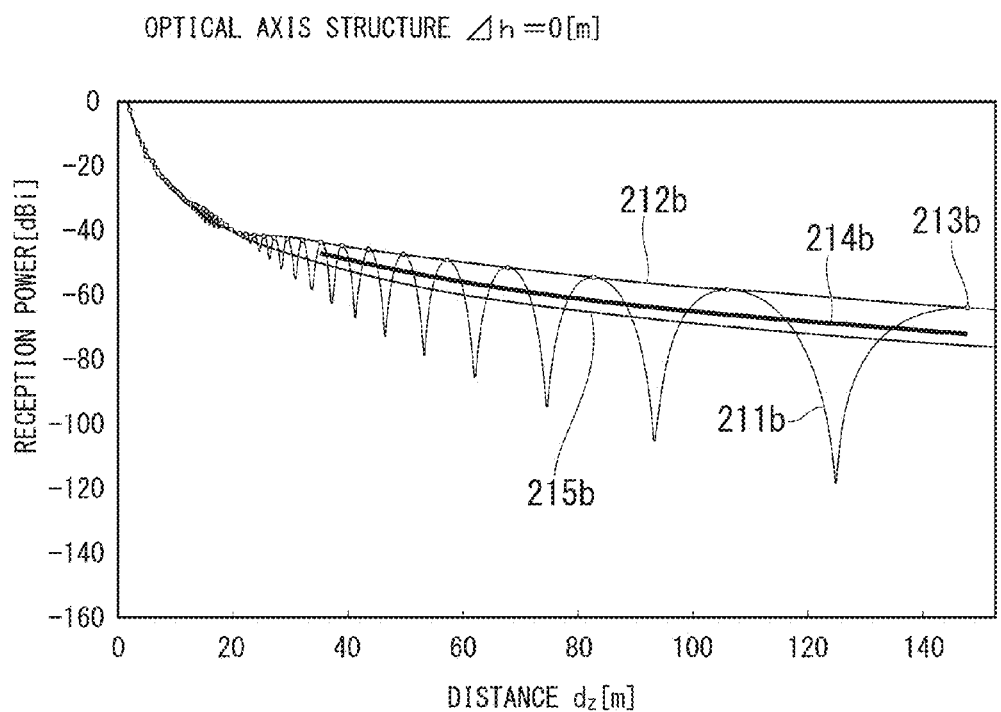
FIG. 51B is a diagram in which a predicted free space propagation curve is compared with a theoretic free space propagation attenuation curve with respect to an optical axis structure.

Furthermore, in order to increase the estimation accuracy, the decrease amount of reception power due to attenuation of the indirect wave component may be considered. Furthermore, if the antenna specification is already known, it is possible to calculate a theoretical value of the decrease amount of the reception power with respect to the distance $d_z$, and thus, the theoretical value may be applied to the estimated attenuation power value $P'_{ff,s}$. FIGS. 51A and 51B are diagrams in which a predicted free space propagation curve is compared with a theoretical value of the free space propagation attenuation curve. FIG. 51A is a diagram in which a predicted free space propagation curve is compared with a theoretic free space propagation attenuation curve in an elevation-view structure having the height difference Δh of 4.15 m. In the figure, a curve 211a indicating a reception power value to distance, and a curve 212a indicating an upper extreme value of the reception power value to distance are shown.

Furthermore, a predicted free space propagation curve 214a which is calculated using a decrease value of 6 dB as the estimated attenuation power value $P'_{ff,s}$, in consideration of reflection loss from an upper extreme value 213a of the reception power value in the vicinity of 150 m, is shown in the figure. Furthermore, the predicted free space propagation curve 214a preferably fits to a free space propagation attenuation curve 215a.

FIG. 51B is a diagram in which a predicted free space propagation curve is compared with a theoretic free space propagation attenuation curve in an optical axis structure having the height difference Δh of 0 m. In the figure, a curve 211b indicating a reception power value to distance, and a curve 212b indicating an upper extreme value of the reception power value to distance are shown.

Furthermore, a predicted free space propagation curve 214b which is calculated using a decrease value of 6 dB as the estimated attenuation power value P'$_{f,s}$, in consideration of reflection loss from an upper extreme value 213b of the reception power value in the vicinity of 150 m, is shown in the figure. Furthermore, the predicted free space propagation curve 214b is a curve having an electric power value larger than that of a free space propagation attenuation curve 215b.

Figure 52:
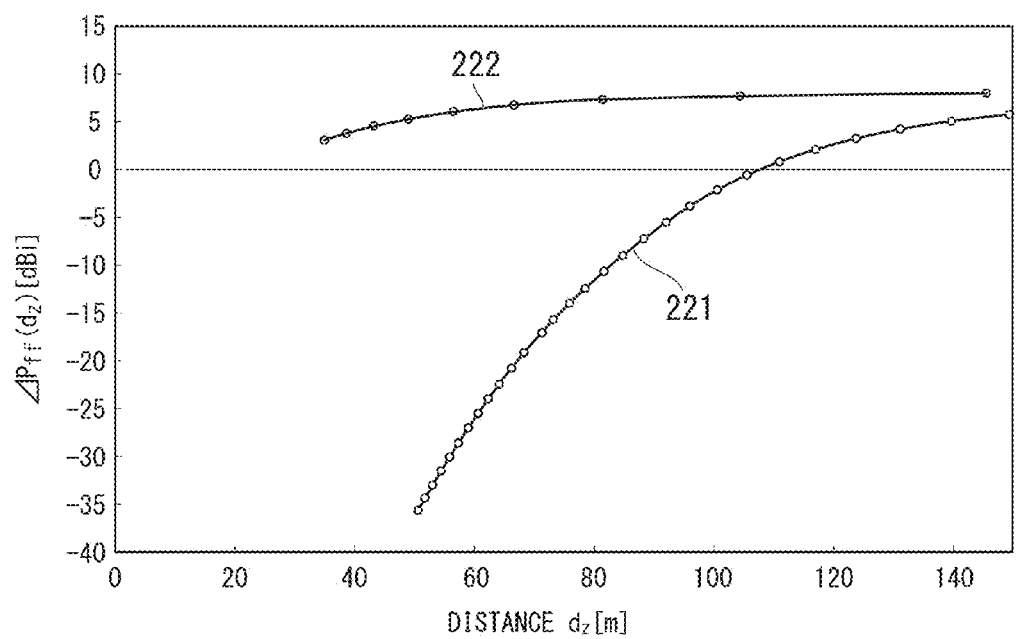
FIG. 52 is a diagram in which the difference between a predicted free space propagation attenuation value (estimated power value) and an upper extreme value of reception power is expressed with respect to the distance $d_z$.

FIG. 52 is a diagram in which the difference between a predicted free space propagation attenuation value (estimated power value) and an upper extreme value of reception power is expressed with respect to the distance $d_z$. In the figure, in the case of the elevation-view structure, the difference between points on the predicted free space propagation attenuation curve and upper extreme values of reception power is monotonically decreased as the distance $d_z$ from the target decreases. Furthermore, this value is smaller than 0 in a case where the distance from the target is shorter than 100 m.

On the other hand, in the case of the optical axis structure, the difference between the points on the predicted free space propagation curve and the upper extreme values of reception power monotonically decreases as the distance from the target $d_z$ decreases. However, the value is equal to or greater than 0 in the distance range of 40 m to 150 m.

Accordingly, in a case where the difference between the points on the predicted free space propagation curve and the upper extreme values of reception power is smaller than 0 at a predetermined distance range (for example, 40 m to 100 m in distance), the determination unit 34 determines that the target is an elevation-view structure.

Figure 53:
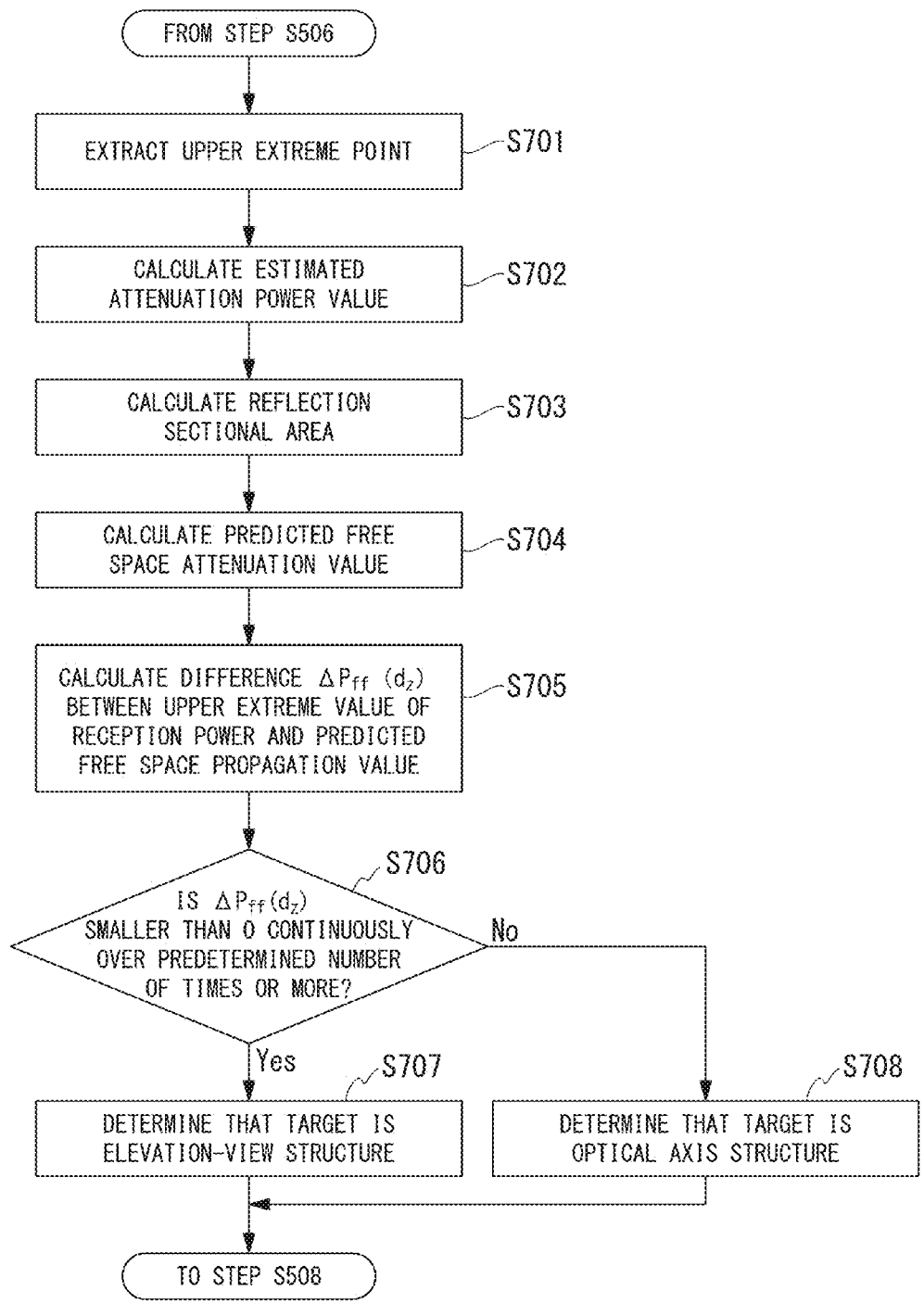
FIG. 53 is a flowchart illustrating an elevation-view structure determination process using the difference between a predicted free space attenuation value (estimated power value) and an upper extreme value of reception power.

FIG. 53 is a flowchart illustrating an elevation-view structure determination process using a difference between a predicted free space attenuation value (estimated power value) and an upper extreme value of reception power. Furthermore, FIG. 53 is a flowchart illustrating an example of details of the elevation-view structure determination process of step S507 in FIG. 16.

Firstly, the representative point extraction unit 33 sequentially extracts upper extreme points at a predetermined cycle from the relationship of the reception power with respect to distance in the routine of the flowchart shown in FIG. 38 (step S701). Next, the determination unit 34 calculates an upper extreme value of reception power value in the vicinity of a predetermined distance (for example, 150 m). Furthermore, the determination unit 34 calculates a power value obtained by subtracting a predetermined value (for example, 6 dB) from the upper extreme value, in consideration of reflection loss of radio waves, as the estimated attenuation power value P'$_{f,s}$ (step S702).

Next, the determination unit 34 substitutes the calculated estimated attenuation power value P'$_{f,s}$ for Equation (13), to calculate the reflection sectional area σ (step S703). The determination unit 34 substitutes the calculated reflection sectional area σ for Equation (12), to calculate the predicted free space attenuation value (estimated power value) (step S704). Then, the determination unit 34 calculates the difference ΔP$_{ff}$($d_z$) between the upper extreme value of reception power and the predicted free space attenuation value for each distance (step S705).

In a case where the difference ΔP$_{ff}$($d_z$) calculated for each distance is smaller than 0 continuously over a predetermined number of times or more (YES in step S706), the determination unit 34 determines that the target is an elevation-view structure (step S707). On the other hand, in a case where the difference ΔP$_{ff}$($d_z$) calculated for each distance is equal to or greater than 0 continuously over the predetermined number of times or more (No in step S706), the determination unit 34 determines that the target is an optical axis structure (step S707). Hence, the present flowchart ends.

As described above, according to the embodiment 3-5, it is possible to calculate the difference between the extreme value in the predetermined distance and the estimated power value. In the case of the optical axis structure, the extreme value is larger than the estimated power value; however, in the case of the elevation-view structure, the extreme value is smaller than the estimated power value. Accordingly, based on the difference between the extreme value and the estimated power value, it is possible to robustly determine that the target is an elevation-view structure without being affected by variation of reception power due to spike noise or the like.

In the embodiment 3-5, in the elevation-view structure determination in, the difference between the extreme value and the estimated power value at the predetermined distance is calculated; however, the invention is not limited thereto. The difference between received electric power and an estimated power value at a predetermined distance may be calculated, or the difference between electric power of a representative point and an estimated power value at a predetermined distance may be calculated.

Embodiment 3-6

Figure 54A:
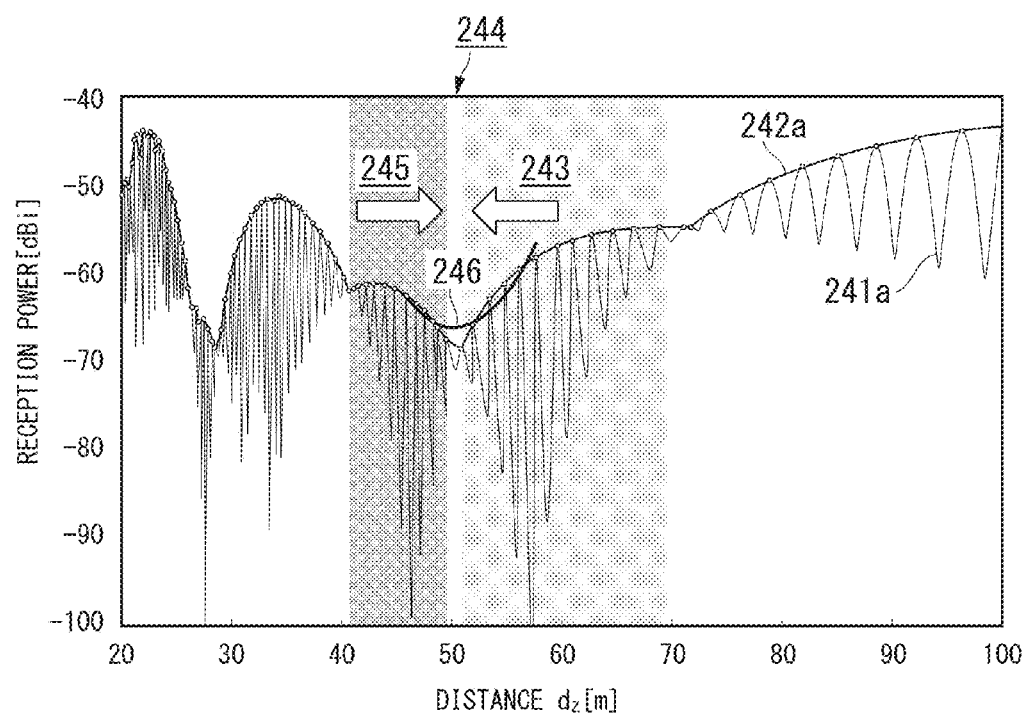
FIG. 54A is a diagram illustrating an elevation-view structure identification method using a first null point of a direct wave component.
Figure 54B:
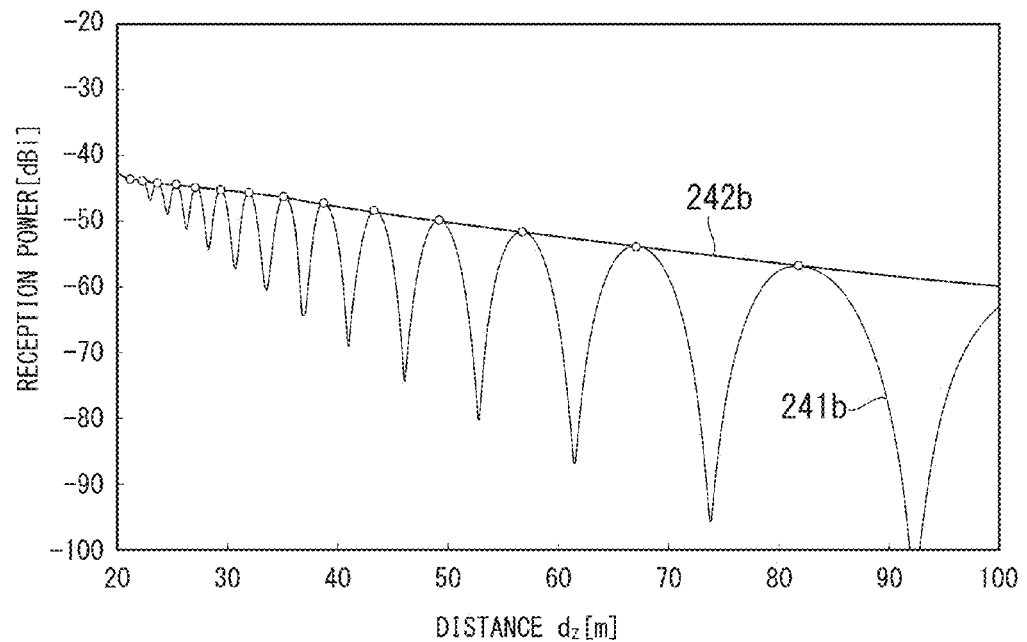
FIG. 54B is a diagram illustrating the reception power with respect to the distance in an optical axis structure.

Subsequently, an elevation-view structure determination process according to an embodiment 3-6 will be described. FIGS. 54A and 54B are diagrams illustrating an elevation-view structure identification method using a first null point of a direct wave component. FIG. 54A is a diagram illustrating the relationship of the reception power with respect to distance in an elevation-view structure in which the height difference Δh is 4.15 m. In the figure, an upper extreme value curve 242a of reception power is a curve obtained by smoothly connecting upper extreme values of a reception power curve 241a.

The locus of the upper extreme value curve 242a of reception power in a section 243, a section 244 and a section 245 forms a bowl-shaped locus around the section 244. The locus is formed by the following three reasons.

Firstly, in the section 243, the reason why the upper extreme value of reception power is attenuated as the distance decreases is because attenuation occurs in a main lobe of antenna sensitivity which receives direct waves as an incoming angle of the direct waves increases as the distance decreases.

Secondly, in the section 244, the reason why the upper extreme value curve 242a of reception power takes lower extreme values is because the antenna sensitivity which receives the direct waves becomes lowest as the incoming angle of the direct waves is an elevation angle corresponding to a first null point of the antenna.

Thirdly, in the section 245, the reason why the upper extreme value of reception power increases as the distance decreases is because an increase occurs in a first side lobe of the antenna sensitivity which receives the direct waves as the incoming angle of the direct waves increases as the distance decreases.

A quadratic approximate curve 246 preferably fits to the locus of the upper extreme value curve 242a of reception power in the section 243, the section 244, and the section 245. Accordingly, if the section 243, the section 244 and the section 245 are present, the upper extreme value curve 242a of reception power may be approximated using a quadratic approximate curve in which a lower extreme value is present around the section 244.

FIG. 54B is a diagram illustrating the relationship of the reception power with respect to distance in an optical axis structure in which the height difference Δh is 0 m. In the figure, an upper extreme value curve 242b of reception power is a curve obtained by smoothly connecting upper extreme values of a reception power curve 241b.

Differently from the elevation-view structure, in the upper extreme value curve 242b of reception power of the optical axis structure 242b, since the antenna directivity and change in the incoming angle of direct waves are not present, the bowl-shaped locus is not present in the locus.

Thus, in a case where the bowl-shaped locus appearing in the upper extreme value curve 242b of reception power is present, the determination unit 34 determines that the target is an elevation-view structure.

Specifically, the determination unit 34 calculates an upper extreme value $P_{max}$ of reception power from reception power.

Furthermore, the determination unit 34 extracts a minimum value $P_{max, m}$ ("m" is a positive integer) of an upper extreme value $P_{max, i}$ of reception power observed at a predetermined distance section (for example, distance section of 40 m to 60 m) from the upper extreme value $P_{max, i}$ ("i" is a positive integer, in which "i" is counted from the distant position).

Furthermore, the determination unit 34 determines that the target is an elevation-view structure when both of the following Equation (14) and Equation (15) are satisfied.

$$P_{max,m-3} > P_{max,m-2} > P_{max,m-1} > P_{max,i} \quad (14)$$

$$P_{max,m+3} > P_{max,m+2} > P_{max,m+1} > P_{max,i} \quad (15)$$

On the other hand, in a case where the above formulas are not satisfied, the determination unit 34 determines that the target is an optical axis structure.

In this manner, as the continuous magnitude relationship is established, the determination unit 34 can identify the elevation-view structure. Furthermore, in a case where the antenna specification and the height difference Δh are already known, the determination unit 34 compares the observed distance of the minimum value $P_{max, m}$ of the upper extreme value of reception power with a theoretical value of the distance of the section 244, to estimate the height difference Δh.

Figure 55:
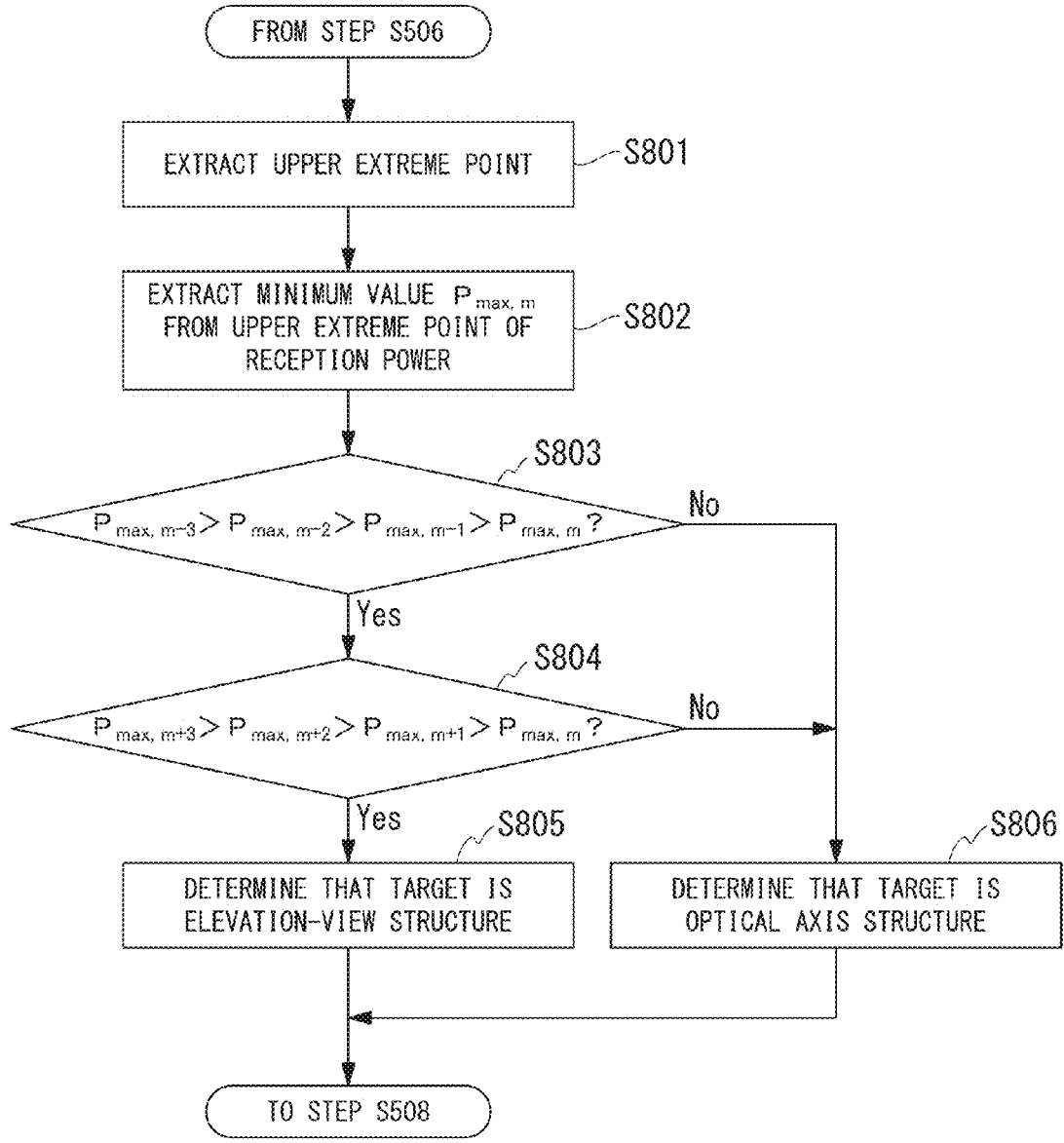
FIG. 55 is a flowchart illustrating an elevation-view structure determination process according to determination regarding whether a lower extreme value is present in change in an upper extreme value of reception power with respect to distance.

FIG. 55 is a flowchart illustrating an elevation-view structure determination process according to determination about whether a lower extreme value is present in change in an upper extreme value of the reception power with respect to distance. Furthermore, FIG. 55 is a flowchart illustrating an example of details of the elevation-view structure determination process of step S507 in FIG. 16.

Firstly, the representative point extraction unit 33 sequentially extracts upper extreme values $P_{max, i}$ at a predetermined cycle from the relationship of the reception power with respect to distance in the routine of the flowchart shown in FIG. 38 (step S801). If the distance from the target detected by the distance detection unit 24 is shorter than a predetermined distance (for example, shorter than 45 m), the determination unit 29 extracts the minimum value $P_{max, m}$ from the upper extreme values $P_{max, i}$ of reception power (step S802).

Next, the determination unit 34 determines whether or not Equation (14) is satisfied (step S803). If Equation (14) is not satisfied (NO in step S803), the determination unit 34 determines that the target is an optical axis structure (step S806). On the other hand, if Equation (14) is satisfied (YES in step S803), the determination unit 34 determines whether Equation (15) is satisfied (step S804).

If Equation (15) is not satisfied (NO in step S804), the determination unit 34 determines whether the target is an optical axis structure (step S806). On the other hand, if Equation (15) is satisfied, the determination unit 34 determines whether or not the target is an elevation-view structure (step S805). Hence, the present flowchart ends.

As described above, according to the embodiment 3-6, if the locus of the representative value to distance is downward convex in a predetermined distance range which is determined in advance, it is possible to determine that the target is an elevation-view structure. In the case of the optical axis structure, the function of extreme values with respect to distance does not take lower extreme values; however, in the case of the elevation-view structure, the function of extreme values with respect to distance takes lower extreme values. Accordingly, it is possible to determine that the target is an elevation-view structure, based on determination about whether the function of extreme values with respect to distance takes lower extreme values.

In the embodiment 3-6, if the locus of representative value with respect to distance is downward convex in a predetermined distance range which is determined in advance, it is determined that the target is an elevation-view structure; however, the invention is not limited thereto. In a case where the function of extreme values with respect to distance takes lower extreme values in a predetermined distance range which is determined in advance, it may be determined that the target is an elevation-view structure.

Embodiment 3-7

Subsequently, an elevation-view structure determination process according to an embodiment 3-7 will be described. In the embodiment 3-6, when the minimum value is calculated from the upper extreme value of reception power, the identification accuracy deteriorates due to the following two reasons. The first reason is variation of an upper extreme value of reception power due to spike noise or the like. The second reason is an acquisition leakage of a value of reception power due to a low sampling frequency of the radar device. In the embodiment 3-7, a modified elevation-view structure determination method will be described in order to solve the problem.

The determination unit 34 calculates a quadratic approximation equation by the least squares method using the upper extreme value $P_{max}$ of some reception powers of the section 243 and the section 245 using the section 244 as a center. Here, the quadratic approximation equation is expressed by the following Equation (16).

$$P_{max}(d_z) = a d_z^2 + b d_z + c \quad (16)$$

Here, $P_{max}(d_z)$ is an upper extreme value of the reception power with respect to the distance $d_z$, "a" is a quadratic coefficient, "b" is a linear coefficient, and "c" is a constant. Here, if Equation (16) is deformed so as to calculate a distance $d_{lm}$ at which the upper extreme value $P_{max}(d_z)$ of reception power becomes a lower extreme value, it is expressed by the following Equation (17).

$$P_{max}(d_z) = a\left(d_z - \frac{-b}{2a}\right)^2 + \frac{4ac - b^2}{4a} \quad (17)$$

Accordingly, the distance $d_{lm}$ at which the upper extreme value $P_{max}(d_z)$ of $P_{max}$ reception power becomes the lower extreme value is expressed by the following Equation (18).

$$d_{lm} = \frac{-b}{2a} \quad (18)$$

The determination unit 34 calculates the distance $d_{lm}$ at which the upper extreme value $P_{max}(d_z)$ of reception power becomes the lower extreme value using Equation (18). In a case where the distance $d_{lm}$, that takes the lower extreme value, calculated by Equation (18) is 40 m or longer and 150 m or shorter, the determination unit 34 determines that the target is an elevation-view structure.

When the minimum value is calculated from the upper extreme value of reception power by the method of the embodiment 3-7, by performing approximation using a quadratic function, it is possible to solve the problem that the identification accuracy deteriorates.

Specifically, even though there is a variation of upper extreme values of reception power due to spike noise or the like, it is possible to approximate the relationship of the upper extreme values of the reception power with respect to distance using the quadratic function. Thus, even though there is a variation of upper extreme values of reception power due to spike noise or the like, it is possible to robustly extract the minimum value from the upper extreme values of reception power.

Furthermore, even though there is an acquisition leakage of a value of reception power due to a low sampling frequency of the radar device, it is possible to approximate the relationship of upper extreme values of the reception power with respect to distance using the quadratic function. Thus, even though there is an acquisition leakage, it is possible to robustly extract the minimum value from the upper extreme values of reception power.

Figure 56:
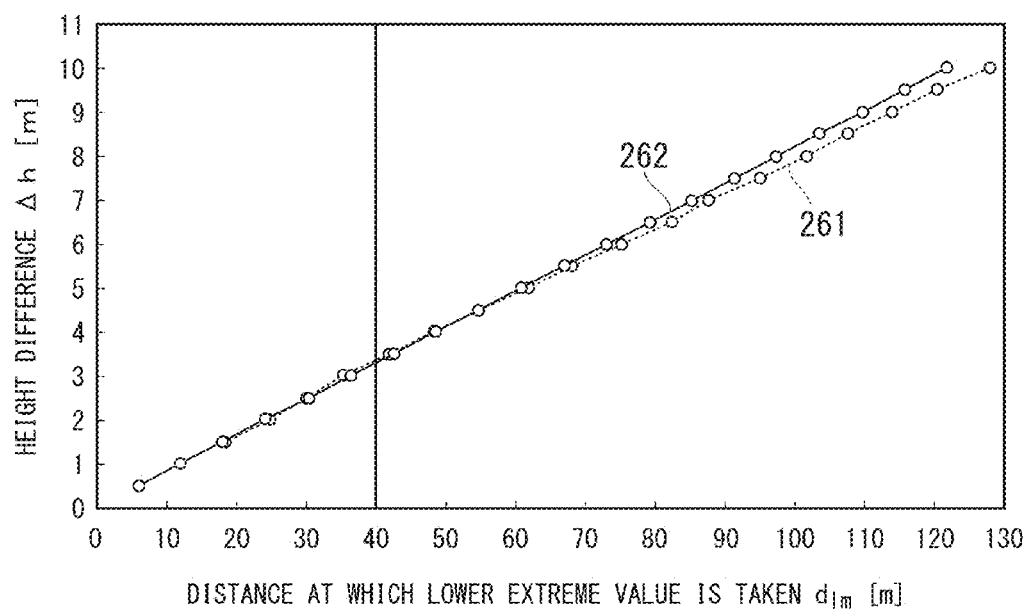
FIG. 56 is a diagram illustrating comparison of a distance at which a lower extreme value calculated by a quadratic approximation equation for each height difference $\Delta h$ is taken with a theoretic value of a distance corresponding to a first null point calculated for each height difference $\Delta h$.

FIG. 56 is a diagram illustrating comparison of a distance at which a lower extreme value calculated by a quadratic approximation equation for each height difference Δh is taken with a theoretical value of a distance corresponding to a first null point calculated for each height difference Δh. In the figure, a curve 261 is a curve obtained by smoothly connecting distances which take lower extreme values calculated by a quadratic approximation equation for each height difference Δh. A curve 262 is a curve obtained by smoothly connecting theoretical values of distances corresponding to the first null point.

In the figure, the height difference Δh of the curve 262 linearly changes with respect to the theoretical value of the distance corresponding to the first null point. Here, the curve 261 preferably fits to the curve 262. Thus, using the relationship of the theoretical value of the distance corresponding to the first null point and the height difference Δh, it is possible to estimate the height difference Δh from the distance at which the lower extreme value calculated by the quadratic approximation equation is taken.

FIG. 57 is a table illustrating in which the theoretical value of the distance corresponding to the first null point is matched with the height difference Δh. In a table 270 in the figure, the theoretical value of the distance corresponding to the first null point is matched with the height difference Δh one-to-one.

The memory 21 stores the table 270 in which the distance $d_{lm}$ at which the lower extreme value is taken is matched with the height difference Δh.

Accordingly, the determination unit 34 extracts the height difference Δh corresponding to the lower extreme value calculated by the quadratic approximation equation from the table 270 which is stored in the memory 21. Thus, the determination unit 34 can determine the height difference Δh of the target.

Figure 58:
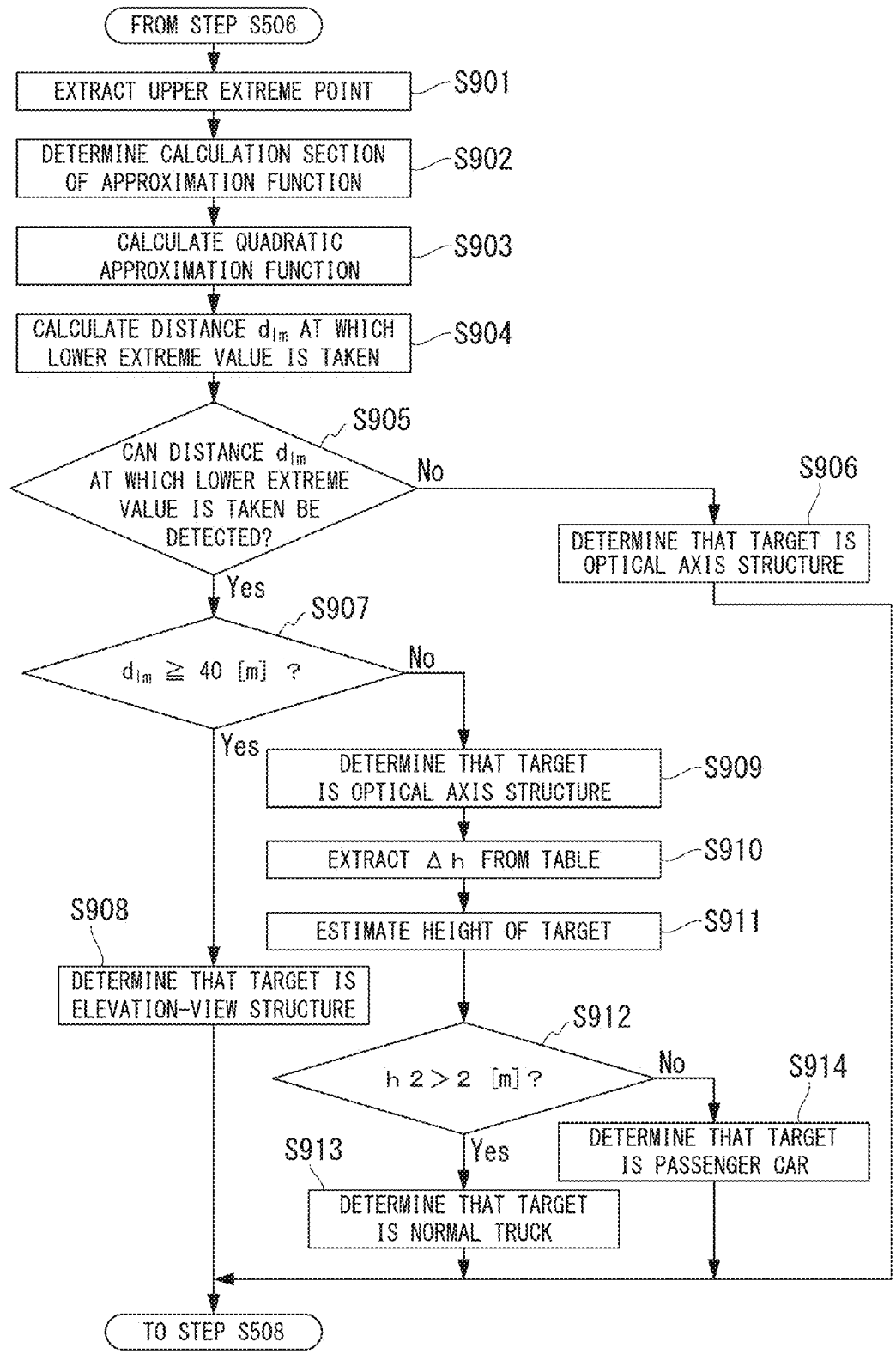
FIG. 58 is a flowchart illustrating an elevation-view structure determination process using a distance at which a lower extreme value calculated by a quadratic approximation equation is taken.

FIG. 58 is a flowchart illustrating an elevation-view structure determination process using the distance at which the lower extreme value calculated by the quadratic approximation equation is taken. Furthermore, FIG. 58 is a flowchart illustrating an example of details of the elevation-view structure determination process of step S507 in FIG. 16.

Firstly, the representative point extraction unit 33 sequentially extracts the upper extreme value $P_{max,\,i}$ at a predetermined cycle from the relationship of the reception power with respect to distance in the routine of the flowchart shown in FIG. 38 (step S901). In a case where the distance from the target detected by the distance detection unit 24 is shorter than a predetermined distance (for example, in a case where the distance is shorter than 45 m), the determination unit 34 determines a distance section in which the quadratic approximate function is calculated, from a curve of upper extreme values of values of the reception power with respect to distance (step S902).

Next, the determination unit 34 calculates the quadratic approximate function of the upper extreme values of electric power values with respect to distance using the least squares method in the calculated distance section (step S903). Then, the determination unit 34 calculates the distance $d_{lm}$ at which the lower extreme value is taken using Equation (18) from the calculated quadratic approximate function (step S904).

In a case where the distance $d_{lm}$ at which the lower extreme value is taken cannot be detected (NO in step S905), the determination unit 34 determines that the target is an optical axis structure (step S906).

On the other hand, in a case where the distance $d_{lm}$ at which the lower extreme value is taken can be detected (YES in step S905), the determination unit 34 compares the distance $d_{lm}$ at which the lower extreme value is taken with the distance of 40 m (step S907).

If the distance $d_{lm}$ at which the lower extreme value is taken is 40 m or longer (YES in step S907), since the height difference Δh is 3.5 m or longer in the table 270, the determination unit 34 determines that the target is an elevation-view structure (step S908).

On the other hand, if the distance $d_{lm}$ at which the lower extreme value is taken is shorter than 40 m (NO in step S907), since the height difference Δh is shorter than 3.5 m in the table 270, the determination unit 34 determines that the target is an optical axis structure (step S909).

The determination unit 34 extracts the height difference Δh corresponding to the distance $d_{lm}$ at which the lower extreme value is taken from the table 270 stored in the memory 21 (step S910). The determination unit 34 adds the height h1 of the antenna optical axis of the radar device to the calculated height difference Δh, to calculate an estimated value of the height h2 of the target (step S911).

In a case where the estimated value of the height h2 of the target is larger than 2 m (YES in step S912), the determination unit 34 determines that the target is a normal truck (step S913). On the other hand, in a case where the estimated value of the height h2 of the target is 2 m or less (NO in step S912), the determination unit 34 determines that the target is a passenger car (step S914). Hence, the present flowchart ends.

In the present flowchart, in a case where it is determined that the target is an optical axis structure, the height difference is extracted from the table 270 to estimate the height of the target; however, the invention is not limited thereto. For example, in a case where it is determined that the target is an elevation-view structure, the height difference may be extracted from the table 270 to the height of the target.

Furthermore, after the determination unit 34 determines that the target is an elevation-view structure in step S908, the determination unit 34 may determine whether or not the host vehicle will collide with the target. Specifically, for example, the determination unit 34 estimates the height of the target by the same method as in steps S910 and S911. Furthermore, the determination unit 34 reads the height of the host vehicle from the ground, from the memory 21. Furthermore, in a case where the read height of the drive's vehicle from the ground is equal to or greater than the calculated height of the target, the determination unit 34 performs control for sending an alarm through a speaker (not shown).

Thus, the determination unit 34 can notify in advance a collision risk between the target and the host vehicle mounted with the radar device to the driver of the vehicle.

Furthermore, in the embodiment 3-7, the height difference $\Delta h$ is extracted from the table 270 stored in the memory 21; however, the invention is not limited thereto, and the height difference $\Delta h$ may be calculated by the following method.

The memory 21 stores a table in which the elevation angle $\theta$ of the first null is matched with the distance $d_{lm}$ at which takes the lower extreme value is taken according to the elevation angle pattern of antenna sensitivity. The determination unit 34 extracts the elevation angle $\theta$ of the first null corresponding to the distance $d_{lm}$ at which the lower extreme value is taken from the table stored in the memory 21. Furthermore, the determination unit 34 multiplies the distance $d_{lm}$ at which the lower extreme value is taken by $\tan \theta$, to calculate the height difference $\Delta h$.

According to the embodiment 3-7, it is possible to approximate the function of extreme values with respect to distance in a predetermined distance section using the quadratic function, to calculate the distance at which the lower extreme value of the quadratic function is taken, and to determine whether or not the target is an elevation-view structure based on the distance. Accordingly, it is possible to robustly determine whether or not the target is an elevation-view structure without being affected by variation of an upper extreme value of reception power due to spike noise or the like, and without being affected by an acquisition leakage of a value of reception power due to a low sampling frequency of the radar device.

Furthermore, since it is possible to extract the height difference corresponding to the distance at which the lower extreme value is taken from the memory, it is possible to calculate the height of the target from the difference of the height. Accordingly, in a case where the target is an elevation-view structure, by comparing the height of the target with the height of the host vehicle from the ground, it is possible to determine whether or not the host vehicle will collide with the target. Thus, it is possible to notify in advance a collision risk between the target and the host vehicle mounted with the radar device to the driver of the vehicle. On the other hand, in a case where the target is not the elevation-view structure, it is possible to estimate the type of vehicle which is the target, from the calculated height of the target.

Furthermore, in the embodiment 3-7, electric power of the plurality of representative points to distance is approximated using the quadratic function, the distance at which the quadratic function takes the lower extreme value is calculated, and it is determined whether or not the target is an elevation-view structure based on the distance at which the lower extreme value is taken; however, the invention is not limited thereto. For example, in a case where the distance at which the quadratic function takes the minimum value is calculated and the distance at which the minimum value is taken is not farthest in a predetermined distance range, it may be determined that the target is an elevation-view structure.

Furthermore, in a case where the lower extreme value is present in the curve obtained by connecting the plurality of representative points in the predetermined distance range in the order of distance, it may be determined that the target is an elevation-view structure.

As described above, the determination unit 34 may determine that the target is an elevation-view structure by the respective methods of the embodiment 3-1 to the embodiment 3-7. Furthermore, the determination unit 34 may determine that the target is an elevation-view structure only by satisfying conditions of two or more methods among the embodiment 3-1 to the embodiment 3-7.

For example, when the number of the upper extreme values of the curve of the reception power with respect to distance shown in the embodiment 3-1 exceeds a predetermined threshold value and the coefficient of the linear approximation equation of the upper extreme values of the curve of the reception power with respect to distance shown in the embodiment 3-2 is larger than 0, it may be determined that the target is an elevation-view structure.

In this manner, it is possible to determine whether or not the target is an elevation-view structure with high accuracy.

In the respective embodiments of the invention, the reception power calculation unit 22 calculates reception power as a function of a detected distance; however, the invention is not limited thereto. For example, the reception power calculation unit 22 may calculate electric power of received radio waves as a function of time, or may calculate electric power of received radio waves as a function with respect to the number of acquisition times when the radio waves are acquired at a predetermined time interval or distance interval.

For example, in a case where the target is stopped, the distance between the radar and the target decreases as time elapses. Thus, even in a case where the reception power is represented as a function of time, the determination unit 34 can determine whether or not the target is an elevation-view structure.

Furthermore, the ADC (received waves acquiring unit) 7 may count the number of times (sampling number) when the received radio waves are acquired at a predetermined time interval, and the reception power calculation unit 22 may calculate electric power of the received radio waves as a function of the number of times.

Furthermore, in the respective embodiments according to the third related art, the ADC (received waves acquiring unit) 7 converts the received waves which are mixed to digital signals at a predetermined sampling frequency; however, the invention is not limited thereto. Another received waves acquiring unit may acquire radio waves received through the reception antenna at a predetermined time interval. In this case, the reception power calculation unit 22 may calculate electric power of the received radio waves as a function of the number of acquisition times.

Furthermore, in the respective embodiments of the invention according to the third related art, the upper extreme values which appear on the curve indicating variation of reception power with respect to distance are used; however, the invention is not limited thereto, and the lower extreme values which appear on the curve indicating variation of reception power with respect to distance may be used. Since the reception power curve before and after the lower extreme value is sharply changed with respect to distance compared with the reception power curve before and after the upper extreme value, it is possible to accurately calculate the distance in the extreme value of reception power compared with a case where the upper extreme value is used.

Furthermore, in the respective embodiments of the invention according to the third related art, the electronic scanning type radar device is used; however, the invention is not limited thereto, and the mechanical operation type radar device may be used. A change in reception power with respect to distance when the mechanical operation type radar device is used is equivalent to change in reception power with respect to distance when the electronic scanning type radar device is used.

In addition, the function or a part of the function of the signal processing unit 20, which is the embodiments of the invention according to the third related art, may be embodied by a computer. In this case, the various units may be embodied by recording a program for performing the control functions in a computer-readable recording medium and by causing a computer system to read and execute the program recorded in the recording medium. Here, the "computer system" includes an OS or hardware such as peripherals. Examples of the "computer-readable recording medium" include portable mediums such as a flexible disk, a magneto-optical disc, an optical disc, and a memory card, and a memory device such as a hard disk built in the computer system, and the like. Moreover, the "computer-readable recording medium" may include a recording medium dynamically storing a program for a short time like a transmission medium when the program is transmitted via a network such as the Internet or a communication line such as a phone line and a recording medium storing a program for a predetermined time like a volatile memory in a computer system serving as a server or a client in that case. Furthermore, the program may embody a part of the above-mentioned functions, and the program may embody the above-mentioned functions in cooperation with a program previously recorded in the computer system.

While the embodiments of the invention according to the third related art have been described in detail with reference to the drawings, practical configurations are not limited to the above-described embodiments, and design modifications can be made without departing from the scope of this invention.

What is claimed is:

1. An obstacle detection apparatus comprising:
a transmission antenna transmitting radio waves;
a reception antenna receiving radio waves transmitted to and reflected by an obstacle;
an obstacle detection unit configured to detect the obstacle based on the received radio waves;
a false detection determination unit configured to determine presence or absence of a false detection characteristic, which is set in advance, with regard to the detected obstacle;
a camera capturing an image; and
an obstacle existence determination unit configured to determine, based on the image captured by the camera, presence or absence of the obstacle on which it is determined that the false detection characteristic is present.

2. The obstacle detection apparatus according to claim 1, wherein as the false detection characteristic, a characteristic that the intensity of the radio waves received by the reception antenna is lower than a predetermined threshold value is used.

3. The obstacle detection apparatus according to claim 1, wherein as the false detection characteristic, a characteristic that a consecutive number or frequency of extrapolation data exceeds a predetermined threshold value with regard to the obstacle detected by the obstacle detection unit is used.

4. The obstacle detection apparatus according to claim 1, wherein as the false detection characteristic, a characteristic that a value of a spatial horizontal angle or a one-time variation of the spatial horizontal angle value exceeds a predetermined threshold value with regard to the obstacle detected by the obstacle detection unit is used.

5. The obstacle detection apparatus according to claim 1, wherein as the false detection characteristic, a characteristic of detecting that the obstacle is an elevation-view structure by a technique which determines that the obstacle is an elevation-view structure in a case where the intensity of the radio waves received by the reception antenna decreases as a distance from the obstacle decreases is used.

6. The obstacle detection apparatus according to claim 1, wherein as the false detection characteristic, a characteristic of detecting that the obstacle is a downward-view structure by a technique which calculates electric power of the radio waves received by the reception antenna as a function of a distance from the obstacle, calculates the area of a region which is defined using a curve indicating the function as one boundary in a predetermined distance section, and determines that the obstacle is a downward-view structure based on the calculated area is used.

7. The obstacle detection apparatus according to claim 1, wherein as the false detection characteristic, a characteristic of detecting that the obstacle is a downward-view structure by a technique which calculates electric power of the radio waves received by the reception antenna as a function of time, calculates the area of a region which is defined using a curve indicating the function as one boundary in a predetermined time section, and determines that the obstacle is a downward-view structure based on the calculated area is used.

8. The obstacle detection apparatus according to claim 1, wherein as the false detection characteristic, a characteristic of detecting that the obstacle is an elevation-view structure by a technique which acquires the radio waves received by the reception antenna at a predetermined time interval, calculates electric power of the radio waves as a function of the number of acquisition times of the radio waves, and determines that the obstacle is an elevation-view structure which is disposed at a position higher than an optical axis of the reception antenna based on a plurality of representative points extracted from the function is used.

9. The obstacle detection apparatus according to claim 1, wherein in a case where it is determined by the obstacle existence determination unit that the obstacle is present, information relating to the obstacle based on the radio waves received by the reception antenna is output to an external control unit.

* * * * *